US008478775B2

(12) United States Patent
Netz et al.

(10) Patent No.: US 8,478,775 B2
(45) Date of Patent: Jul. 2, 2013

(54) EFFICIENT LARGE-SCALE FILTERING AND/OR SORTING FOR QUERYING OF COLUMN BASED DATA ENCODED STRUCTURES

(75) Inventors: Amir Netz, Bellevue, WA (US); Cristian Petculescu, Redmond, WA (US); Adrian Ilcu Predescu, Sammamish, WA (US); Marius Dumitru, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 591 days.

(21) Appl. No.: 12/363,637

(22) Filed: Jan. 30, 2009

(65) Prior Publication Data

US 2010/0088315 A1     Apr. 8, 2010

Related U.S. Application Data

(60) Provisional application No. 61/102,863, filed on Oct. 5, 2008.

(51) Int. Cl.
*G06F 17/00* (2006.01)
*G06F 7/00* (2006.01)

(52) U.S. Cl.
USPC .......................................... 707/769; 707/770

(58) Field of Classification Search
USPC ................................................. 707/769, 770
See application file for complete search history.

(56) References Cited

U.S. PATENT DOCUMENTS

| | | | | |
|---|---|---|---|---|
| 4,575,798 A | * | 3/1986 | Lindstrom et al. | 1/1 |
| 4,774,657 A | * | 9/1988 | Anderson et al. | 1/1 |
| 4,858,106 A | * | 8/1989 | Mattheyses | 1/1 |
| 5,349,684 A | * | 9/1994 | Edem et al. | 1/1 |
| 5,355,478 A | * | 10/1994 | Brady et al. | 1/1 |
| 5,619,693 A | * | 4/1997 | Troisi | 1/1 |
| 5,644,739 A | * | 7/1997 | Moursund | 715/840 |
| 5,870,752 A | * | 2/1999 | Gibbons et al. | 1/1 |
| 6,457,009 B1 | * | 9/2002 | Bollay | 707/770 |
| 6,460,027 B1 | | 10/2002 | Cochrane | |

(Continued)

OTHER PUBLICATIONS

Ivan T. Bowman, et al., "SQL Anywhere: A Holistic Approach to Database Self-Management", http://www.cs.toronto.edu/~blucier/misc/SQL.pdf, 2007 IEEE, 10 pages.

Shivnath Babu and Pedro Bizarro, "Adaptive Query Processing in the Looking Glass", http://www.cidrdb.org/cidr2005/papers/P20.pdf, Proceedings of the 2005 CIDR Conference, 12 pages.

(Continued)

*Primary Examiner* — Jacob F Bétit
*Assistant Examiner* — John P Hocker
(74) *Attorney, Agent, or Firm* — Workman Nydegger

(57) ABSTRACT

The subject disclosure relates to querying of column based data encoded structures enabling efficient query processing over large scale data storage, and more specifically with respect to complex queries implicating filter and/or sort operations for data over a defined window. In this regard, in various embodiments, a method is provided that avoids scenarios involving expensive sorting of a high percentage of, or all, rows, either by not sorting any rows at all, or by sorting only a very small number of rows consistent with or smaller than a number of rows associated with the size of the requested window over the data. In one embodiment, this is achieved by splitting an external query request into two different internal sub-requests, a first one that computes statistics about distribution of rows for any specified WHERE clauses and ORDER BY columns, and a second one that selects only the rows that match the window based on the statistics.

19 Claims, 51 Drawing Sheets

U.S. PATENT DOCUMENTS

| | | |
|---|---|---|
| 6,618,719 B1 | 9/2003 | Andrei |
| 6,738,755 B1 | 5/2004 | Freytag et al. |
| 6,920,453 B2 * | 7/2005 | Mannila et al. ............ 1/1 |
| 7,233,939 B1 | 6/2007 | Ziauddin |
| 7,293,024 B2 * | 11/2007 | Bayliss et al. ............ 1/1 |
| 7,330,848 B2 | 2/2008 | Chaudhuri |
| 7,734,644 B2 * | 6/2010 | Gras ................ 707/770 |
| 2005/0027690 A1 | 2/2005 | Zhang |
| 2006/0101223 A1 * | 5/2006 | Lekatsas et al. ......... 711/173 |
| 2006/0218123 A1 | 9/2006 | Chowdhuri |
| 2008/0065590 A1 | 3/2008 | Castro |
| 2008/0177722 A1 | 7/2008 | Lohman |
| 2010/0088315 A1 * | 4/2010 | Netz et al. ............ 707/737 |

OTHER PUBLICATIONS

"15 Managing Optimizer Statistics", Oracle Database Performance Tuning Guide 10g Release 1 (10.1) Part No. B10752-01, http://cs.ifmo.ru/~ad/Documentation/oracle-10g-lib-doc/server.101/b10752/stats.htm, 18 pages.

Don Carney, et al. "Monitoring Streams—A New Class of Data Management Applications", http://www.cs.brown.edu/research/aurora/vldb02.pdf, Proceedings of the 28th VLDB Conference, Hong Kong, China, 2002, 12 pages.

* cited by examiner

A cell 1400 (aggregated measure)
contains cline#

If each column has about 90% purity, distribution of buckets is
represented below — Chart 4400

| Bucket Type | Probability | % Rows |
|---|---|---|
| Pure | $0.9^6 =$ | 59% |
| Single Impurity | $6 * 0.1 * 0.9^5 =$ | 32% |
| Double Impurity | $15 * 0.1^2 * 0.9^4 =$ | 8% |
| Triple and Greater Impurity Buckets | ... | 1% |

FIG. 44

Sample Query 4500 with Sample Query Building Blocks

```
SELECT GB_Col1, GB_Col2,...,
    Count(*), Sum(Agg_Col1), Sum(Agg_Col2)..
FROM FactTable JOIN DimensionTable1, DimensionTable2..
GROUP BY GB_Col1, GB_Col2...
WHERE Filter_Col1 = value,...
```

Sample "Aggregate by Column" Query Building Block 4506

Sample "Group by Column" Query Building Block 4504

Sample "Filter by Column" Query Building Block 4502

FIG. 45

EFFICIENT LARGE-SCALE FILTERING AND/OR SORTING FOR QUERYING OF COLUMN BASED DATA ENCODED STRUCTURES

CROSS-REFERENCE TO RELATED APPLICATIONS

This application claims priority to U.S. Provisional Application Ser. No. 61/102,863, filed Oct. 5, 2008, entitled "EFFICIENT LARGE-SCALE FILTERING AND/OR SORTING FOR QUERYING OF COLUMN BASED DATA ENCODED STRUCTURES", the entirety of which is incorporated herein by reference.

TECHNICAL FIELD

The subject disclosure generally relates to efficient column based filtering and/or sorting operations relating to queries over large amounts of data.

BACKGROUND

By way of background concerning conventional data query systems, when a large amount of data is stored in a database, such as when a server computer collects large numbers of records, or transactions, of data over long periods of time, other computers sometimes desire access to that data or a targeted subset of that data. In such case, the other computers can query for the desired data via one or more query operators. In this regard, historically, relational databases have evolved for this purpose, and have been used for such large scale data collection, and various query languages have developed which instruct database management software to retrieve data from a relational database, or a set of distributed databases, on behalf of a querying client.

Traditionally, relational databases have been organized according to rows, which correspond to records, having fields. For instance, a first row might include a variety of information for its fields corresponding to columns (name1, age1, address1, sex1, etc.), which define the record of the first row and a second row might include a variety of different information for fields of the second row (name2, age2, address2, sex2, etc.). However, conventional querying over enormous amounts of data, or retrieving enormous amounts of data for local querying or local business intelligence by a client have been limited in that they have not been able to meet real-time or near real-time requirements. Particularly in the case in which the client wishes to have a local copy of up-to-date data from the server, the transfer of such large scale amounts of data from the server given limited network bandwidth and limited client cache storage has been impractical to date for many applications.

By way of further background, due to the convenience of conceptualizing differing rows as differing records with relational databases as part of the architecture, techniques for reducing data set size have thus far focused on the rows due to the nature of how relational databases are organized. In other words, the row information preserves each record by keeping all of the fields of the record together on one row, and traditional techniques for reducing the size of the aggregate data have kept the fields together as part of the encoding itself.

It would thus be desirable to provide a solution that achieves simultaneous gains in data size reduction and query processing speed. In addition to applying compression in a way that yields highly efficient querying over large amounts of data, it would be further desirable to gain further insight into complex operations, such as filter and sort operations, over large amounts of data, particularly where a client application or user may only wish to see, or can only see, a small window of data at a time (e.g., as limited by actual display real estate). In such circumstances, performing the filter and sort operations on the back end over the entire data set prior to sending on to the user or client application can be time consuming, and thus inefficient or inadequate in the case of real time applications.

For instance, when a client application requests to display a window over a large amount of data kept in a storage, today, at a logical level, the client application can request it though a query, such as the following pseudo-SQL query:

```
SELECT SKIP <start_of_window> TOP <window_size>
<list_of_columns>
FROM <table> [JOIN <list_of_tables_to_joins>]
[WHERE <list_of_predicates>]
[ORDERBY <list_of_columns>]
```

To resolve this request, conventionally, the storage layer first sorts and filters the data, and finally uses this ordered and filtered result to return only the rows in the specified window. However, where the amount of data in the ordered and filtered result vastly surpasses the window size, one can see why this approach is inefficient from the perspective of a user who wishes to see only the given window as fast as possible.

In this regard, one problem is that sorting a large amount of data is a very expensive operation, affecting performance of the component that requested the window of data.

One conventional way of solving this problem is to have the storage component ensure that it first applies the filter, and then orders only the results that pass the filter. This ensures that less data needs to be sorted, and helps in general proportion to how selective the filter is, i.e., how much the filter narrows down the target data set to be sorted. However, one can see even this plan does not help if a lot of rows match the filter predicates, since a large number of rows still need sorting, which returns to the original problem.

Another conventional solution is to use a caching mechanism, so that the cost of sorting all of the rows is paid only when user requests the first window of data. Subsequent queries after the first window then have an amortized cost, as the query processor/handler can use the cached result to return different windows over data when filter and order conditions are unchanged. This approach, however, has a relatively high cost in terms of memory since the cache results have to be preserved. While the cache can be evicted or invalidated based on various reasons including memory pressure, usage patterns, etc., the problem remains that at least the initial cost of sorting all rows that pass the filter has to be paid. For time critical queries, this may be unacceptable.

Thus, a fast and scalable algorithm is desired for querying over large amounts of data in a data intensive application environment, particularly queries that implicate expensive filter and/or sort operations over data on a large scale, e.g., a billion rows or more in the target store.

The above-described deficiencies of today's relational databases and corresponding query techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Embodiments of querying of column based data encoded structures are described enabling efficient query processing over large scale data storage, and more specifically with respect to complex queries implicating filter and/or sort operations for data over a defined window. In various embodiments, a method is provided that avoids scenarios involving expensive sorting of a high percentage of, or all, rows, either by not sorting any rows at all, or by sorting only a very small number of rows consistent with or smaller than a number of rows associated with the size of the requested window over the data. In one embodiment, this is achieved by splitting an external query request into two different internal sub-requests, a first one that computes statistics about distribution of rows for any specified WHERE clauses and ORDER BY columns, and a second one that selects only the rows that match the window based on the statistics.

These and other embodiments and optional features are described in more detail below.

BRIEF DESCRIPTION OF THE DRAWINGS

Various non-limiting embodiments are further described with reference to the accompanying drawings in which:

FIG. 44 illustrates the power of column based encoding where resulting pure buckets represent more than 50% of the rows of the data;

FIG. 45 illustrates exemplary non-limiting query building blocks for query languages for specifying queries over data in a standardized manner;

DETAILED DESCRIPTION

Overview

Figure 1:
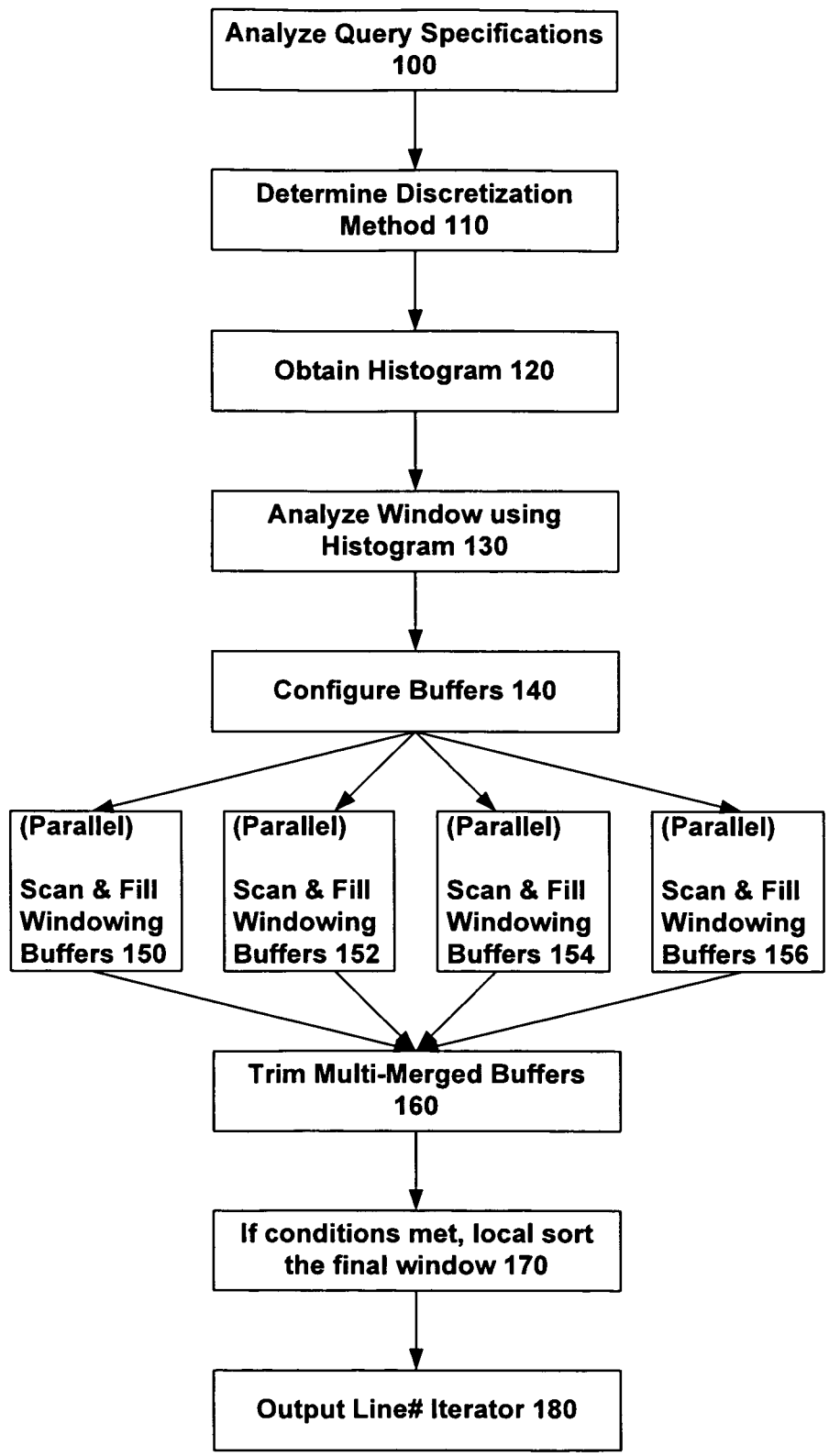
FIG. 1 is a flow diagram illustrating a general process for processing queries in accordance with an embodiment.

As a roadmap for what follows, an overview of various embodiments is first described and then exemplary, non-limiting optional implementations are discussed in more detail for supplemental context and understanding. Then, some supplemental context regarding column based encoding techniques for packing large amounts of data are described including an embodiment that adaptively trades off the performance benefits of run length encoding and bit packing via a hybrid compression technique. Lastly, some representative computing environments and devices in which the various embodiments can be implemented or deployed are set forth.

As discussed in the background, among other things, conventional systems do not adequately handle the problem of reading tremendous amounts of data from a server, or other data store in "the cloud," in memory very fast due to limits on current compression techniques, limits on transmission bandwidth over networks and limits on local cache memory. The problem compounds when many queries are executed by a variety of different data intensive applications with real-time requirements, and queries implicating filtering and/or sorting over massive amounts of data present a unique challenge due to the cost of such operations.

In this regard, as described in connection with various embodiments herein, scenarios involving expensive sorting of a high percentage of, or all, rows, are avoided either by not sorting any rows at all, or by sorting only a very small number of rows consistent with or smaller than a number of rows associated with the size of the data window. An external query request can be split into two different internal sub-requests, a first one that computes statistics about distribution of rows for any specified WHERE clauses and ORDER BY columns, and a second one that selects only the rows that match the window based on the statistics.

In this respect, dynamically obtained statistics dependent on WHEREs and ORDERBYs are leveraged for the purpose of later windowing the data. In some embodiments, to minimize statistics built time, statistics are built for real data or for synthetic data values after being discretized for ease of histogram build. In this regard, the synthetic ("discretized") data is treated as a form of joined column to participate in ORDER BY operations.

In addition, consistent with embodiments described in more detail below, a final window is not generated until a secondary scan in O(n) once the content of columns implicated by ORDER BY operations is analyzed. Furthermore, in some cases, the method uses precomputed hierarchy data for simulating certain types of synthetic ("discretized") columns. In one embodiment, an algorithm chooses appropriate discretization methods for the given data as well as a buffering strategy based on the query definition, the content of the final window, as determined from statistics, and degree of parallelization.

Furthermore, an algorithm is presented herein for choosing a projection method based the content of WHERE and ORDER BY buckets and the content of the final window, as determined from statistics. Also, a method is providing for building the final window in parallel using only insertions into one of up to N, e.g., three, preconfigured buffers. In other embodiments, a process for configuring the internal buffers, e.g., buffer sizes and their policy, is set forth for use during projection in accordance with query specification, a selected discretization method, a distribution of data in the final window, as determined by histogram, and degree of parallelization applied to data processing.

With respect to parallel processing, segment discretization allows the final window in O(1) time to be filled in parallel for a query without ORDERBY (that has just WHERE filters) or for a window that matches a spike. Also, in various embodiments, a smart buffering method is applied for discarding rows in O(1) that will not appear in the final window. In addition, various embodiments optionally produce an iterator over the windowed lines for purpose of streaming all projected columns.

As an introduction to a non-limiting process, FIG. 1 shows an overview of the execution flow for a typical query. After a query specification is received, it is analyzed by the system at 100. This may involve discretizing the data at 110 according to selected method by the analysis. At 120, a histogram is computed over the data. At 130, the window of data implicated by the query specification is analyzed using the histogram, as a result of which data buffers 140 are readied for parallel processing by scanning and filling the windowing buffers 150, 152, 154 and 156. The buffer results are merged at 160, and trimmed with respect to the window to be displayed, and if certain conditions are met, a local sort is performed over the final window at 170, but only if needed. The line# iterator 180 is then outputted.

Column Based Query Processing with Filter/Join Operations

As mentioned in the overview, column oriented encoding and compression can be applied to large amounts of data to compact and simultaneously organize the data to make later scan/search/query operations over the data substantially more efficient. Accordingly, in various embodiment, this is achieved generally by splitting an external query request into two different internal sub-requests, a first one that computes statistics about distribution of rows for any specified WHERE clauses and ORDER BY columns, and a second one that selects only the rows that match the window based on the statistics. In this regard, the techniques described herein can be used for any query application to enhance the speed of delivery of query results to an end application or user, i.e., any application that windows over sorted and filtered rows can benefit.

In more detail, once a query request comes to the storage layer, it is analyzed and if the query does not contain any ORDERBY or WHERE clauses, the query is resolved directly against storage, by returning the physical rows specified by SKIP & TOP. If the rows are filtered and/or ordered, the first step is to determine if any statistics can be built to help identify the nature of the content of the window.

At this point, it can also be determined if those statistics can be built over a column containing real data, or if they need to be build over a synthetic ("discretized") column. This discretization step helps to minimize cost of building statistics, e.g., if number of distinct DataIDs in sorted column is large, or minimize cost of memory allocation during parallel windowing when no ORDERBY is specified, e.g., by enabling identification of how many rows in the final window will be produced by each thread, or by minimizing cost of memory and time while producing the window over a spike of data. The discretization function can be viewed generally as a function of ordered_columns and physical segment: fn(ordered_columns, physical_segment)

Some types of discretizations that can be used include clustering adjacent ordered values in the same group, discretizing by segment where filtered data passes the where clause when no order by is set, and discretizing by splitting spikes into distinct (per segment) groups. Once a discretization function, if any, is selected, an internal query is then executed, which in its general form looks like:

```
SELECT fn(ordered_columns,physical_segment), COUNT( )
FROM ...
WHERE user_specified_predicates
```

This query returns statistics describing number of occurrences of each value on the sorted column, or if a discretization function is plugged in, of each discretized value.

Over those results, a histogram can be built, e.g., the x axis contains ordered GroupIDs, and the on y axis contains a running sum of occurrences of previous groups. The term sum is sometimes abbreviated Σ herein.

It is noted that for ordering GroupIDs, not all existing rows need be sorted, not even all distinct DataIDs, since multiple DataIDs can match through discretization to same GroupID. Also, by taking into consideration the encoding methods used for storing the data, and/or using precomputed ordered stores ("hierarchies") the position of a particular group can be determined without comparing the values themselves.

At this point, valuable statistics, e.g., histogram data, have been acquired that inform position of each group in the final virtual rowset. Optionally, this information can be cached for subsequent usage. Next, the specified window position can be compared with data in the histogram, and which values on the sorted column will be present in the visible window can be determined.

Once this is understood, a second internal query is generated that in its general form looks like:

```
SELECT line# SKIP adjusted_skip TOP adjusted_top
FROM ...
WHERE user_speciied_conditions AND
values_in_the_sorted_columns=
values_determined_from_the_histogram
ORDERBY user_specified_sorted_columns
USING histogram
```

Internally, this query, which can be executed on multiple threads in parallel, uses a data cache data structure that keeps track of the final window. The data cache determines its configuration based on the query specifications, the histogram passed, position of the window, the type of discretization used and degree of parallelism applied to the processing. The request to fill the final window can thus be executed in parallel on potentially multiple processors, each scanning different segments (part of the columns involved) and partially fulfilling the final result set. IN this regard, various buffer types can be used depending on the data cache configuration mentioned above.

The insertions into those buffers are O(1), what differs between them is their policy. The way insertions are done, and the decision of choosing a particular buffer or another is based on buffer configuration as well as metadata about purity/impurity of content inside current buckets being scanned (buckets are the fragments currently scanned within the involved WHERE and ORDERBY columns). As an example, this metadata about purity on the ORDERBY column can be analyzed, and if the values getting ORDERBY-ed do not change for the entire length of the bucket, one determination can be made for the whole bucket what is the proper buffer where the qualified line#-s will be recorded. Alternatively, if the metadata indicates that the WHERE conditions do not change for the length of the entire bucket, all lines inside the bucket can be treated in the same way (either qualifying or not for being added to a buffer).

Some types of buffers act as "normal" ones that just insert anything that the client requested, whereas others discard any attempts to insert after a given threshold, and still others overwrite existing records in a circular/ring-buffer style. Size and policy used by those buffers is chosen while the data cache is configured, and enables the final window to be filled in O(n) scan time while leveraging all the processors, i.e., using parallel execution.

At the end of this query, one or more data caches may be present, more if more than 1 segment and more than 1 processor available and the data caches contain all the line#-s that make into the final window, which could also be a bit more then the exact number. Then, trimming is applied, i.e., eliminating the extra line#s is done in O(1) by using the histogram. In many cases, remaining records holding line# may need no extra sort as they are either in natural order (due to the inherent order in which segments are scanned) or can be multi-merged on the fly as the results are streamed out. There are some cases where sorting the trimmed result may still nonetheless be needed, e.g., for discretization by clustering, or where multiple values are assigned in the middle buffer, but this sorting cost always, even in the most expensive case, is less than the cost of sorting entire table since the sorting is limited and related to the size of the visible window. For typical windowing scenarios, the size of the visible window will be many orders of magnitude smaller then the number of rows available in the table.

The windowing information produced is then exposed to outer layers using an enumerator that returns qualified rows (line#s), which is used as the main driver in producing the final rowset.

Thus, in various embodiments, queries generated by a user interface component or other interface can be handled so as to request certain windows of data, apply filters over the windows, and sort them. In this regard, in one non-limiting implementation, to improve performance, windowing support is added as a layer between data and a requesting application to respond to queries, such as:

```
SELECT
[SKIP <integer>]
[TOP <integer>]
[DISTINCT] <list-of-columns>
FROM <table> [NATURAL_JOIN <table>][NATURAL
JOIN <table> ...]
WHERE <filter-condition>
[ORDER BY <column> [ASC|DESC] [, <$row_num> [ASC]]]
```

In a typical scenario, a data consuming system or application uses interfaces to a query handler and processor, which explores, filters and sorts data efficiently on behalf of the data consumer, and returns a window of data for satisfying the query. While asynchronous query operations are supportable, actual queries are expected to complete relatively quickly.

For instance, in an example scenario, a user or application may be facing a table with a billion rows, and wish to query over the table. For instance, the user may apply a filter, and also sort by one column. With the various embodiments described in more detail below, the user can retrieve the appropriate window of data that satisfies the query within a few seconds. Once the window is retrieved, the user might scroll down via a UI component implicating an additional query, at which point subsequent windows of ten thousand rows are returned within only one half of a second.

With respect to some nomenclature, optionally, a data cache data structure can be used which is optimized for holding results of aggregations. As a simplified example, a "square" data cache organized as a 2-dimensional array having as coordinates on one side—the IDs of salesmen, and on the other side—the IDs of products, and holding inside each cell the value of an aggregation (e.g., the sum of sales made by the salesman on product, where salesman and product are identified by coordinates of that cell). In this example, there is no inherent order associated with the aggregated values inside the data cache.

As used herein, query kernel refers to a component that is optimized for responding to formula engine requests that involve aggregations and filtering, which from a logical point of view are equivalent to a SQL query: SELECT <cols>, <aggs> FROM <t> WHERE <pred> GROUPBY <cols>. Query kernel is designed to return data caches since this is the optimal structure on which upper layers can operate efficiently for various core scenarios.

As used herein, a rowset refers to a set of data, multiple rows, multiple columns, containing items that one could see with an interface to the query processing component. For instance, a rowset may include a list of all sales represented as rows sorted by Salesman, containing the Salesman, Product and ChargedPrice columns. A rowset can be streamed by a server, and its rows have an inherent order.

A query spec data structure describes a query and can be used optionally as an interface between a server and Storage. While not in text format, the query spec data structure can logically be considered equivalent to a query that a server sends on to a storage engine.

As described in more detail below, run length encoding (RLE) is a way to compress data by saying that X value appears N times contiguously in a sequence. RLE compression is favored during processing by the packing algorithm described below in the section regarding supplemental context for an encoding technique for large amounts of data. RLE compression is also leveraged during the scanning performed by the query kernel for fast aggregating and fast filtering data, which is also described in more detail below for supplemental context. During processing, RLE sequences are maximized in column oriented storage, which is translated in maximizing the sequences of adjacent rows having the same value on a particular column.

Once queries, such as but not limited to SQL queries, are passed to the query engine, the engine parses the queries, binds those queries to an internal query spec, passes the query spec to a query handler, which internally performs the processing to return an ordered rowset containing the specified window of sorted and filtered data.

For communicating between the query engine and the query handler, a standard client-request interface mechanism can be used, e.g., a query client request and response. The request passed includes a query spec describing what data should be returned. The response then contains a rowset, instead of a data cache, since a data cache has an inherent order.

Figure 2:
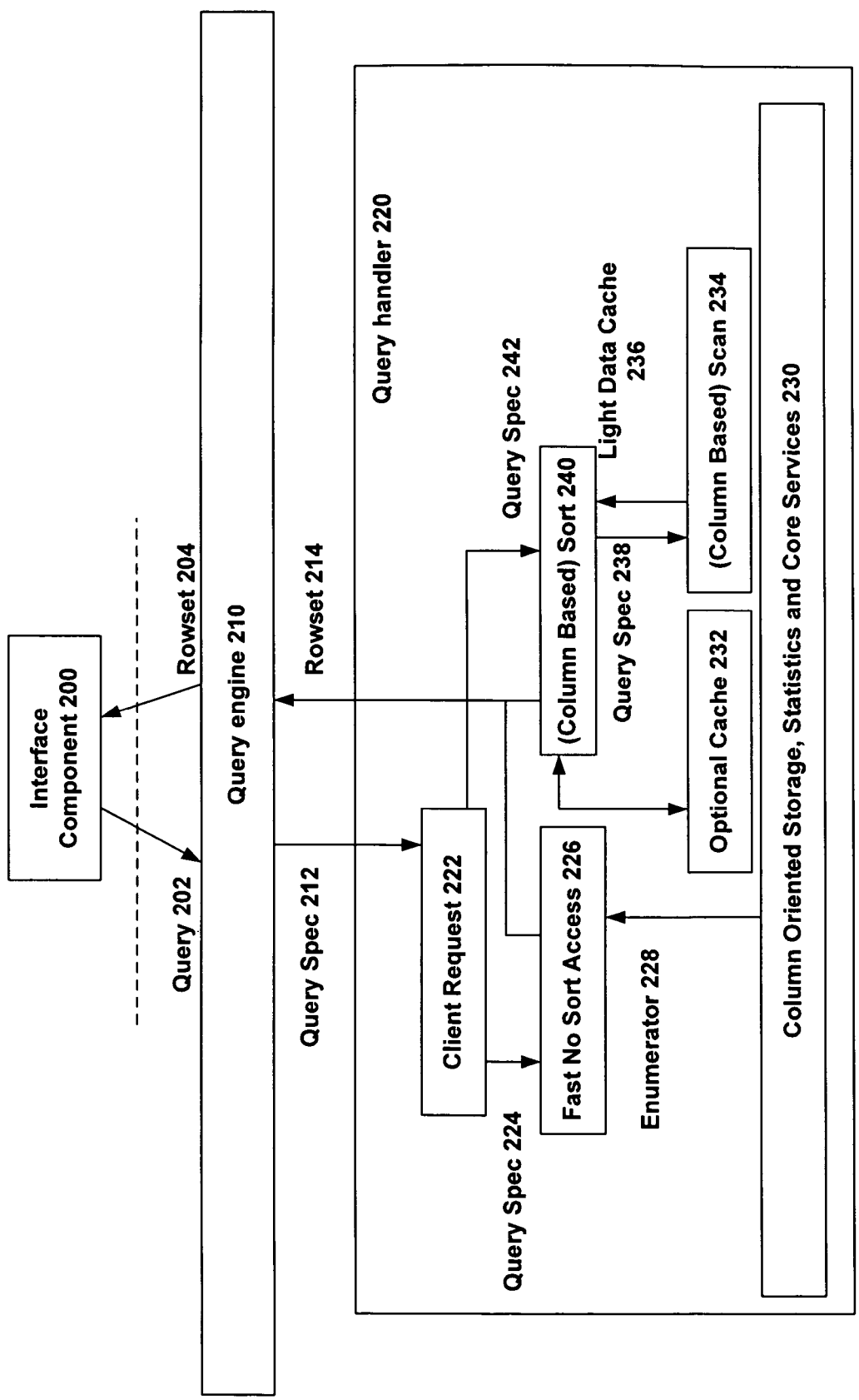
FIG. 2 is a generalized block diagram of a query processing environment consistent with one or more embodiments herein.

FIG. 2 is a non-limiting block diagram overview of the components and exemplary interfaces. On the consuming side, an interface component 200 handles issuing a query 202 and receiving rowset(s) 204 as results. A middle layer query engine 210 can prepare the query 202 by defining a query specification (spec) 212 and passing along to a client request handler 222 of query handler 220. Client request component determines if the query spec 212 implicates forwarding query spec 224 to a fast no sort access algorithm 226 or implicates forwarding query spec 242 to column based sort algorithm 240. In either case, rowset 214 is returned to query engine 210 for forwarding to interface component 200. As mentioned, column oriented storage, statistics and other core services component 230 handles the generation of histograms and the like over the requested data. Column based sort 240 cooperates with column based scan 234 with respect to the query spec 238, and may optionally use a light data cache 236 in connection with the exchange. Other cache data structures 232 may also be used to store temporary results for later reuse. An enumerator 228 informs the results from core services component 230 where the fast no sort access 226 is used.

Inside the query handling component, several options pertain ranging from providing a completely different query engine targeting ORDERBY to modifying an existing query kernel and adding direct support for sorting inside the query kernel, or a hybrid solution.

In this regard, as a query comes to the query handling component in the form of a query spec, the query is examined and an execution path is decided upon. It is noted that for simple queries that do not implicate sorting order or filtering, a straight-forward ISAM type of access can be used directly against the storage, whereas for more complex queries, a more complex execution plan is chosen that takes care of data distribution and uses query kernel or a bucket-oriented-sort algorithm.

A cache can be used to store expensive intermediate results that can be subsequently reused while user scrolls inside a UI component.

To meet the requirements of returning sorted results over billion of rows in a time frame of few seconds, a simple brute-force-sort-everything approach is too prohibitive both in terms of time spent and in terms of memory usage.

In various embodiments, a modular approach is used in which certain modules are re-used and others are skipped under certain circumstances. The full end-to-end overview of the general algorithm the entire execution flow, including what modules are executed, is available and discussed in detail below.

Figure 3:
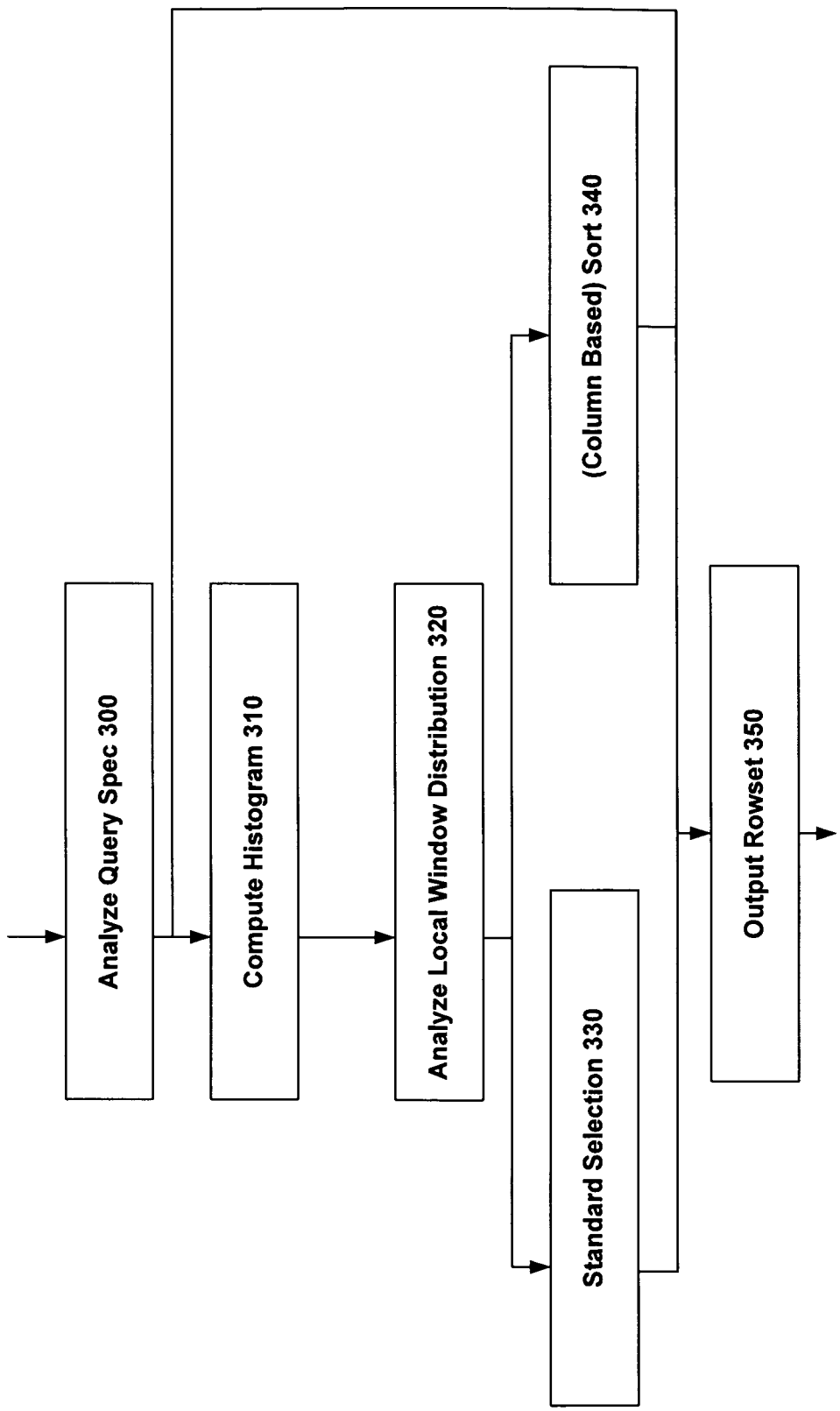
FIG. 3 is a flow diagram illustrating a generalized method for processing queries in accordance with one or more embodiments herein.

A high level overview of modules involved is first illustrated in FIG. 3. As shown, initially the query spec is analyzed at 300. Then, at 310, a histogram is computed at 310 as a first step. Based on the histogram, the local window distribution implicated by the query is analyzed at 320, and either standard selection 330 or column based sort 340 is selected for processing. In either case, the results are returned to the requesting application at 350.

First, various cases/scenarios are presented from simplest particular cases first and gradually looking at more complex and generic cases. A unified, generic, end-to-end algorithm is presented in a modular way in various embodiments. Optionally, caching can be used to store some temporary results for re-use.

In this regard, when a query is received, a query spec is defined which is analyzed. Once the client request comes to the query handling component, the query spec is analyzed to figure out if a simple query is involved that does not involve any sorting and filtering, or if it is a query that requires significant processing.

For non-filtered and non-sorted queries, e.g., indexed sequential access method (ISAM), if there are no filters and no sorts, then the request can be fulfilled with no overhead by using a direct ISAM-style type of access. This implies (1) Get the proper enumerators over the columns involved, (2) Do a Goto( ) at the right position (e.g., executing a SKIP) and (3) building a rowset over that data, e.g., performing a Next( ) for TOP number of rows, decoding the value and filling the rowset. In this regard, in one embodiment, decoding happens at the query handling component level, instead of returning rows with DataIDs since unnecessary roundtrips from the server to the query handler to convert DataIDs.

For filtered but not-sorted queries, this is a simplified case of a more generic "filtered and sorted query" without sort, with the difference in terms of execution being that dedicated sort operations are not necessary, and the generic case can be used involving the filtering of the data steps, though not the sorting steps, and returning the window on the filter.

In this regard, in one embodiment, a query kernel, e.g., capable of handling multiple parallel jobs, is used to leverage existing bucket-oriented filtering logic, and obtain multiple "light" data caches containing rows in the form (line#, contiguous-line#) over which the common Merge-Multi-Light-DataCaches algorithm is executed for finding the real (SKIP, TOP) window. It is noted that some segment jobs can be stopped earlier once it is found that first SKIP+TOP windows are already retrieved. Contiguous-line#s, also referred herein as cline#s, are counts of lines that are physically adjacent inside column storage and that match the filter predicate. Thus, the (line#, cline#-s) format describes chunks of data that match the predicate and are physically stored in a contiguous form. Those chunks may be byproducts of the fact that data is compacted based on columns and natural RLE sequences may be found on the column on which the sort operation is performed. It is also noted though that RLE-length of the bucket is different than the cline#s, since cline#s deal with "filtered" chunks.

Figure 4:
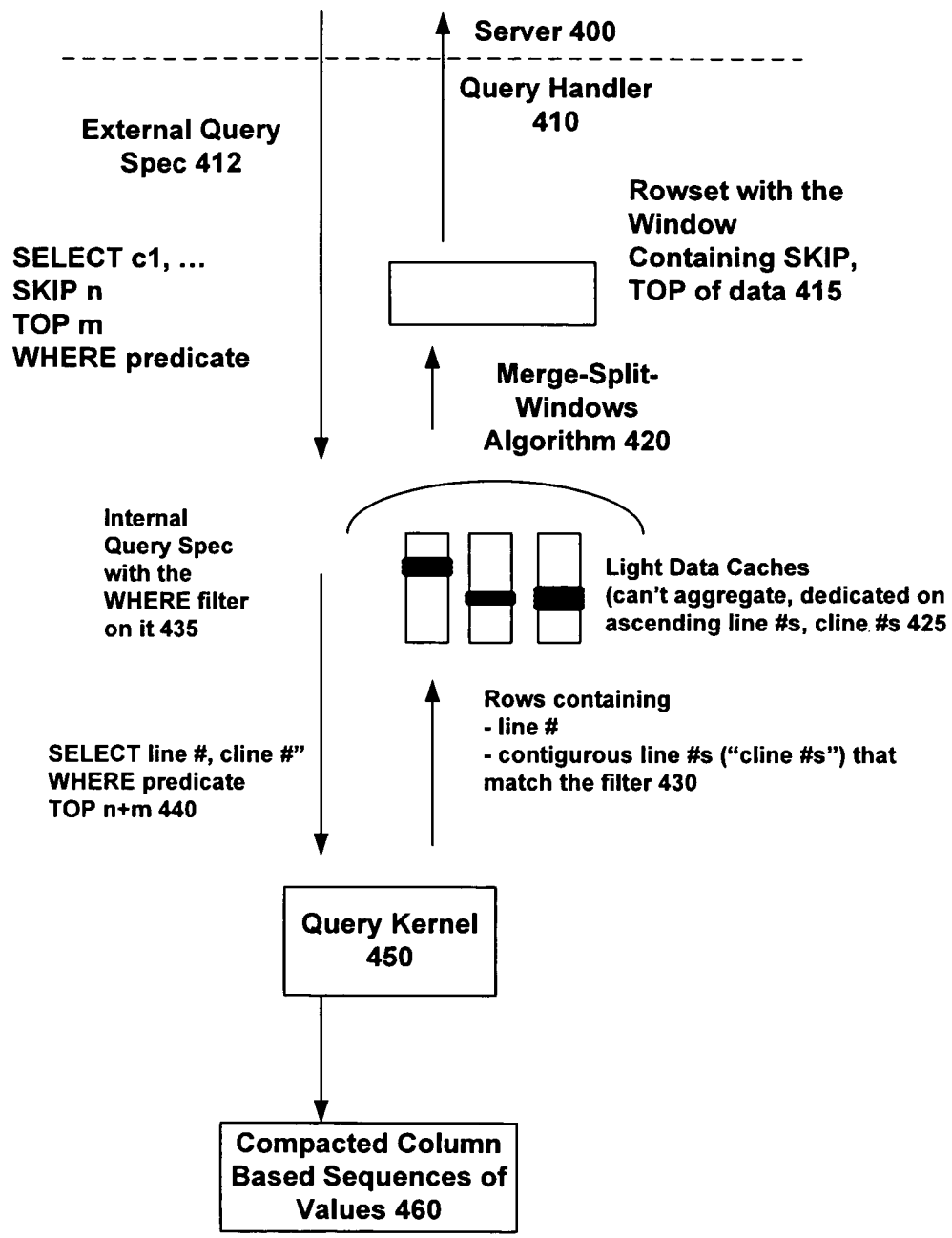
FIG. 4 is a flow diagram illustrating an end to end processing flow for satisfying query requests consistent with one or more embodiments herein.

Then, over those multiple split windows, a rowset can be built the same way as with the simple ISAM case. FIG. 4 is a block diagram overview of the process. The external query spec 412 is handled by query handler 410 of server 400, which is translated to an internal query spec 435.

The query including the filter predicates is forwarded to the query kernel, and the chunks of contiguous rows that match the filter are obtained, together with the position where they occur, and from those chunks, the "selected" window is computed without having to do any sort in this case.

For, the not filtered, but sorted query, this is again a simplified case on the more generic "Filtered and Sorted Query" (which will be treated more extensively bellow). In this particular case we don't have to apply any actual filter, but we need to output sorted data. The data is then filtered according to expression 440 by query kernel 450 which queries over the compacted column based sequences of values 460. Query kernel 450 then returns the rows 430 containing line#s and contiguous line #s (cline#s) that match the filter. As described above, light data caches 425 can be used to support the operation of processing and merging 420 to form the rowset output 415.

In this regard, it is noted that the distribution on the sorted column affects the execution plan that is selected. A simplified overview of the various efficient filter and sort operations performed herein is that the same operations are performed as for the generic case, except that filter predicates are not pushed to query kernel. At some point, chunks of rows containing (DataID-of-sorted-column, line#, cline#s) are obtained, and these are used build a rowset the same way described for the simpler cases above (ISAM and Filtered-but-Not-Sorted cases).

For queries involving filtering and sorting over large amounts of data, if the query involves filters or an ORDERBY clause, then an execution plan is determined for satisfying the request. The actual plan depends on the patterns of data, with factors including the distribution and cardinality of DataIDs on the column for which sort will be performed. The section below examines this in more detail and described how the data distributions and patterns can affect execution plan.

Figure 5:
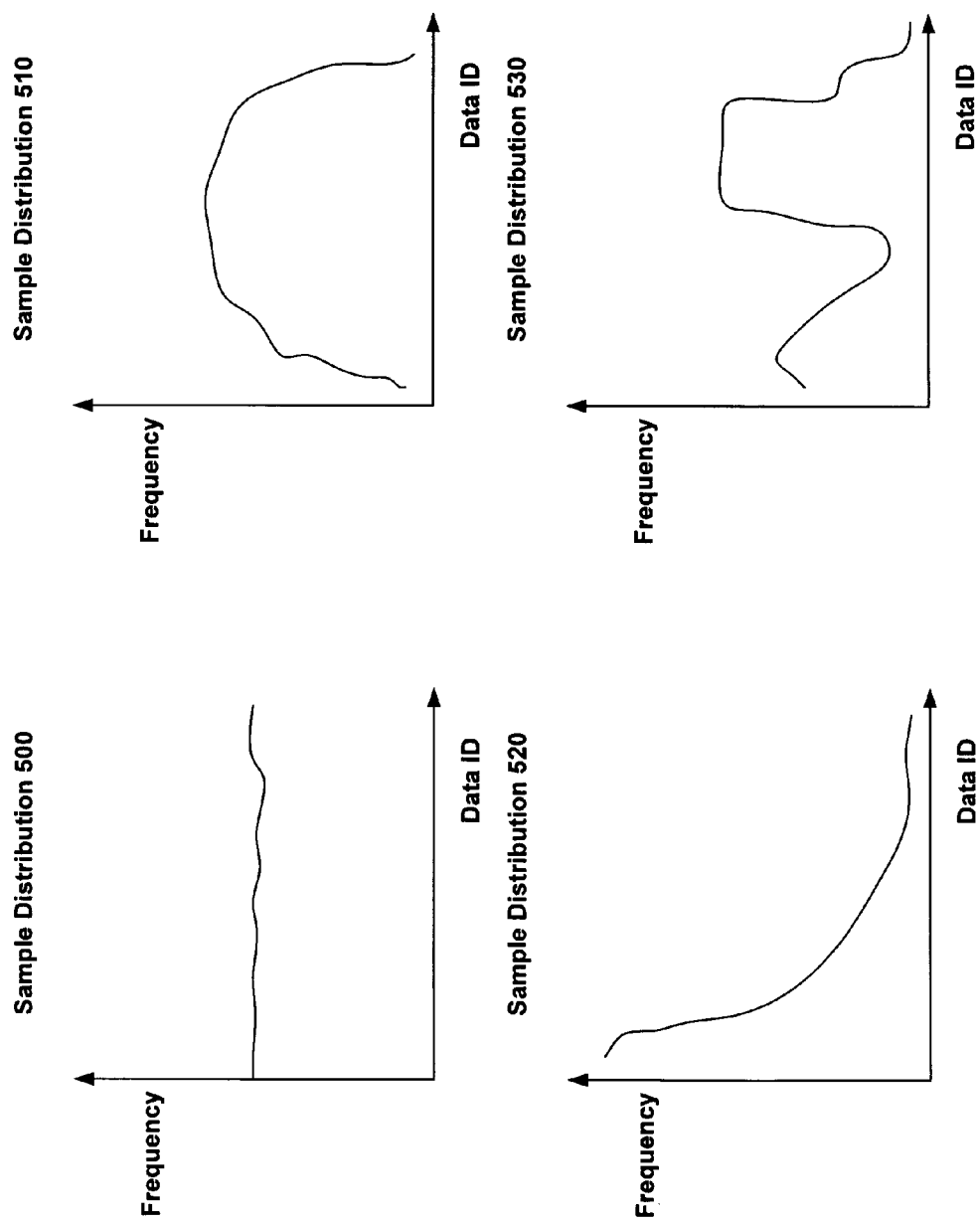
FIG. 5 is a depiction of some sample distributions of data, which are commonly found in real-word data, to which the techniques of one or more embodiments can be applied.

With respect to execution plans for different data distributions of sorted columns, FIG. 5 is a list of potential data distributions 500, 510, 520, 530 that can be encountered. Handling each of these cases 500, 510, 520, 530 is described below in more detail, starting with simpler cases for ease of illustration and then generalizing to more complex cases. In FIG. 5, on the x-axis are distinct DataIDs and on the y-axis, frequency of DataID (how many duplicates) is represented.

Case 500 illustrates a distribution with many duplicates, e.g., having a reasonable # of distinct DataIDs, but no skewed cases. This is generally known as "good" cardinality in this scenario since there are a reasonable number of distinct DataIDs, each with lots of duplicates, without any extreme "skewed" cases (where half of the values match a single DataID, for instance).

Examples of case 500 may include uniform, normal or any other distribution in which a reasonably low number of distinct DataIDs exist compared with the number of rows inside the table, i.e., 1 <<|distinct-DataIDs|<<|#-of-rows-inside-table|. An example of "good" cardinality might be a table with up to, for instance, 1 million distinct DataIDs, excluding skewed distributions.

A property that can be leveraged on those types of distributions is that, on average, a DataID is duplicated many times, and thus, statistics (a histogram) can be tracked describing number of occurrences corresponding to each DataID, e.g., 1 billion rows may be present, but only 1 million distinct DataIDs. Thus, an accurate histogram, e.g., compute at hierarchy processing time, can be realized that will hold the sorted DataIDs together with the number of occurrences.

In this regard, it is noted that the histogram is "sorted." As a result, a running sum can be maintained instead of the actual count where the count can be computed by looking at the next DataID. If needed, for a reverse sort order, the reverse running sum can be computed by subtracting the materialized running sum from the actual count. Table I below illustrates the notion of running sum further.

TABLE I

Illustration of Running Sum

| Ordered DataID | Running Sum |
|---|---|
| 72 "Airplane" | 0 |
| 12 "Bus" | 300 (because we had 300 Airplanes in our table) |
| 92 "Car" | 314 (because we had 14 Buses in our table) |
| 6 "Helicopter" | 714 nd so on . . . 1 million times for the 1 million distinct DataIDs) |

In the case where no filter is applied, using the accurate histogram, it can be determined what the actual DataIDs are (from the sorted column) that are visible in a particular window if no filter would have been applied.

For instance, considering the query:

```
SELECT [Vehicle], <other-columns>
SKIP 312
TOP 5
```

A simple examination of the histogram information of Tabe I above informs that, for rows 312 and 313, "Buses" will be returned, and for rows 314, 315, 316, "Cars" will be returned.

As for what the exact rows are containing Buses and Cars, this can be determined by executing the following query:

```
SELECT [Vehicle], storage-line#, <other-columns>
WHERE [Vehicle] IN ("Bus", "Car" )
```

From this, the last 2 Buses and first 3 Cars are picked up according to the storage line#s.

It is noted that a SELECT could be executed that uses cline#s instead of <other-columns>, and which might be faster with respect to streaming the output rowset, but this works best if no relationships are involved, that is, if data comes from a single physical table, with no NATURAL JOINS. It is also noted that in the case where filter is applied, this could be performed without any pre-computed histogram at all, though it may be a bit slower at query time, by creating some statistics on the fly using the Query Kernel.

For more detail where a filter is applied, the histogram describing the ordered DataIDs and their count is not sufficient, since it is filter agnostic. Accordingly, it is determined which are the actual rows that will be displayed. For instance, consider the query:

```
SELECT [Vehicle], <other-columns>
SKIP 312
TOP 5
WHERE <user-specified-predicate>
```

First, the predicate should not be evaluated directly, since the Query Kernel already has a lot of optimizations in place for doing this, so the predicate is pushed to the Query Kernel for evaluation of the WHERE clause.

If an internal Query is then executed, such as the following:

```
SELECT [Vehicle], COUNT ( )
GROUP BY [Vehicle]
WHERE <user-specified-predicate>
```

Then, a 1-coordinate "Standard" data cache is received that holds, for each vehicle, the count of matches. The DataIDs are sorted and a running sum over them is maintained. For the example data distribution, more than a total of about 1 million distinct DataIDs exist and some of them will probably ruled out by the filter.

At this point, the same statistics (histogram) are obtained as above (in the non-filtered case), the primary difference being that the statistics now apply on filtered rows. A subsequent query in the same fashion as the non-filtered case will bring the rows matching the DataIDs from the window. The main difference is that the <user-specified-predicate> is pushed to Query Kernel for handling, as follows:

```
SELECT [Vehicle], storage-line#, <other columns>
WHERE [Vehicle] IN ("Bus", "Car") AND <user-specified-predicate>
```

This is basically a variation of selection algorithm for getting the (SKIP, TOP) window that leverages Statistics, Query Kernel and natural contiguous sequences that are the byproduct of VertiPaq. It is noted that an alternate way of getting the COUNT ( ) and RUNNING_SUM ( ) over filtered data could have been to feed Query Kernel with a column that is aware of the hierarchy. This would have avoided the subsequent sort, however, it is not only more tricky to implement in terms of providing the virtual column, but also involves random memory accesses during Query Kernel execution that would adversely affect the performance.

Figure 6:
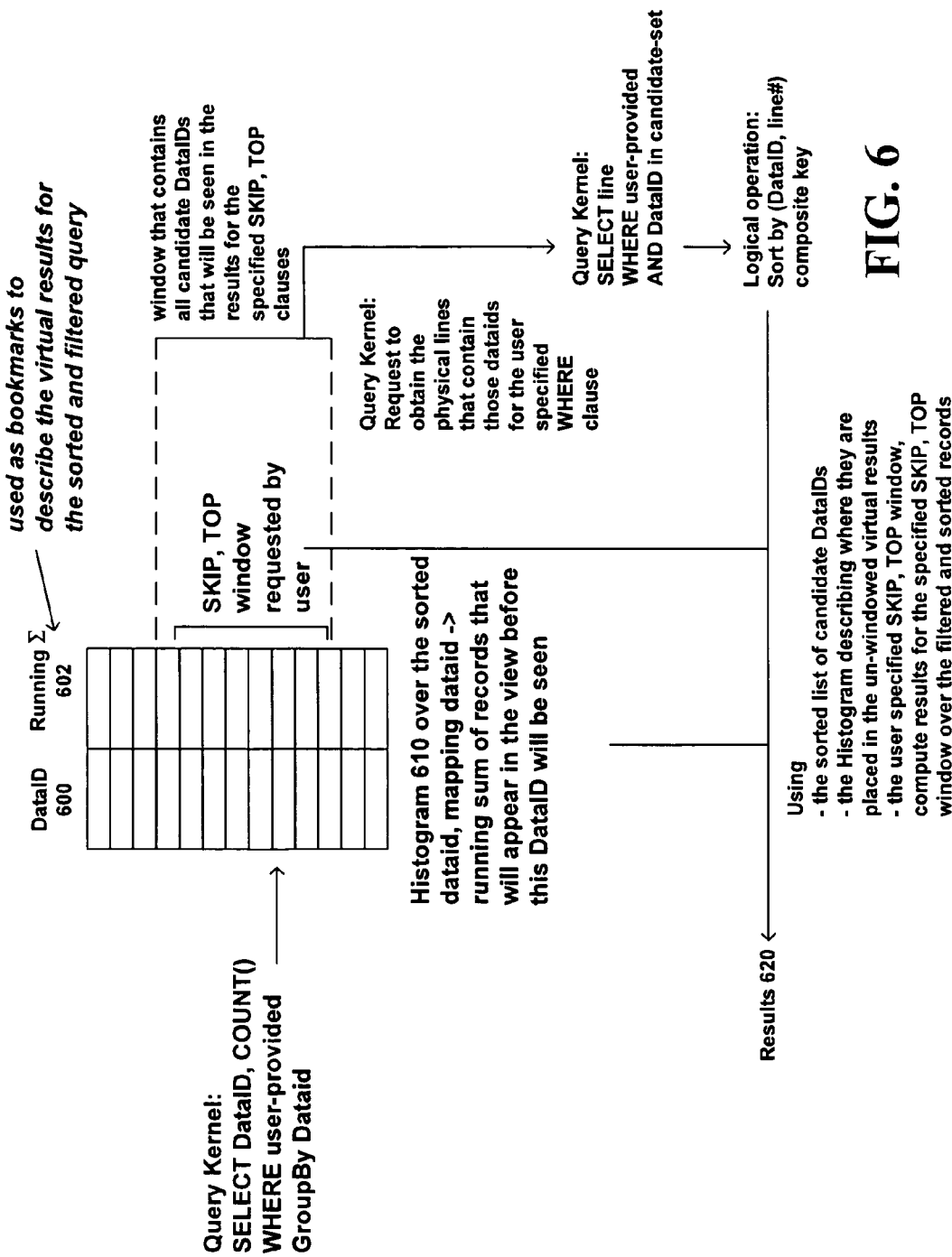
FIG. 6 illustrates a representative flow diagram including the use of a histogram as described herein for processing queries.

FIG. 6 is a graphical description of what is performed from a logical point of view to determine the actual output window. Histogram 610 includes a list of DataIDs 600 and running sums 602, which through the processing chain produces efficient results 620, as described above in more detail.

Figure 7:
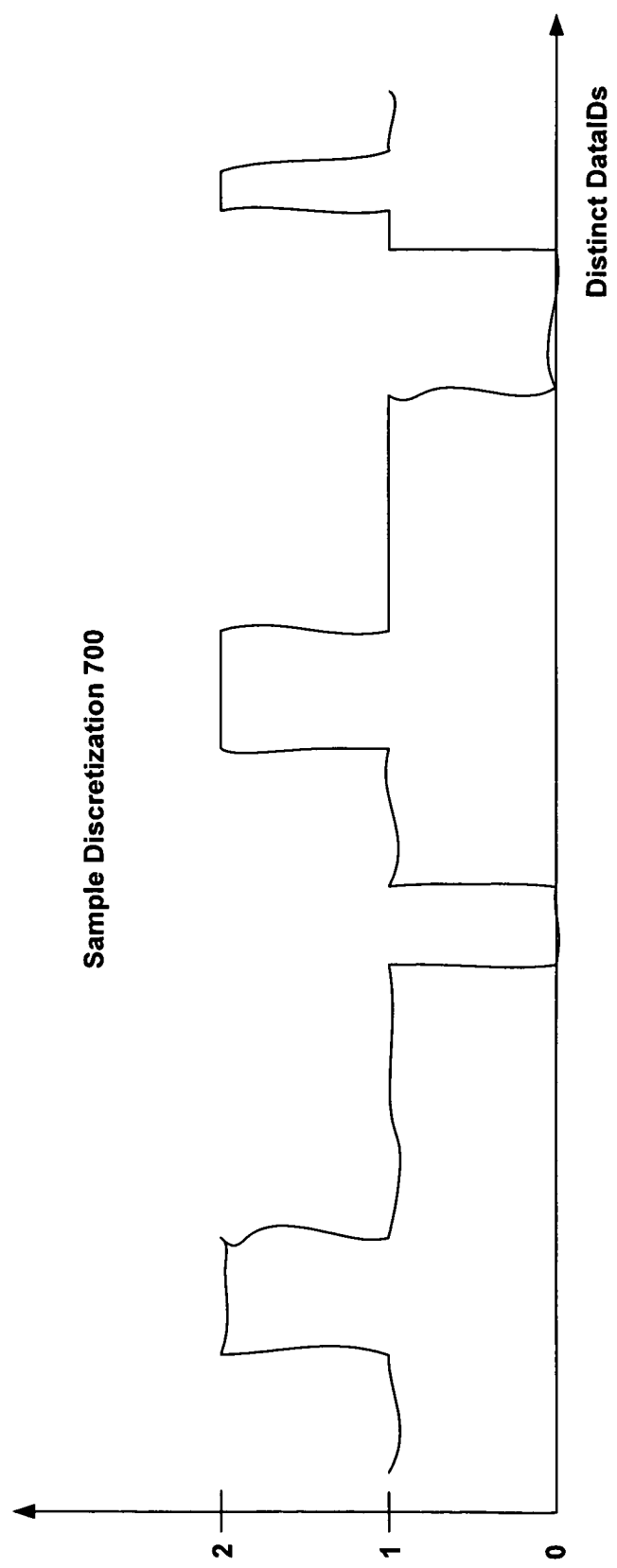
FIG. 7 is an example of a discretization of real world data, such as text and float values, for use in connection with histogram computation in one or more embodiments herein.

For the situation where few duplicates exist per DataID, there are lots of distinct DataIDs, but no skewed cases. For instance, consider the case of lots of distinct DataIDs, e.g., 100 million-1 billion rows of 1 billion rows, like the case when somebody sorts by Transaction ID or something similar (e.g., lots of DataIDs, very few duplicates). The distribution in that case will look something like the distribution 700 of FIG. 7, showing occurrences on the y axis and distinct values on the x axis.

In this situation, an accurate histogram is not feasible and it is also not practical to execute a Query Kernel request for filtered COUNT ( ) and obtain a huge data cache (lots of distinct values→high cardinality→big data cache).

Thus, a discretization method can be used in such a situation, i.e., a set of continuous DataIDs are mapped (adjacent with respect to their order) to discrete counterparts, and then the histogram (statistics) is built on the discrete values. The concept is illustrated in Table II below.

TABLE II

Illustration of Discretization

| Ordered DataID | Count | Ordered Discrete Group (GroupID) |
|---|---|---|
| 72 "Airplane" | 300 | G#1 (total 714 rows) |
| 12 "Bus" | 14 | G#1 |
| 92 "Car" | 400 | G#1 |
| 6 "Helicopter" | 250 | G#2 (total 707 rows) |
| 31 "Jet" | 213 | G#2 |
| 82 "Motorcycle" | 240 | G#2 |
| 32 "Ship" | 4 | G#2 |
| 91 "Spaceship" | 605 | G#3 (total 711 rows) |
| 44 "Submarine" | 106 | G#3 |

A running sum can simultaneously be computed over the GroupIDs, as shown by Table III.

TABLE I

Illustration of Running Sum in Discretization Case

| Ordered GroupID | Running Sum (count of rows prior to this group) |
|---|---|
| G#1 (72, 12, 92) | 0 |
| G#2 (6, 31, 82, 32) | 714 |
| G#3 (91, 44) | 1421 |

Using this discretization, the same algorithm as above can be used, except instead of obtaining the statistics regarding the exact number of occurrences of each DataID (SELECT DataID, COUNT( ) GROUPBY DataID) from the Query Kernel, the number of occurrences of values is obtained within the discrete ordered groups, basically, by performing the following internal query:

```
SELECT GroupID, COUNT
GROUPBY GroupID
WHERE <user-specified-predicate>
```

It is noted this is a generalization of the same algorithm described above for nicely distributed, average number of duplicates, but first going through a level of indirection (the discretization phase). More specifically, the case where data is distributed nicely is just a particular case where the discretization is actually 1→1 and DataID==GroupID (one Group has exactly one value).

With respect to how the Query Kernel can work with the GroupIDs since GroupIDs are concepts outside the Query Kernel (which can only deal with DataIDs), one general solution is to feed a segment query with a "virtual" column the same way "proxy" columns work for foreign key (FK)→primary key (PK). This virtual column returns the GroupID corresponding to the actual current storage row DataID.

Another solution, well suited for cases where 1 billion DataIDs are present, the billion distinct DataIDs correspond to numbers, not to strings, and those can be "encoded by value". This solution works well for columns holding billion of distinct numbers, but not for columns holding billion of distinct strings.

With respect to the case of 1 billion of distinct strings, meaning random access memory inside the Query Kernel during lookups to resolve DataID→GroupID, string compares are not necessary when computing the discrete groups, since at least in the case where a hierarchy over that set of data is accessible, the position of DataID will be sufficient to identify the group#. One solution is to enforce a "if v1>v2=>did1>did2" property not just when encoding by Value, but also when encoding by Hash. While doing this enforcement comes with a cost, this cost is paid at processing time, not at query time. In addition, this approach would have a few other benefits including the ability to improve Query Kernel performance when using OR slices (by passing something like did>v1 AND did<v2) as well as improving hierarchy iterators by "dematerializing" them and having a synthetic function like pos=did-XM_DATA_ID_NULL).

Basically, the encode by value uses a function f:value→DataID for which the following property holds:

```
IF value1<value2
  THEN DataID1<DataID2
``` which is the other way around if a DataID is smaller than another DataID (DataID for NULL excluded), in which case the values will also be ordered the same way.

This means that the relative order of DataID corresponds with the relative order of sorted values, therefore adjacent DataIDs can be grouped because they correspond to adjacent sorted values. One grouping strategy that does not require any random memory access can be to partition the whole space of distinct DataIDs in (Min-DataID . . . Max-DataID) into relatively equal (numeric) intervals by applying a simple function mapping DataIDs to GroupIDs: g:DataID→GroupID:

```
g(DataID)=DataID/sizeofinterval
g-1(GroupID)=[GroupID*sizeofinterval, (GroupID+1)*sizeofinterval-1)
```

Other grouping algorithms and strategy can be histogram based where the boundaries set are described below where the subject of determining the data patterns is addressed.

This discretization thus allows the space of DataIDs to be compressed into the smaller space of GroupIDs, and have a higher number of duplicates for each occurrence of a GroupID, which reduces the problem to the one solved above for the case of nicely distributed DataIDs.

Figure 8:
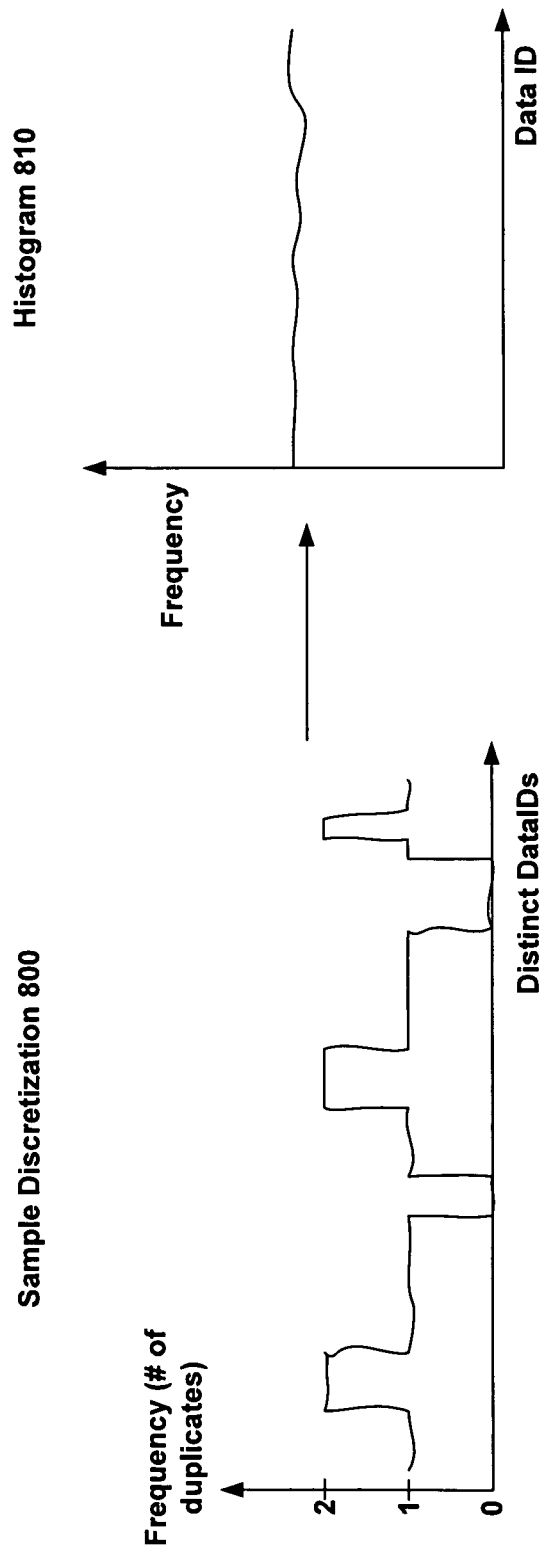
FIG. 8 is an illustration of characterization of a histogram according to one or more pre-set "shapes" of data in accordance with embodiments described herein.

Once the statistics 810 regarding the groups of DataIDs 800 are obtained from the Query Kernel, as shown in exemplary fashion in FIG. 8, a query of the following form is executed:

```
SELECT GroupID, COUNT
GROUPBY GroupID
WHERE <user-specified-predicate>
```

Here, the matching of the SKIP/TOP window is done over the running sum coming from statistics, and the actual candidate GroupIDs are received for which rows are to be output.

This candidate GroupIDs (e.g., G#12, G#13, G#14) will be expanded into a list of candidate DataIDs:

```
SELECT DataID, line#[, cline#s]
WHERE <user-specified-predicate>
  AND DataID IN (.... long expanded list of candidate DataID ...)
```

This is beneficial, since for DataIDs by value (due to the properties of encoding by value function that we already discussed), the additional predicate that filters the selected DataIDs can be rewritten (to allow faster Query Kernel evaluation) as:

```
SELECT DataID, line#[, cline#s]
WHERE <user-specified-predicate>
  AND DataID >= min(DataID in G#12)
  AND DataID <= max(DataID in G#14)
```

The result in this case will be a set of special "light" data caches, which are suitable for easily applying a sort algorithm described below for the even more extreme case of data distribution.

It is noted that cline#s for this type of data patterns may not need tracking, and instead of a column based sorting, a standard sort algorithm can be employed that is unaware of contiguous chunks of DataIDs. The reason is that tracking cline#s, when almost all are==1, is unnecessary overhead. The theoretical inflection point is when the average value of contiguous chunks of filtered DataIDs is cline#s>4, though the practical limit is probably a bit higher. In one optional embodiment, this value can be estimated based on predicate selectivity and/or average RLE run of sorted column.

Figure 9:
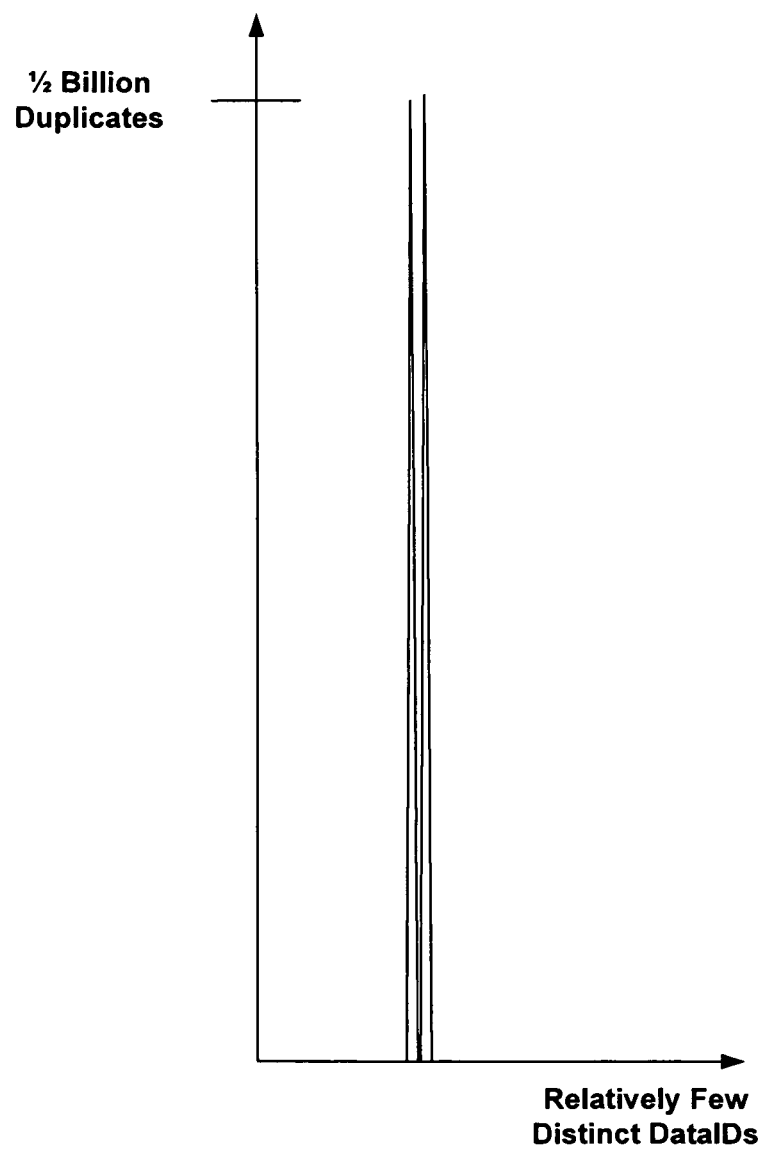
FIG. 9 illustrates a sample distribution with relative few distinct data values, such as a field having male or female values, where the data is represented in one or more spikes.

For the situation of a spiked data distribution, with few DataIDs, but billion of duplicates, consider the data distribution for the [Gender] column over a set of 1 billion rows. In this regard, statistics will be obtained indicating two distinct DataIDs with ½ billion duplicates each, as shown by sample distribution 900 of FIG. 9. If it happens that the window is on the edge, all 1 billion rows will need sorting. Even if it is determined that only 1 distinct DataID is in the selected window, that still means a subsequent query asking for that row will return a data cache with ½ billion rows, if no filter or if the filter selectivity is such that almost everything is included).

One property that can be leveraged on this pattern of data is that those spiked DataIDs are likely compressed in RLE form. This means that the column on which the sort is performed likely has long RLE runs. So, instead of sorting rows by rows, the RLE sequences can be sorted according to a column based sort, again, in the case of no filter being present. Due to the power of RLE, this is expected to be orders of magnitude faster.

If a filter is applied, however, sorting cannot be performed directly based on the RLE sequences since some rows may not be included in the output set. In this case, a special Query Kernel request is generated to get the cline#s (contiguous chunks of rows that passed the predicate), and the sort is performed on the composite key (DataIDs, storage-line#s) while tracking also the cline#s, which will indicate how many rows are valid ones with unchanged DataID on sort column matching the predicate.

Figure 10:
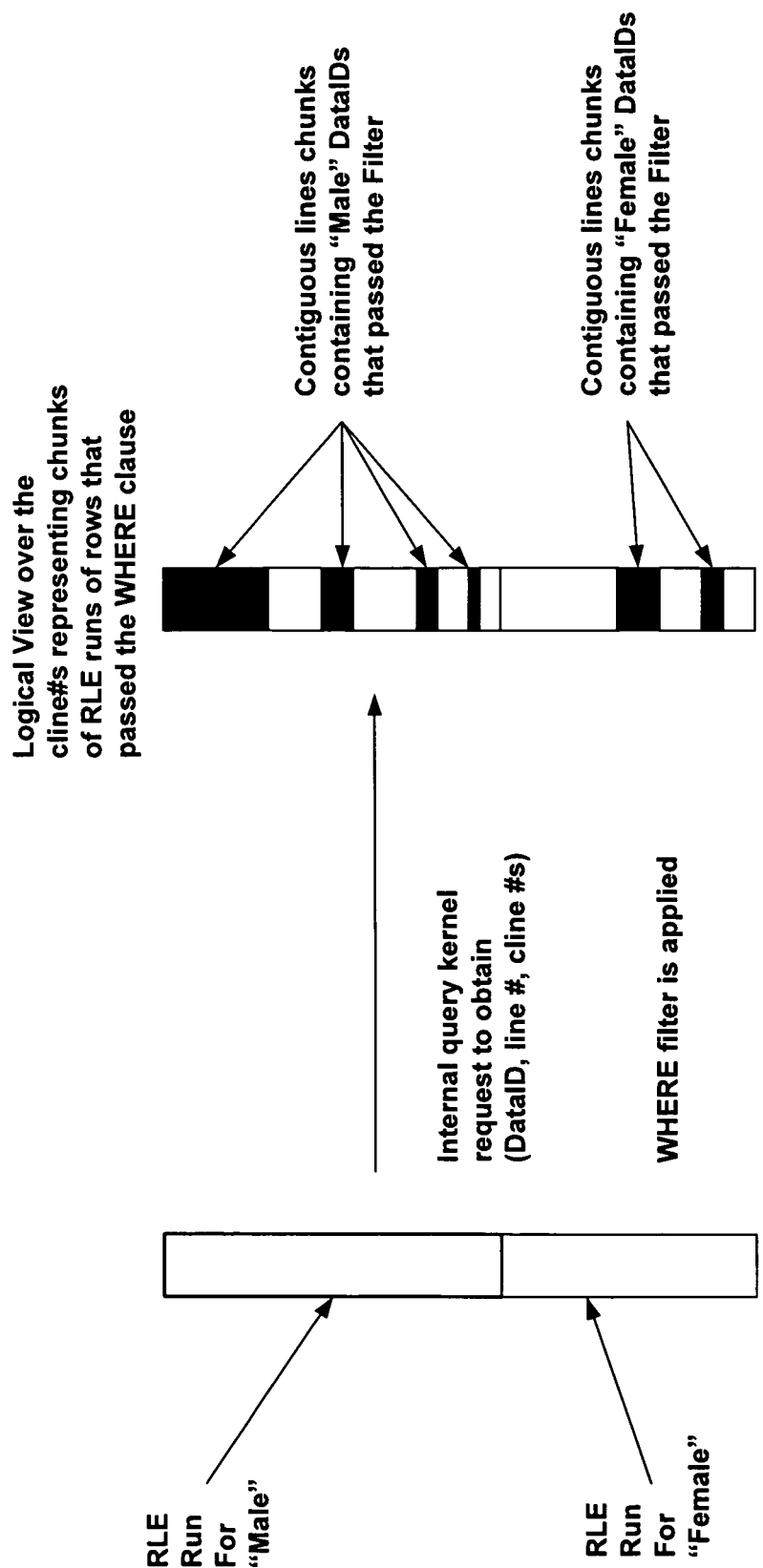
FIG. 10 is a block diagram illustrating the filtering of the sample distribution with a few spikes of data values consistent with run length principles.

FIG. 10 is a logical view of what will happen. For the male and female RLE encoded data, an internal query is sent such as:

```
SELECT DataID, line#, cline#s
WHERE <user-specified-predicate>
```

In return, a data cache is returned from the Query Kernel point of view, but internally we will plug a special "light data cache" (more details below), which does not need to support aggregations and that will fit better for the next operations involving column based sorting of the chunks of contiguous lines that passed the filter, also described in more detail below.

For a skewed data distribution, in turn, this represents the most generic case in which a billion of distinct DataIDs are present, with some of them unique (never duplicated), but still have some DataIDs with ½ billion values duplicated, e.g., spiked DataIDs.

Figure 11:
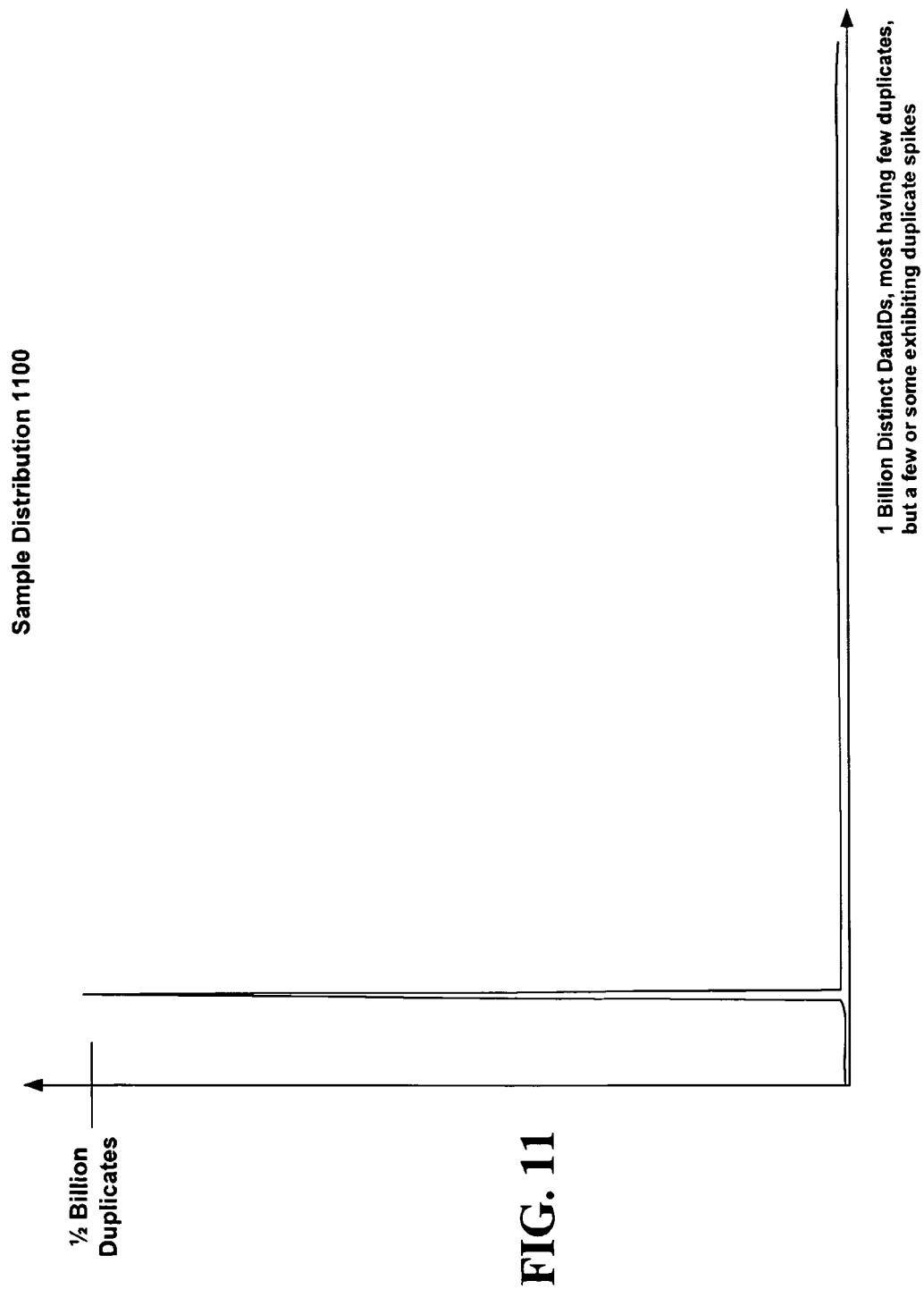
FIG. 11 is an illustration a sample distribution with a single predominating value exhibited as a spike, with the rest of the values represented relatively uniformly.

One example distribution 1100 shown in FIG. 11 includes a table with 1 billion records, half of the values on the column being NULLs and the other half being almost entirely non-duplicated distinct DataIDs. For instance, some databases may have an address for each employee, which tend to be unique, but may not have record data for half of the employees, and thus the "Don't have address data" value is duplicated many times.

In this case, the solution targeting a billion distinct DataIDs (using discretization) will have trouble dealing with the spike and the solution that targets the spiked case and takes advantage of long contiguous runs of unchanged DataIDs, will have trouble dealing with windows over DataIDs that have no duplicates at all. Basically, cline#-s can be carried, but all sequences of rows that match the filter will have their own distinct DataID, and therefore overhead caring about cline#s is not necessary.

Figure 12:
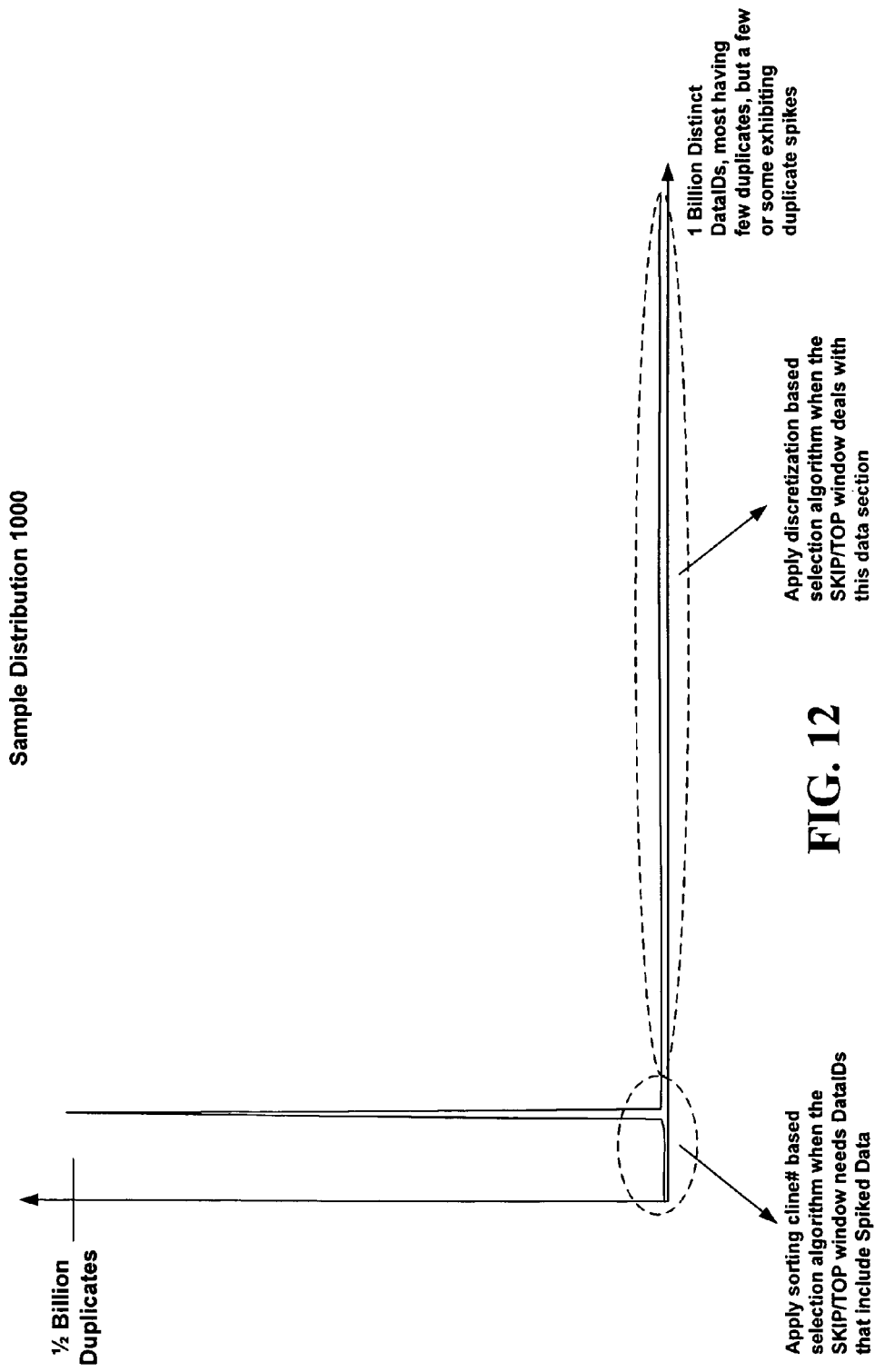
FIG. 12 illustrates a representative way to handle processing of a query implicating filter and/or sort operations over a sample distribution of data having a few predominating spikes with the rest of the values represented relatively uniformly.

In such case, the approach is to use an execution plan appropriate to the "local" distribution of data. For this case, the global data distribution is not of concern, but rather how data is distributed for the particular window of data that was requested is of concern. This is illustrated in FIG. 12 (see Sample Distribution 1000). If the query and the window implicates the spike, then the spiked data algorithm can be applied. If the uniformly distributed part is implicated, then the discretization technique can be applied.

To achieve this, again, a histogram and statistics are gathered. To compute the distribution histogram, sampling is performed to find the spikes. In this regard, it is desirable to know the general pattern of data in order to choose appropriate execution strategy. If a candidate DataID for a requested window is known to be involved in a "spike", e.g., estimated >1 million duplicates or other threshold, or not.

For the case when we discretization is performed (when DataIDs have very few duplicates and we want to group them together), how to split the groups of adjacent ordered DataIDs is estimated, i.e., how many in each bucket. One way is to split the whole min-max space of distinct DataIDs in equal intervals, and use the very fast DataID<->GroupID conversion that relies on fixed interval sizes for each group.

For this, a histogram can be built, which can be done at processing or at query time, if needed. The histogram can be based on sampling, e.g., either random or checking ⅟₁₀₀₀ or so values and then extending that histogram estimate over the entire space. The histogram should be able to be built in a relatively fast time (at ⅟₁₀₀₀ ratio even since 1 billion rows is only 1 million random memory accesses).

Random sampling over this data also informs whether a given DataID is a spike or not, e.g., if 1,000,000 samples are taken and a DataID is found half of the time. This list of "spiked" DataIDs can be tracked, which, for 1 billion rows, should be less than 100 distinct values. In addition, the window can be checked if it includes this DataID or not before taking the decision to do sorting based on cline#s or not (e.g., the case where all DataIDs are distinct).

With respect to VertiSort, or column based sorting, it was mentioned above during the discussion of the skewed distribution (though it applies for most other cases) that in order to do sorting over 1 billion rows, the fact that data is VertiPaq-ed or compacted according to column based sequences of values (taking advantage of the RLE sequences/buckets on the sorted and/or filtered columns) is leveraged.

In this regard, awareness of the internal (storage) RLE lengths (by making Query Kernel return not just data but also meta-information about the contiguous chunks of filtered DataIDs) allows minimization of the sorting process using those RLE lengths. Thus, in the case where 1 billion rows with unchanged values are present, even if they are chunked by the filter, physical sorting over the returned Data Cache is not required.

For this to happen, A) some changes in Query Kernel are made, so it returns not just data but also metadata (this is actually an optimization at bucket processing level to avoid unnecessary scans, since this can also be done in a brute force fashion by doing aggregations of contiguous lines in a special data cache, B) a special "Light Data Cache" can be implemented that can track (DataID)→(line#, cline#s) (line#, cline#s)... which will allows complexity reduction of the sort operation from n*log(n) where n is number of rows, to m*log (m) where m is the number of distinct DataIDs in the window and/or C) implement a special aggregation of "Light Data Caches" that allows fast in-place merge of data caches reused by the same processor for different segments as well as fast multi-merge during final step when all "Light Data Caches" produced by Query Kernel are aggregated.

Figure 13:
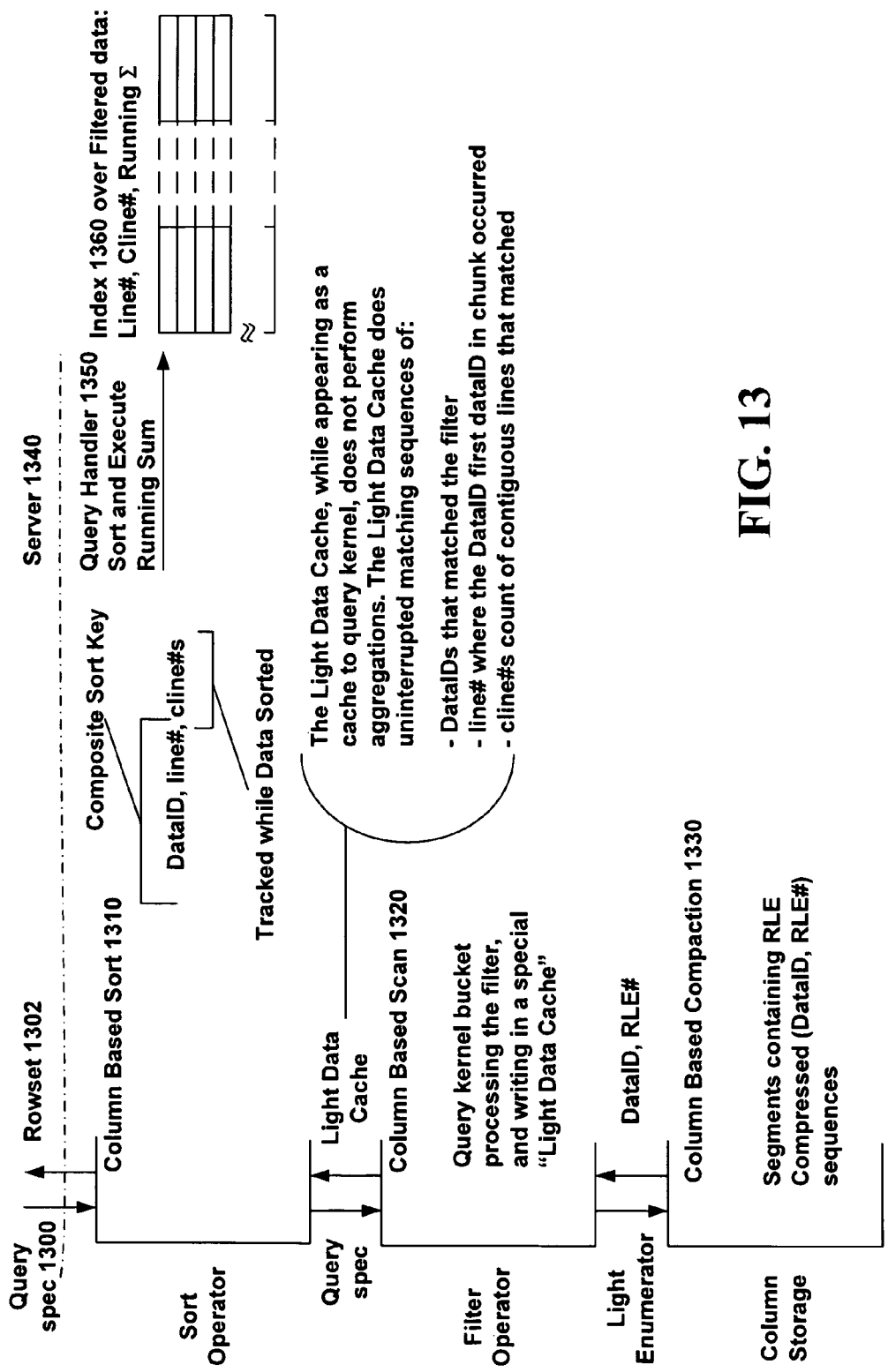
FIG. 13 illustrates an exemplary non-limiting optional implementation of a light data cache in accordance with one or more embodiments set forth herein.

FIG. 13 is a representative view over the stack of components involved in producing the window over sorted data. This includes the query spec 1300 received by server 1340 and handled by query handler 1350, which can generate an index 1360 over the filtered data include line#, cline# and running sum. In this regard, following the processing chain bottom up, the column based compaction 1330 is leveraged during application of a column based scan 1320. As mentioned, a light data cache may be used in connection with the column based scan 1320, though it does not perform aggregations. Lastly, the result set from the column based sort 1310 is represented as rowset 1302 for return to the client.

In this regard, as illustrated, applying filters over a long RLE sequence (e.g., Gender) may still return chunks of contiguous DataIDs (cline#s). They are virtual chunks though, representing filtered contiguous data. Thus, sorting of (DataID, line#, cline#s) can be performed by using the (DataID, line#) as a composite key, and tracking the cline#.

It is also noted that an RLE chunk may be fragmented by the filter operation into something like (DataID1, line#1, cline#s1)
(gap)
(DataID1, line#2, cline#s2)
(gap)

(DataID1,line#3, cline#s3)
(DataID2,line#4, cline#s4)
(gap, etc...)

Since it is desirable to preserve the order of storage lines in the final view, the line#-s corresponding to same DataID can be linked, even if they are gapped, and have something in the form:

(DataID1) -> (line#1, cline#s1), (line#2, cline#2), (line#3, clines#3)
(DataID2) -> (line#4, cline#s4)

Sorting now is much faster (sorting only the distinct DataIDs visible inside the final window), and not the actual lines.

Once sorted, those results can be aggregated in an index specific to the WHERE clause, that also tracks the Running Sum, e.g., the Line# is kept, but the cline# is not needed anymore as it can be inferred from Running Sum.

Thus, the format of this index can be viewed as a table containing (line#, running sum). Note that the index is specific to the WHERE clause, and can be optionally cached. If cached, it may be worth to keeping the cache as a physical storage table, both for compression reasons, and for this data to be fed back to the Query Kernel in case subsequently more restrictive AND clauses apply on the cached WHERE.

With respect to Query Kernel support for cline#s and "light data caches," the Query Kernel can be used for getting some statistics (e.g., GROUPBY over filtered data) for our selection sort, and Query Kernel is used for getting the actual filtered rows once we know the DataIDs involved.

But the rows per se are not output, instead using the (DataID, line#, cline#) that helps perform the bucket oriented sort algorithm.

With respect to getting the line#, cline#, for queries requesting rows in the form of (DataID, line#, cline#) some virtual columns that return the line#-s (instead of DataIDs) can be hooked, and an aggregation in the "light data cache" can be achieved by counting each of the lines, but that might be slow as Query Kernel will use some virtual mechanism to get the line, or a whole fake column could be materialized, though this would also break the purity of the scan/bucketization as each line will have a different line#. Another "fake" (but pure) column would have been used for counting the actual line#-s that match the filter (cline#). This would also be slow though in this case, a LightEnumerator can be simulated that always returns the Pure( ) value.

A faster solution would be to add to Query Kernel the logic to output the (line#, cline#) into a special data cache.

The bucket processor inside the Query Kernel in this case will evaluate predicates for each bucket, but once the WHERE phase is for each match:
  if where is pure and the bucket for the sorted column is pure—it needs to send to data cache
    a. the pure (DataID) of sorted column—as DC coordinate
    b. the line# where the bucket begins—as DC coordinate
    c. the bucket size (cline#)—as aggregated measure
      if where is pure and the bucket for the sorted column is impure—or
      if where is impure and bucket for the sorted column is pure—or
      if where is impure and bucket for the sorted column is impure a. the current DataID of sorted column—as DC coordinate
b. the line# where the matching row was found—as DC coordinate
c. (cline#)—as aggregated measure Stopping after SKIP+TOP matches is optional, but some cases (e.g. data NOT SORTED but FILTER applied) where it is known that once the SKIP+TOP # of rows where accepted by the filter (from a segment), more data is not needed for the window. For the internal request, segment query can be configured to stop faster and not scan any more data, as it will not be output anyway. Column based scan can be stopped at that point.

With respect to the light data cache, aggregations on the (DataID, line#, cline#) data obtained from Query Kernel are not performed, though it should be ready for sorting. For this, instead of using a standard DataCache, a dedicated "light" data cache can be hooked to Query Kernel that can't do any real aggregations, but accumulates the (DataID, line#, cline#) in a form that will ease sorting.

Figure 14:
FIG. 14 illustrates the notion of a cell of data for optional data processing techniques described herein.

From the point of Query Kernel the data cache looks (logically) like FIG. 14, with represented cell 1400. It is noted in the case of discretization, DataID would be replaced in FIG. 14 with GroupID.

In reality, the same (line#, DataID) coordinate are not hit, and summing is unnecessary (some coalescing of cross segment rows containing same DataID could be performed, but this is different than "standard" summing since line#-s are actually different).

For a given segment, it is known Query Kernel scans sequentially the data from low line#-s to high line#-s, so the line#s will be in increasing order (in the boundary of a segment). This means that the line#-s will come "pre"-sorted.

For fast sorting, based on primary sort key=DataID and secondary sort key=storage-line#, distinct DataIDs are tracked, and the sequences of contiguous (line#-s, cline#s) within a given segment are also tracked.

A hash (DataID)→ordered-sequence-of (line#s, cline#s) for each segment can be used to achieve this. In the end (during multi-merge phase), those ordered-sequences coming from different segments in O(1) time can be collated since if (seg#1<seg#2), then all lines in seg#1 are prior to lines in seg#2.

Figure 15:
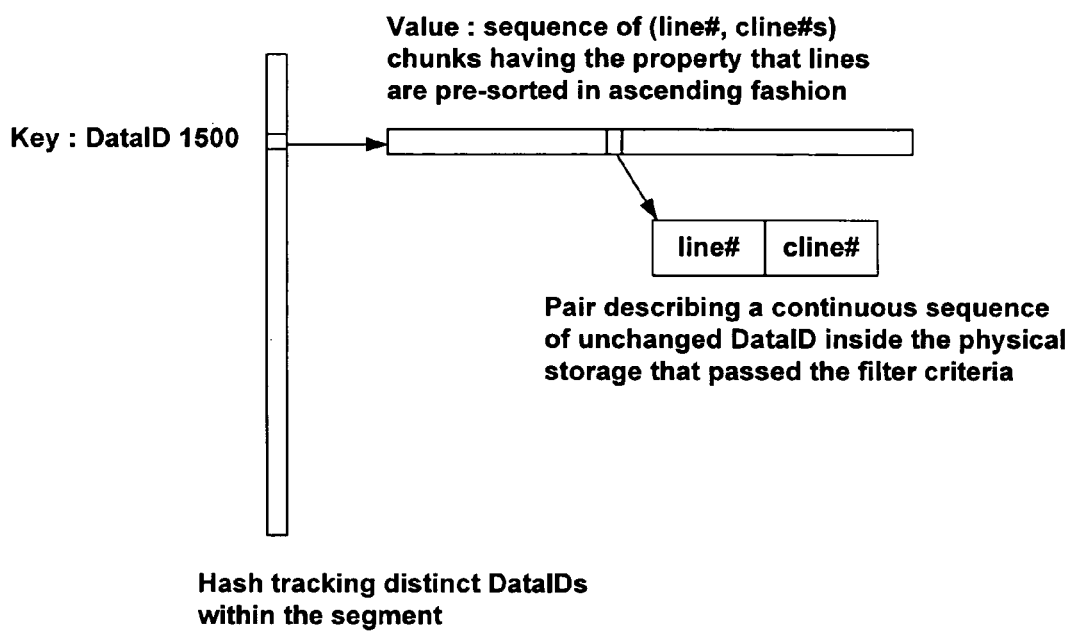
FIG. 15 illustrates an optional implementation of a hash tracking data structure.

Physically for each segment, the hash will have something like FIG. 15, with Key: DataID 1500 pointing to a value described by a line#, cline# pair. Incremental allocators for incremental policy or estimate based policy can be used for growing memory associated with the sequence of chunks.

For actual sorting of DataIDs, or GroupIDs if discretization was applied, sorting of distinct values in a window can be performed before looking at the actual value (if DataIDs by value are used, if GroupIDs are used, or if hierarchy information is available).

With respect to merging of light data caches, multiple "light" data caches coming from Query Kernel may be obtained as result of the internal request. This is because actually Query Aggregator schedules multiple segment queries (one per segment) on multiple processors and in the end, up to the number of processors may result in distinct data caches.

During the final phase, multiple hashes in O(m) time can be fast merged (where m=distinct DataIDs within the visible window) by taking advantage of the property that all line#-s within a segment are either bigger or smaller than all lines within another segment, meaning that for a given DataID, a coalescing of lists of chunks will work.

For building the final Index, this is basically an index dependent on WHERE clause, SORT column and set of (usually skewed) DataIDs.

From final Query Kernel result, the following data is obtained in the most generic case:
(DataID)→(line#, cline#s), (line#, cline#s), (line#, cline#s) . . .

This was sorted in the step above where multiple unsorted data caches were obtained that were sorted and subsequently multi-merged. Then, the following data is had:
(sorted-DataID)→(line#, cline#s), (line#, cline#s), (line#, cline#s) . . .
from which the index is built:
(line#, running-sum)

The line# is the storage line number as it came from Query Kernel

The running sum gives the virtual line# on which the (SKIP, TOP) window is positioned. This index can also be cached, which can avoid rescanning the data for building the light data caches, and scan might be fast enough.

With respect to output rows, the query handling component code-paths and related UI component that output rowsets can use same mechanism. The rowset created based on the query spec (columns selected) to which (line#, chunk#) as producer is added and directly decoded rows are output (get DataIDs from corresponding lines and go to dictionary to fill the rows with results). The ISAM type of access is therefore just a particular case of access where only a single (SKIP, TOP) value for (line#, chunk#) was added.

With respect to execution flow, a modular approach is taken in one implementation.

Figure 16:
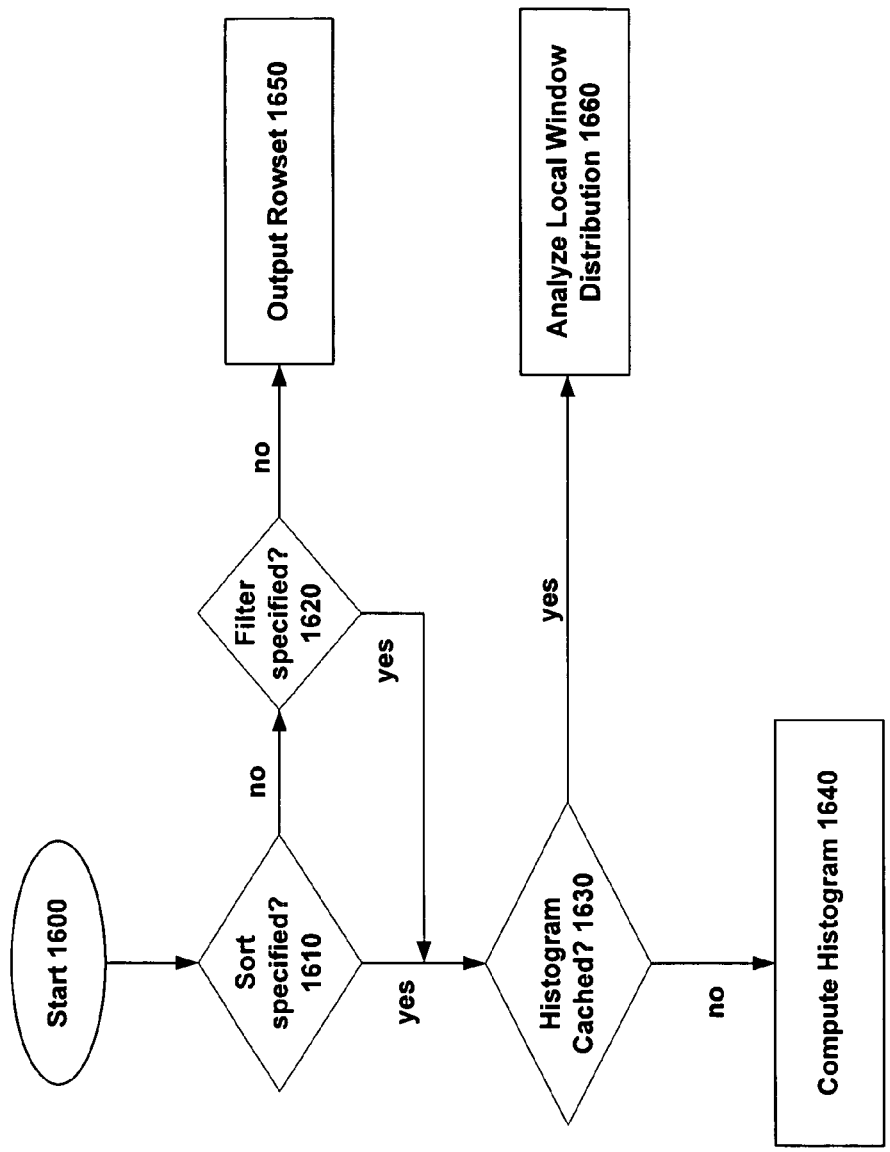
FIG. 16 is a flow diagram illustrating an exemplary, non-limiting process for computing a histogram in accordance with embodiments described herein.

FIG. 16 illustrates an Analyze Query Spec Module process flow. After start 1600, if sort specified at 1610, then if a histogram is not cached already 1630, then the histogram is computed at 1640. If the histogram is cached, then local window distribution is analyzed at 1660. If a sort is not specified at 1610, then it is determined if a filter is specified at 1620. If so, then flow proceeds to 1630. If not, then the rowsets are determined and output at 1650.

Figure 17:
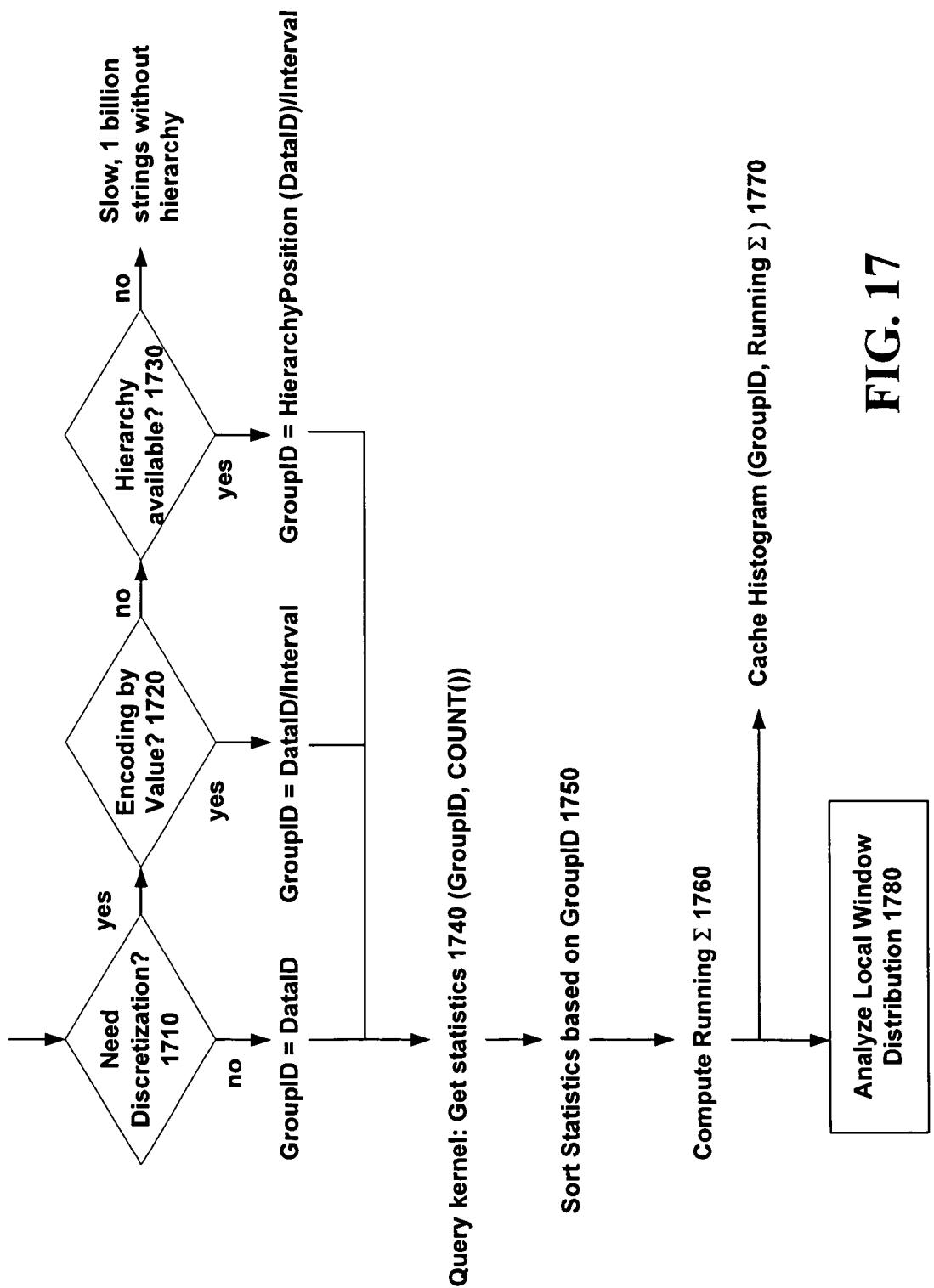
FIG. 17 is a flow diagram illustrating an exemplary, non-limiting process for obtaining and using statistics in accordance with embodiments described herein.

FIG. 17 illustrates a Compute Histogram Module process flow. Step 1710 determines if discretization is needed. If so, it is determined if encoding is by value at 1720. If not, then it is determined if a hierarchy is available at 1730. If not, then little can be done and processing may be slow. If discretization is not necessary at 1710, then GroupID-=DataID and flow proceeds to obtain statistics 1740, then to sort statistics based on GroupID at 1750 and to compute the running sums 1760. The histogram can be optionally cached at 1770 and lastly, the local window distribution is analyzed at 1780. Similarly, if encoding is by value as determined at 1720, then GroupID=DataID/Interval and the flow proceeds to 1740 again. If in turn a hierarchy is available at 1730, then GroupID=Hierarchy Position (DataID)/Interval and again the flow proceeds to 1740 as described previously.

Figure 18:
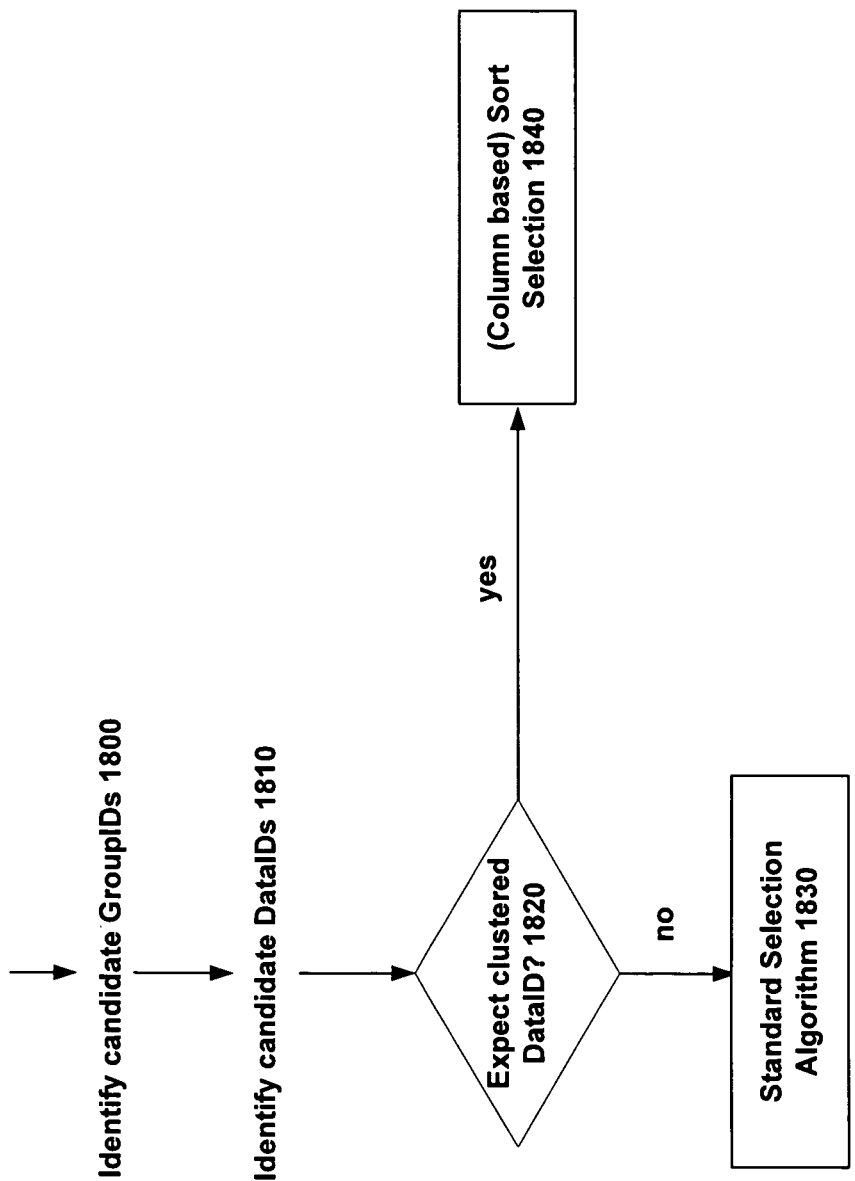
FIG. 18 is a flow diagram illustrating an exemplary, non-limiting process for determining which of a standard or a column based sort technique should be used in processing a query for a given window in accordance with embodiments described herein.

FIG. 18 illustrates an Analyze Local Window Distribution Module process flow. At 1800, candidate GroupIDs are identified. At 1810, candidate DataIDs are identified. Then, at 1820, it is determined if clustered DataIDs are expected. If so, then at 1840, the column based sorting technique is applied. If not, then at 1830, a standard selection algorithm 1830 is used.

Figure 19:
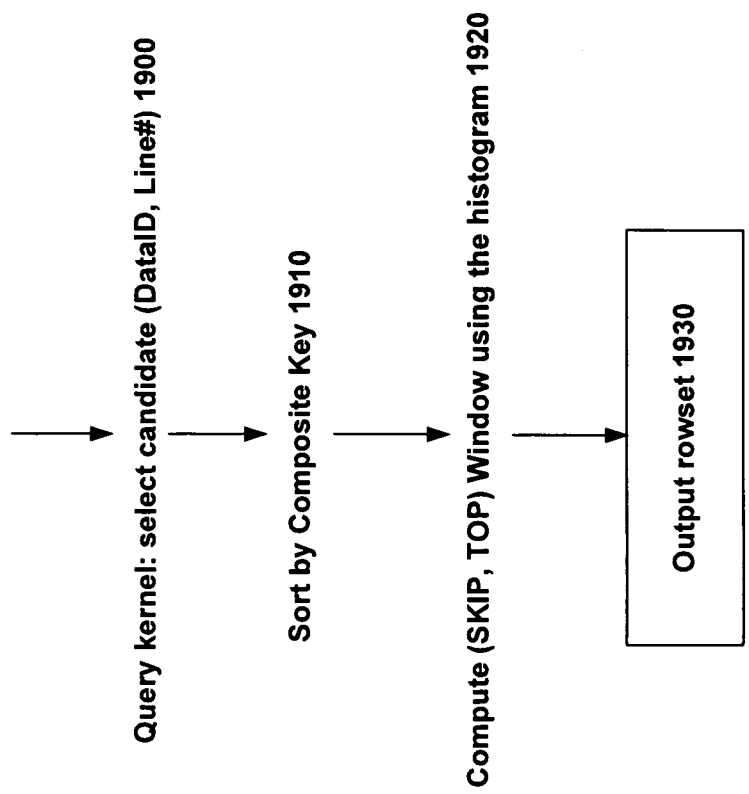
FIG. 19 is a flow diagram illustrating an exemplary, non-limiting process for sorting within a given window in accordance with embodiments described herein.

FIG. 19 illustrates a Standard Selection Algorithm Module process flow. At 1900, candidates (DataID, Line#) are selected. At 1910, the candidates are sorted by composite key. At 1920, the (SKIP, TOP) window is computed using the histogram. The rowset is output finally at 1930. In this regard, this is standard selection algorithm, which is useful for the case where huge windows are expected to be returned, e.g., the TOP 1 million rows+, over data on which very few duplicates (or contiguous chunks) are expected, e.g., average under 4 contiguous duplicates per DataID. In this case, it is not worth to track the contiguous chunks cline#s since the overhead outweighs the gains.

Figure 20:
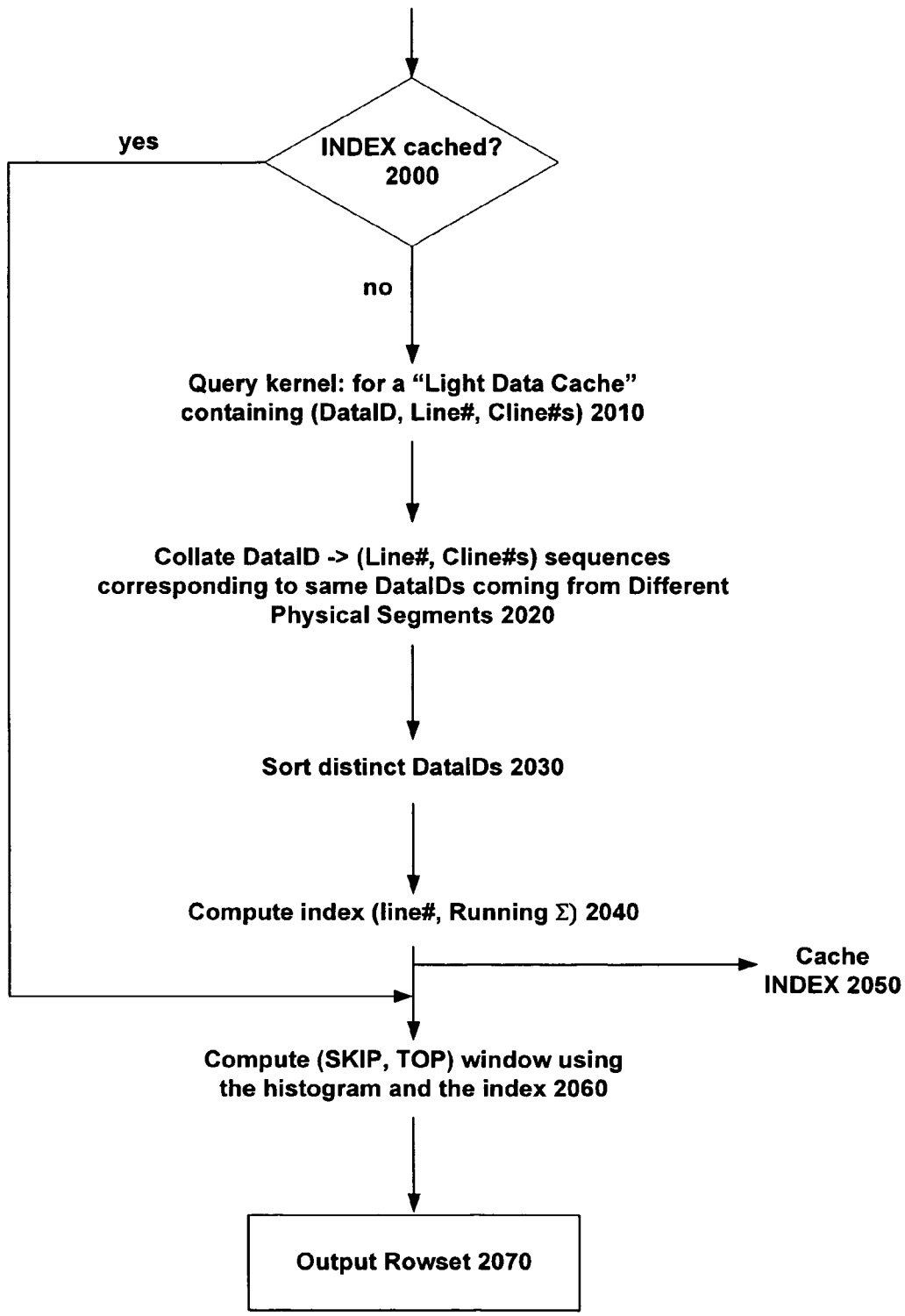
FIG. 20 is a flow diagram illustrating an exemplary, non-limiting process for processing queries using a light data cache in accordance with embodiments described herein.

FIG. 20 illustrates a VertiSort Selection Module process flow, which is described in much more detail below. At 2000, it is determined if an index is cached. If so, then the flow skips to 2060 to compute (SKIP, TOP) window using the histogram and index. If not, then at 2010, a light data cache with (DataID, Line#, Cline#s) is consulted. At 2020, the DataIDs are collated to (Line#, Cline#s). At 2030 the distinct DataIDs are sorted. At 2040, the index is computed (line#, running sums). The cache can be indexed at 2050 and then the flow again proceeds to 2060 for computation of (SKIP, TOP) window using the histogram and index. Lastly, at 2070, the rowset results are output.

For the Output Rowset Module, in one embodiment, a XMQueryRowset is generated based on the selected (potentially multiple) chunks of line#-s specified, and the rowset returned to the server as part of the client request results.

With respect to caching the histogram and index over filtered results, the "sorted statistics" describe what physical rows correspond to a (or any) window of viewed data (for a given filter and sort order). Thus, the current request can be fulfilled and this index discarded (if it was cheap to compute), or it can be cached and reused later, e.g., when user scrolls down, switches ASC to DESC sort order, adds a new column of data, adds a new AND or even OR clause, etc.

Caching is optional, but can save re-computing the same results and give a performance boost, especially during scrolling with respect to the same query. For instance, if the index over the filtered data can be saved, which holds (line#, running-sum) records, then two Query Kernel internal requests are avoided.

Also, caching can help in scenarios that involve the user adding more restrictive (AND) clauses to an existing WHERE. In this scenario, an (imperfect)-matching cached index containing the (line#, running-sum) super-set can be retrieved, and Query Kernel can be fed with line#s coming from this data (placed in column storage) and only the additional WHERE clause are passed (faster Query Kernel evaluation).

Cached (line#, running-sum) indexes do not have to store any actual DataIDs, (that is—and no granularity of any kind is specified), therefore they can be reused without any extra cost on queries that involve other columns in select, but have the same WHERE clause.

Once an exact cache hit is obtained, the XMQueryRowset can be generated by composing the windows of data from the cache stored line#-s and the line counts, e.g., by computing deltas on the running-sums). A variety of caching policies can be used, e.g., Using dedicated knowledge of usage patterns for UI scenarios to determine lifetime inside cache, using statistics from a Scheduler and memory cost of temp structure to determine value of the index, using cost value of the index f(CPU-Cost/Memory-Usage) to during eviction, to determine lifetime inside cache, using cost value of the index f(CPU-Cost/Memory-Usage) to determine whether to cache the item or not, etc.

Figure 21:
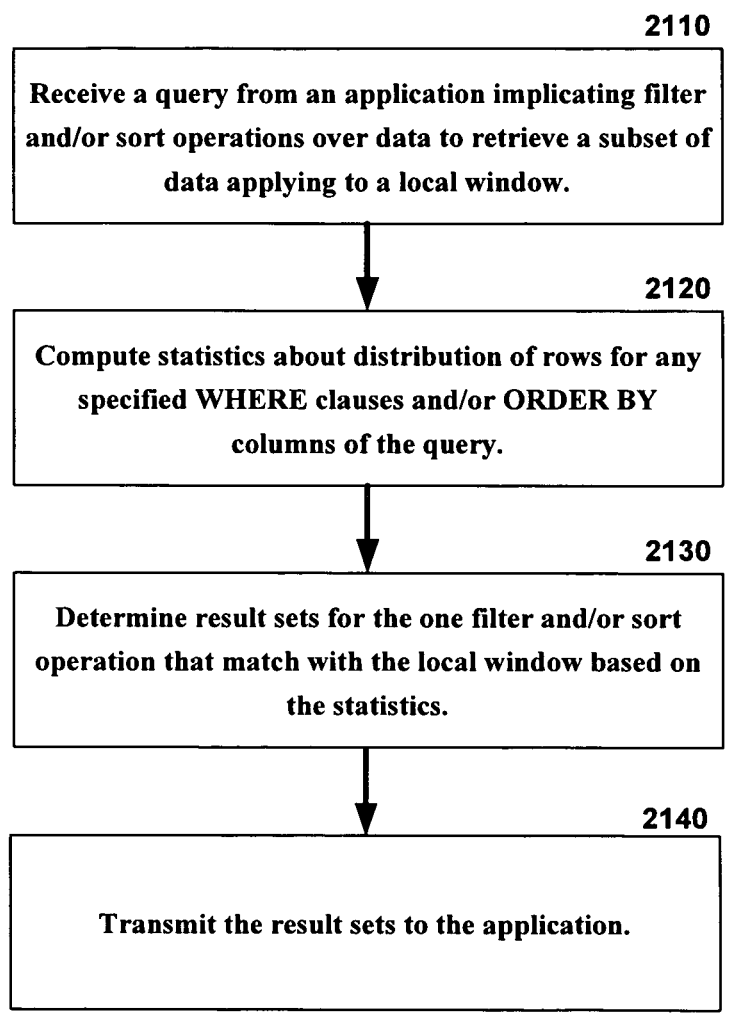
FIG. 21 is a flow diagram illustrating an exemplary non-limiting process in accordance with one or more embodiments.

A general method has thus been described, and is shown in FIG. 21. At 2110, a query is received from an application implicating filter and/or sort operations over data to retrieve a subset of data applying to a local window. Statistics about distribution of rows for any specified WHERE clauses and/or ORDER BY columns of the query are computed at 2120. Result sets, based on the statistics, for the one filter and/or sort operation are determined that match with the local window at 2130. At 2140, the result sets are transmitted to the application.

Figure 22:
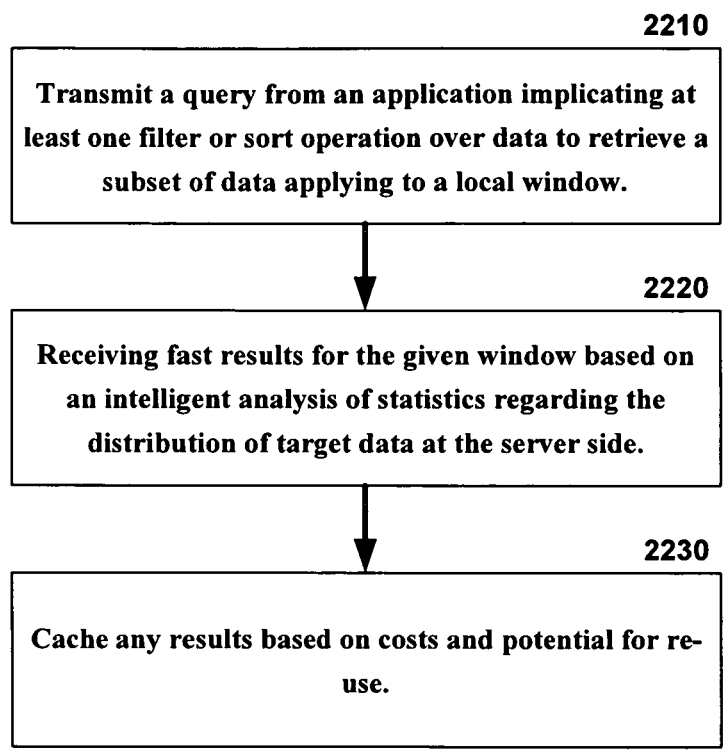
FIG. 22 is another flow diagram illustrating an exemplary non-limiting process in accordance with one or more embodiments.

FIG. 22 illustrates a flow from a perspective of a requesting client. In this regard, at 2210, a query is transmitted from an application implicating at least one filter or sort operation over data to retrieve a subset of data applying to a local window. At 2220, the result sets are returned based on the statistical based analysis described above. At 2230, one or more results or intermediate structures used in obtaining the results can be cached.

Supplemental Context Re: Column Based Data Encoding

As mentioned in the overview, column oriented encoding and compression can be applied to large amounts of data in various embodiments to compact and simultaneously organize the data to make later scan/search/query operations over the data substantially more efficient. In various embodiments, efficient operations are applied to the case of queries over large amounts of data implicating complex filter and/or sort operations by determining statistics over the windowed data, and leveraging those statistics during computation of results pertinent to the requested window.

In an exemplary non-limiting embodiment, after columnizing raw data to a set of value sequences, one for each column (e.g., serializing the fields of the columns of data, e.g., all Last Names as one sequence, or all PO Order #s as another sequence, etc.), the data is "integerized" to form integer sequences for each column that are uniformly represented according to dictionary encoding, value encoding, or both dictionary and value encoding, in either order. This integerization stage results in uniformly represented column vectors, and can achieve significant savings by itself, particularly where long fields are recorded in the data, such as text strings. Next, examining all of the columns, a compression stage iteratively applies run length encoding to the run of any of the columns that will lead to the highest amount of overall size savings on the overall set of column vectors.

As mentioned, the packing technique is column based, not only providing superior compression, but also the compression technique itself aids in processing the data quickly once the compacted integer column vectors are delivered to the client side.

Figure 23:
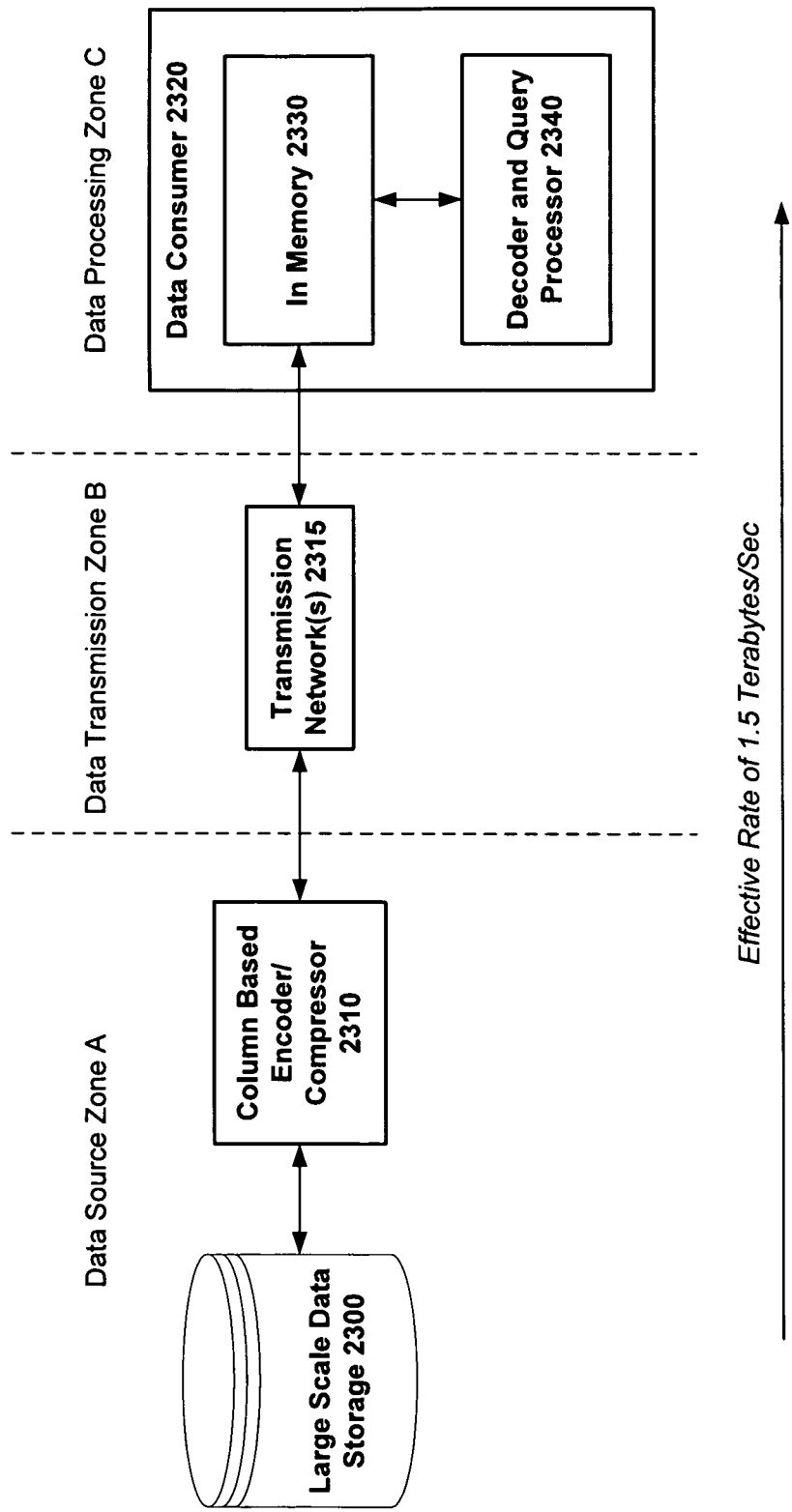
FIG. 23 is a general block diagram illustrating a column based encoding technique and in memory client side processing of queries over the encoded data.

In various non-limiting embodiments, as shown in FIG. 23, a column based encoder/compressor 2310 is provided for compacting large scale data storage 2300 and for making resulting scan/search/query operations over the data substantially more efficient as well. In response to a query by a data consuming device 2320 in data processing zone C, compressor 2310 transmits the compressed columns that are pertinent to the query over transmission network(s) 2315 of data transmission zone B. The data is delivered to in memory storage 2330, and thus decompression of the pertinent columns can be performed very fast by decoder and query processor 2340 in data processing zone C. In this regard, a bucket walking is applied to the rows represented by the decompressed columns pertinent to the query for additional layers of efficient processing. Similarity of rows is exploited during bucket walking such that repetitive acts are performed together. As described in more detail below, when the technique is applied to real world sample data, such as large quantities of web traffic data or transaction data, with a standard, or commodity server having 196 Gb RAM, query/scan of server data is achieved at approximately 1.5 Terabytes of data per second, an astronomical leap over the capabilities of conventional systems, and at substantially reduced hardware costs.

While the particular type of data that can be compressed is by no means limited to any particular type of data and the number of scenarios that depend upon large scale scan of enormous amounts of data are similarly limitless, the commercial significance of applying these techniques to business data or records in real-time business intelligence applications cannot be doubted. Real-time reporting and trend identification is taken to a whole new level by the exorbitant gains in query processing speed achieved by the compression techniques.

Figure 24:
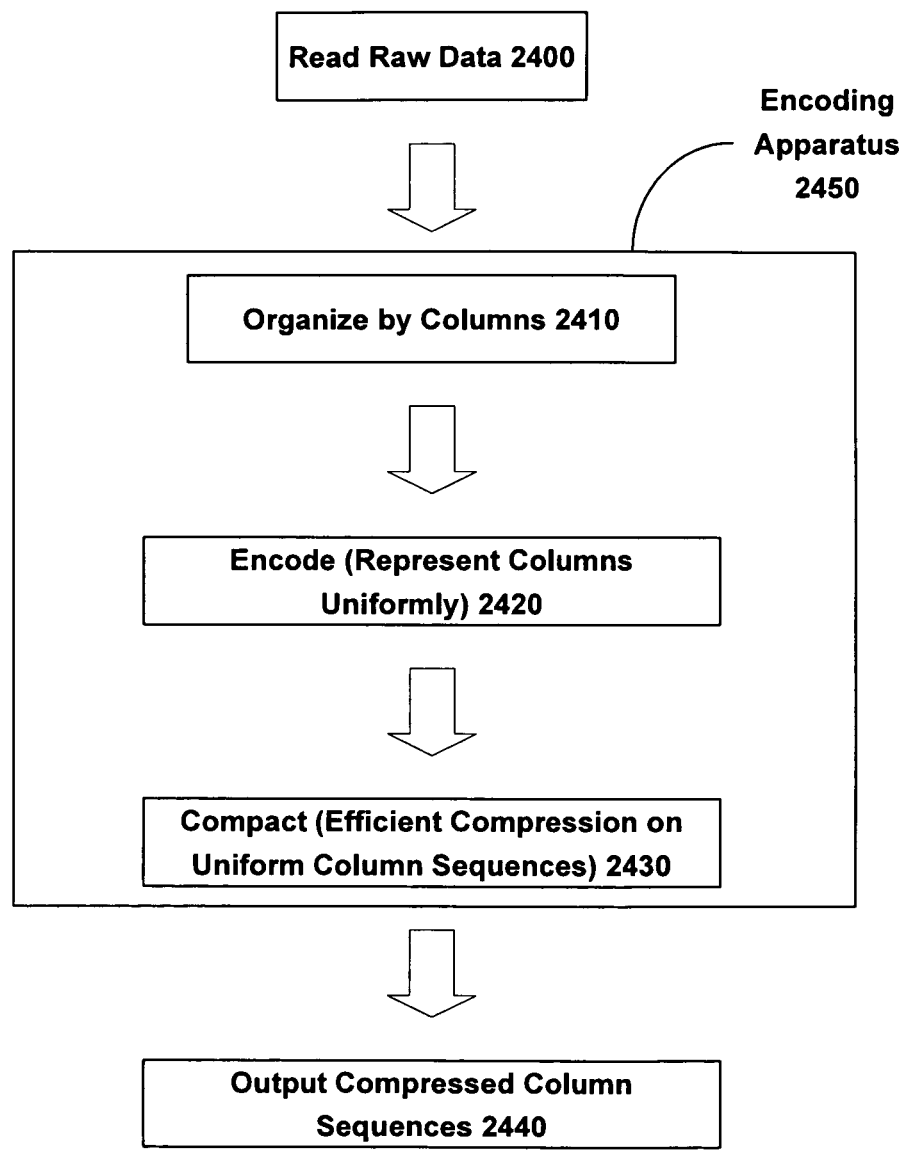
FIG. 24 is a block diagram illustrating an exemplary non-limiting implementation of encoding apparatus employing column based encoding techniques.

One embodiment of an encoder is generally shown in FIG. 24 in which raw data is received, or read from storage at 2400 at which point encoding apparatus and/or encoding software 2450 organizes the data as columns at 2410. At 2420, the column streams are transformed to a uniform vector representation. For instance, integer encoding can be applied to map individual entries like names or places to integers. Such integer encoding technique can be a dictionary encoding technique, which can reduce the data by a factor of 2×-10×. In addition, or alternatively, a value encoding can further provide a 1×-2× reduction in size. This leaves a vector of integers for each column at 2420. Such performance increases are sensitive to the data being compacted, and thus such size reduction ranges are given merely as non-limiting estimates to give a general idea of relative performance of the different steps.

Then, at 2430, the encoded uniform column vectors can be compacted further. In one embodiment, a run length encoding technique is applied that determines the most frequent value or occurrence of a value across all the columns, in which case a run length is defined for that value, and the process is iterative up to a point where benefits of run length encoding are marginal, e.g., for recurring integer values having at least 64 occurrences in the column.

In another embodiment, the bit savings from applying run length encoding are examined, and at each step of the iterative process, the column of the columns is selected that achieves the maximum bit savings through application of re-ordering and definition of a run length. In other words, since the goal is to represent the columns with as few bits as possible, at each step, the bit savings are maximized at the column providing the greatest savings. In this regard, run length encoding can provide significant compression improvement, e.g., 100× more, by itself.

In another embodiment, a hybrid compression technique is applied at 2430 that employs a combination of bit packing and run length encoding. A compression analysis is applied that examines potential savings of the two techniques, and where, for instance, run length encoding is deemed to result in insufficient net bit savings, bit packing is applied to the remaining values of a column vector. Thus, once run length savings are determined to be minimal according to one or more criteria, the algorithm switches to bit packing for the remaining relatively unique values of the column. For instance, where the values represented in a column become relatively unique (where the non-unique or repetitive values are already run length encoded), instead of run length encoding, bit packing can be applied for those values. At 2440, the output is a set of compressed column sequences corresponding to the column values as encoded and compressed according to the above-described technique.

Figure 25:
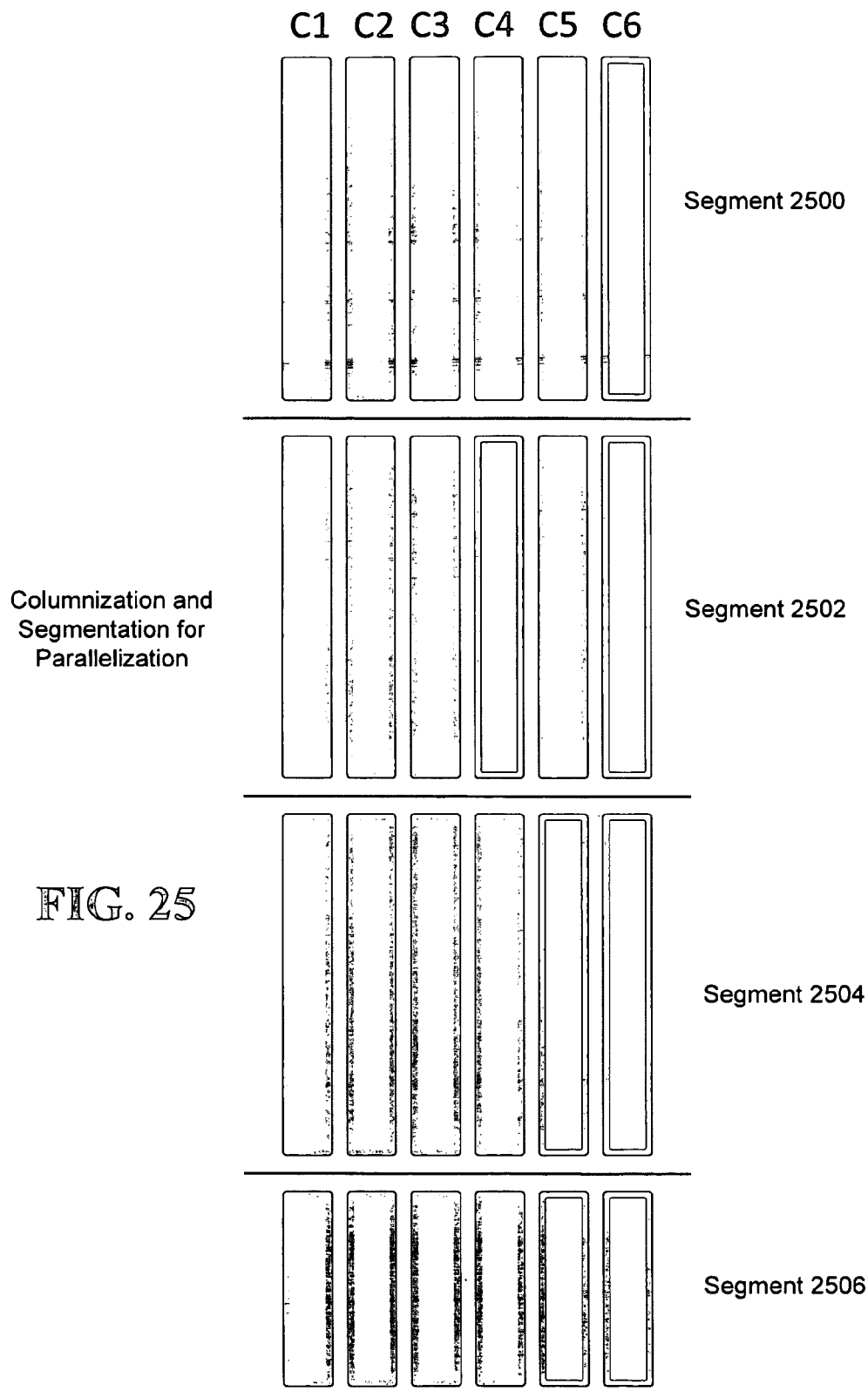
FIG. 25 illustrates that the work of in memory client-side processing of the column data received in connection with a query can be split among multiple cores so as to share the burden of processing large numbers of rows across the column organization.

In one embodiment, when compressed columns according to the above-described technique are loaded in memory on a consuming client system, the data is segmented across each of the columns C1, C2, C3, C4, C5, C6 to form segments 2500, 2502, 2504, 2506, etc as shown in FIG. 25. In this regard, since each segment can include 100s of millions of rows or more, parallelization improves the speed of processing or scanning the data, e.g., according to a query. The results of each segment are aggregated to form a complete set of results while each segment is processed separately.

Figure 26:
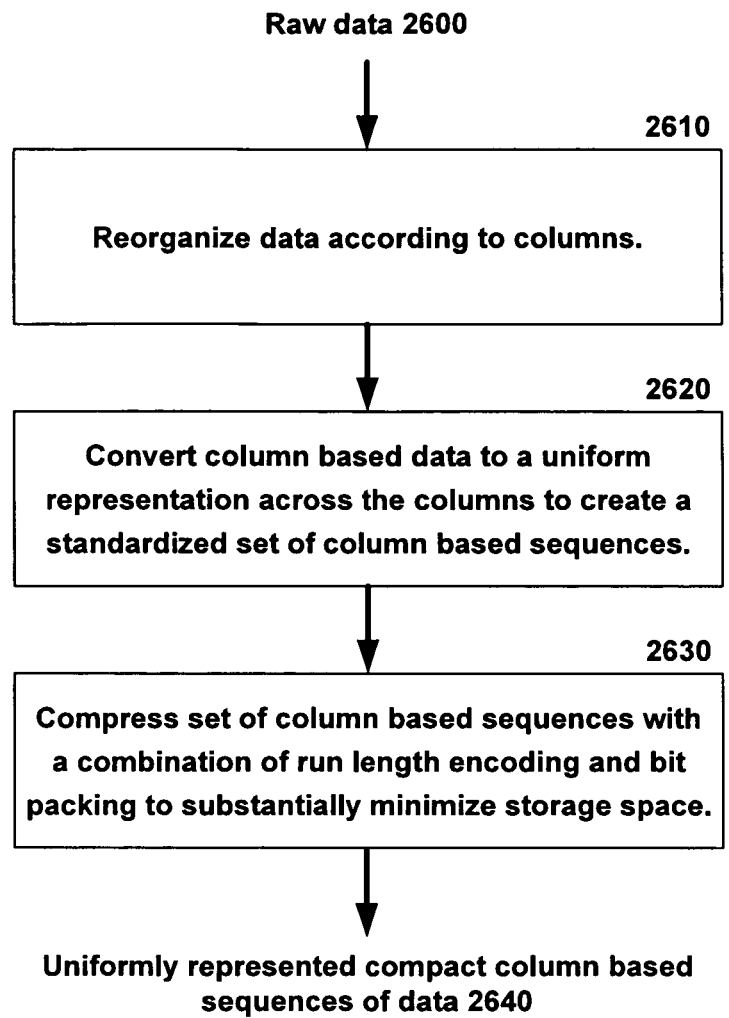
FIG. 26 is a flow diagram illustrating an exemplary non-limiting process for applying column based encoding to large scale data.
Figure 27:
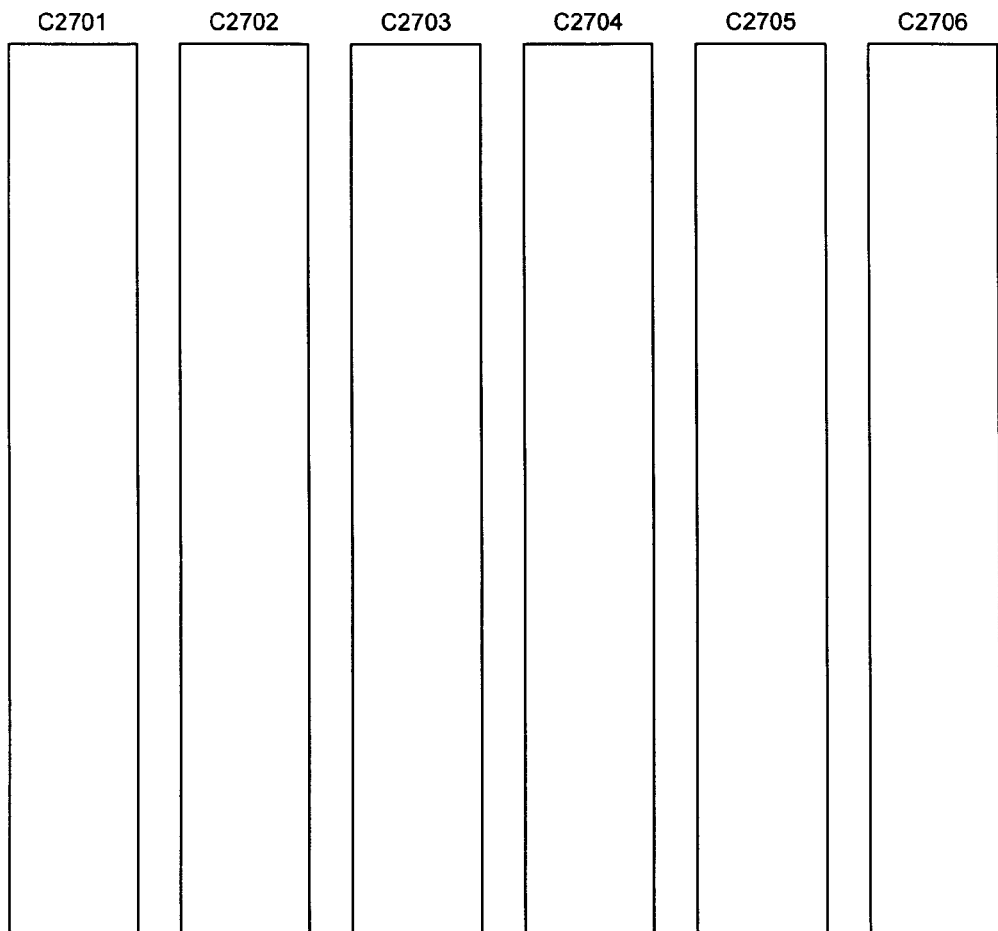
FIG. 27 is an illustration of column based representation of raw data in which records are broken into their respective fields and the fields of the same type are then serialized to form a vector.

FIG. 26 generally describes the above methodology according to a flow diagram beginning with the input of raw data 2600. At 2610, as mentioned, the data is reorganized according to the columns of the raw data 2600, as opposed to keeping each field of a record together like conventional systems. For instance, as shown in FIG. 27, each column forms an independent sequence, such as sequences C2701, C2702, C2703, C2704, C2705, C2706. Where retail transaction data is the data, for example, column C2701 might be a string of product prices, column C2702 might represent a string of purchase dates, column C2703 might represent a store location, and so on. The column based organization maintains inherent similarity within a data type considering that most real world data collected by computer systems is not very diverse in terms of the values represented. At 2620, the column based data undergoes one or more conversions to form uniformly represented column based data sequences. In one embodiment, step 2620 reduces each column to integer sequences of data via dictionary encoding and/or value encoding.

At 2630, the column based sequences are compressed with a run length encoding process, and optionally bit packing. In one embodiment, the run-length encoding process re-orders the column data value sequences of the column of all of the columns, which achieves the highest compression savings. Thus, the column where run length encoding achieves the highest savings, is re-ordered to group the common values being replaced by run length encoding, and then a run length is defined for the re-ordered group. In one embodiment, the run length encoding algorithm is applied iteratively across the columns, examining each of the columns at each step to determine the column that will achieve the highest compression savings.

When the benefit of applying run length encoding becomes marginal or minimal according to one or more criterion, such as insufficient bit savings, or savings are less than a threshold, then the benefits of its application correspondingly go down. As a result, the algorithm can stop, or for the remaining values not encoded by run length encoding in each column, bit packing can be applied to further reduce the storage requirements for those values. In combination, the hybrid run length encoding and bit packing technique can be powerful to reduce a column sequence, particularly those with a finite or limited number of values represented in the sequence.

For instance, the field "sex" has only two field values: male and female. With run length encoding, such field could be represented quite simply, as long as the data is encoded according to the column based representation of raw data as described above. This is because the row focused conventional techniques described in the background, in effect, by keeping the fields of each record together, break up the commonality of the column data. "Male" next to an age value such as "21" does not compress as well as a "male" value next to only "male" or "female" values. Thus, the column based organization of data enables efficient compression and the result of the process is a set of distinct, uniformly represented and compacted column based sequences of data 2640.

Figure 28:
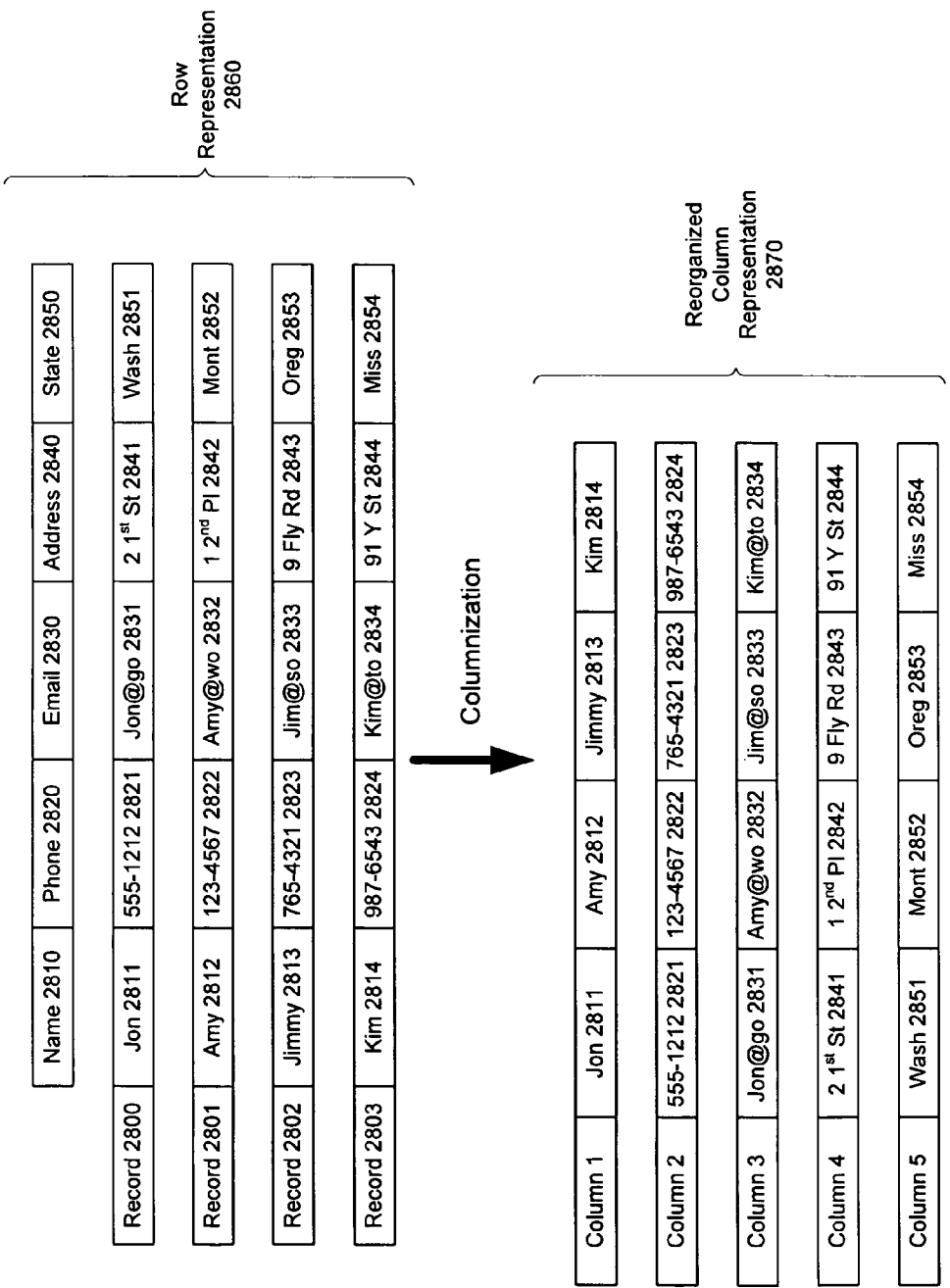
FIG. 28 is a non-limiting block diagram exemplifying columnization of record data.

FIG. 28 gives an example of the columnization process based on actual data. The example of FIG. 28 is for 4 data records 2800, 2801, 2802 and 2803, however, this is for simplicity of illustration since the invention can apply to terabytes of data. Generally speaking, when transaction data is recorded by computer systems, it is recorded record-byrecord and generally in time order of receiving the records. Thus, the data in effect has rows, which correspond to each record.

In FIG. 28, record 2800 has name field 2810 with value "Jon" 28zz, phone field 2820 with value "555-1212" 2821, email field 2830 with value "jon@go" 2831, address field 2840 with value "2 1st St" 2841 and state field 2850 with value "Wash" 2851.

Record 2801 has name field 2810 with value "Amy" 2812, phone field 2820 with value "123-4567" 2822, email field 2830 with value "Amy@wo" 2832, address field 2840 with value "1 $2^{nd}$ Pl" 2842 and state field 2850 with value "Mont" 2852.

Record 2802 has name field 2810 with value "Jimmy" 2813, phone field 2820 with value "765-4321" 2823, email field 2830 with value "Jim@so" 2833, address field 2840 with value "9 Fly Rd" 2843 and state field 2850 with value "Oreg" 2853.

Record 2803 has name field 2810 with value "Kim" 2814, phone field 2820 with value "987-6543" 2824, email field 2830 with value "Kim@to" 2834, address field 2840 with value "91 Y St" 2844 and state field 2850 with value "Miss" 2854.

When row representation 2860 is columnized to reorganized column representation 2870, instead of having four records each having five fields, five columns are formed corresponding to the fields.

Thus, column 1 corresponds to the name field 2810 with value "Jon" 28zz, followed by value "Amy" 2812, followed by value "Jimmy" 2813, followed by value "Kim" 2814. Similarly, column 2 corresponds to the phone field 2820 with value "555-1212" 2821, followed by value "123-4567" 2822, followed by value "765-4321" 2823, followed by value "987-6543" 2824. Column 3 corresponds to the email field 2830 with value "jon@go" 2831, followed by value "Amy@wo" 2832, followed by value "Jim@so" 2833, followed by value "Kim@to" 2834. In turn, column 4 corresponds to the address field 2840 with value "2 $1^{st}$ St" 2841, followed by value "1 $2^{nd}$ Pl" 2842, followed by value "9 Fly Rd" 2843, followed by value "91 Y St" 2844. And column 5 corresponds to the state field 2850 with value "Wash" 2851, followed by value "Mont" 2852, followed by value "Oreg" 2853, followed by value "Miss" 2854.

Figure 29:
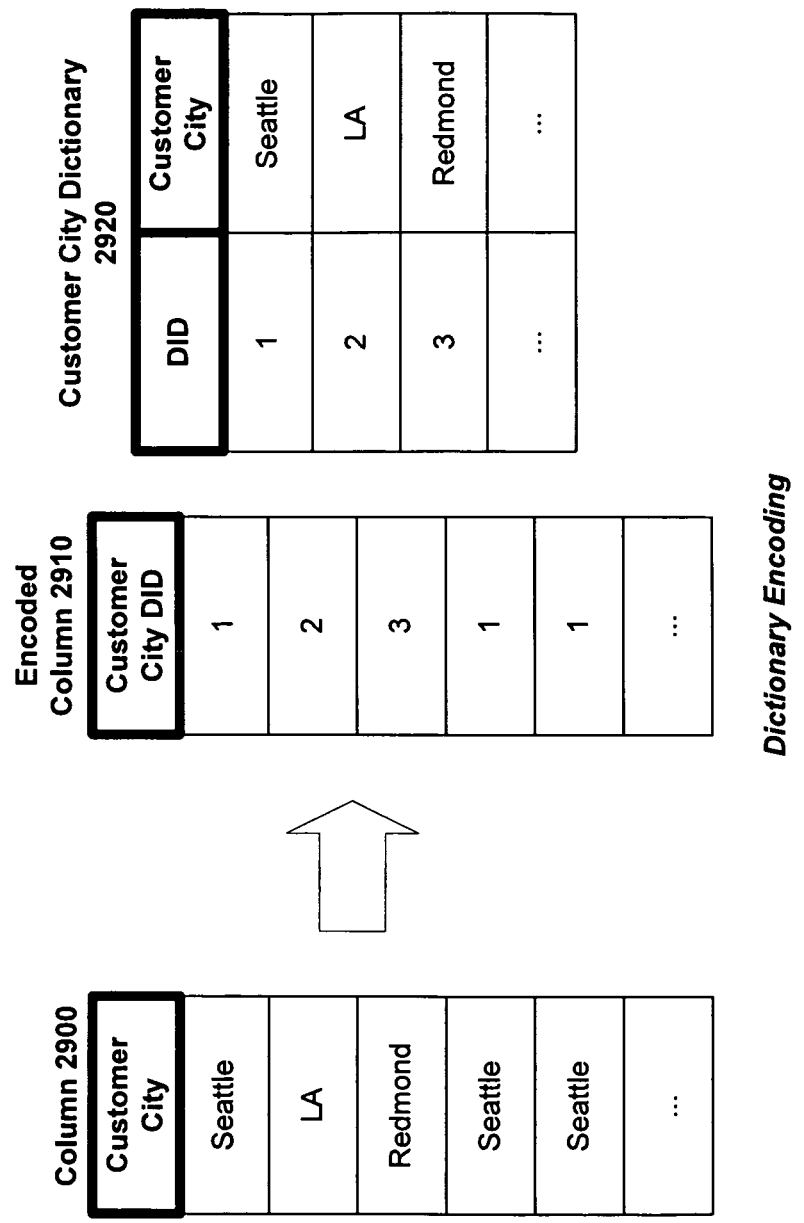
FIG. 29 is a non-limiting block diagram illustrating the concept of dictionary encoding.

FIG. 29 is a block diagram illustrative of a non-limiting example of dictionary encoding, as employed by embodiments described herein. A typical column 2900 of cities may include values "Seattle," "Los Angeles," "Redmond" and so on, and such values may repeat themselves over and over. With dictionary encoding, an encoded column 2910 includes a symbol for each distinct value, such as a unique integer per value. Thus, instead of representing the text "Seattle" many times, the integer "1" is stored, which is much more compact. The values that repeat themselves more often can be enumerated with mappings to the most compact representations (fewest bits, fewest changes in bits, etc.). The value "Seattle" is still included in the encoding as part of a dictionary 2920, but "Seattle" need only be represented once instead of many times. The extra storage implicated by the dictionary 2920 is far outweighed by the storage savings of encoded column 2910.

Figure 30:
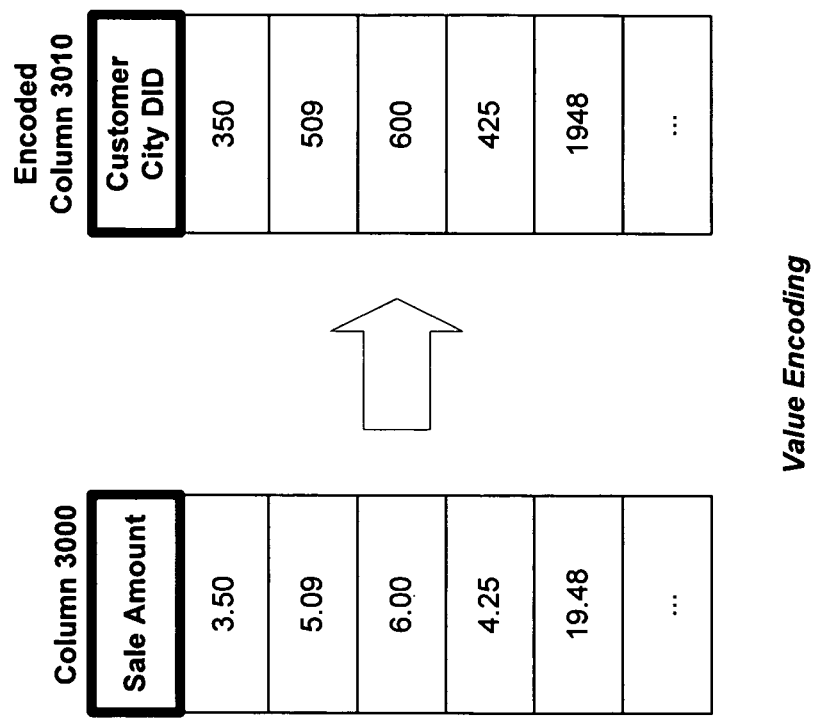
FIG. 30 is a non-limiting block diagram illustrating the concept of value encoding.

FIG. 30 is a block diagram illustrative of a non-limiting example of value encoding, as employed by embodiments described herein. A column 3000 represents sales amounts and includes a typical dollars and cents representation including a decimal, which implicates float storage. To make the storage more compact, a column 3010 encoded with value encoding may have applied to it a factor of 10, e.g., $10^2$, in order to represent the values with integers instead of float values, with integers requiring fewer bits to store. The transformation can similarly be applied in reduce the number of integers representing a value. For instance, values consistently ending in the millions for a column, such as 2,000,000, 185,000,000, etc. can all be divided by $10^6$ to reduce the values to more compact representations 2, 185, etc.

Figure 31:
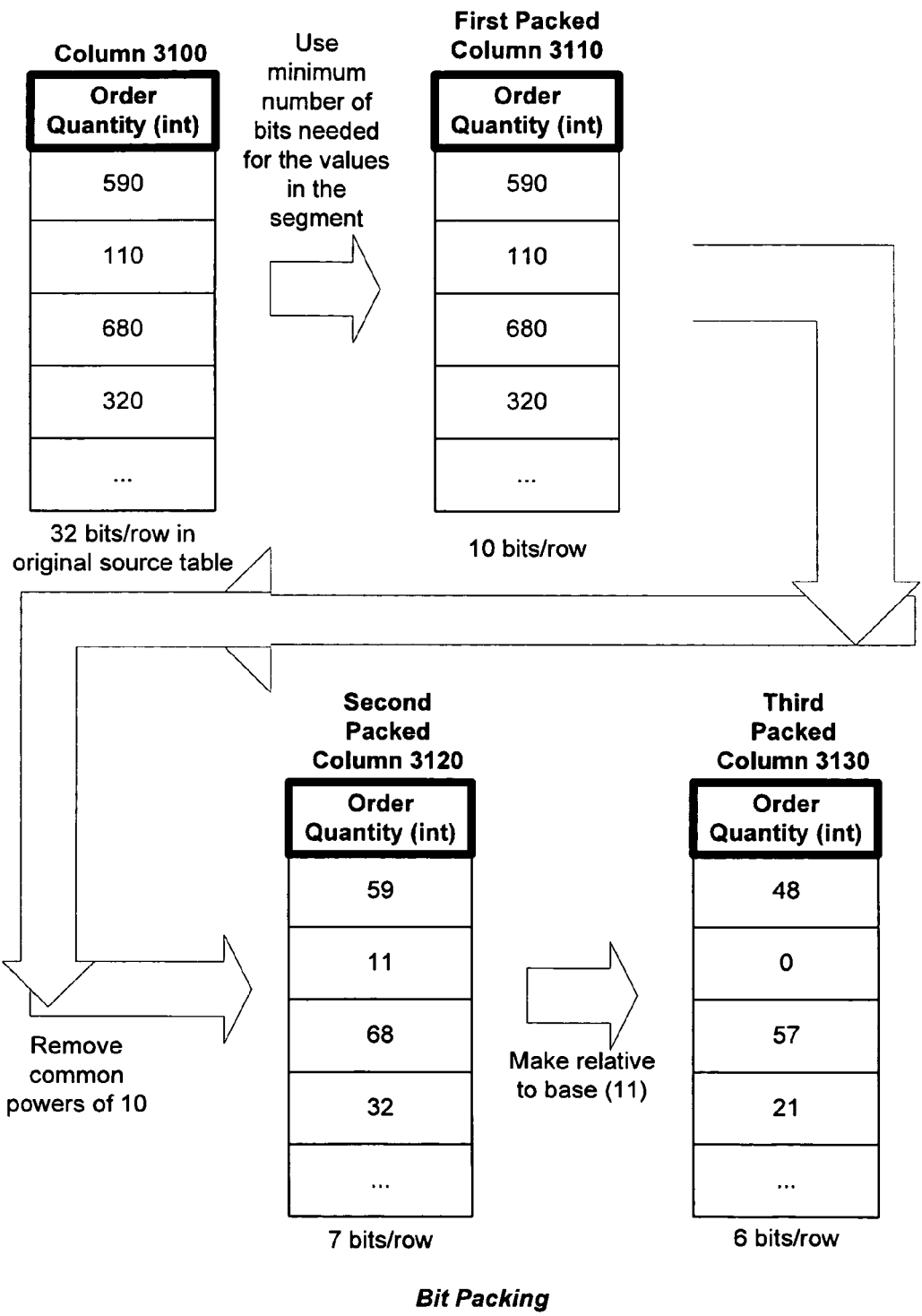
FIG. 31 is a non-limiting block diagram illustrating the concept of bit packing applied in one aspect of a hybrid compression technique.

FIG. 31 is a block diagram illustrative of a non-limiting example of bit packing, as employed by embodiments described herein. A column 3100 represents order quantities as integerized by dictionary and/or value encoding, however, 32 bits per row are reserved to represent the values. Bit packing endeavors to use the minimum number of bits for the values in the segment. In this example, 10 bits/row can be used to represent the values 590, 110, 680 and 320, representing a substantial savings for the first layer of bit packing applied to form column 3110.

Bit packing can also remove common powers of 10 (or other number) to form a second packed column 3120. Thus, if the values end in 0 as in the example, that means that the 3 bits/row used to represent the order quantities are not needed reducing the storage structure to 7 bits/row. Similar to the dictionary encoding, any increased storage due to the metadata needed to restore the data to column 3100, such as what power of 10 was used, is vastly outweighed by the bit savings.

As another layer of bit packing to form third packed column 3130, it can be recognized that it takes 7 bits/row to represent a value like 68, but since the lowest value is 11, the range can be shifted by 11 (subtract each value by 11), and then the highest number is 68−11=57, which can be represented with just 6 bits/row since $2^6$=64 value possibilities. While FIG. 31 represents a particular order of packing layers, the layers can be performed in different orders, or alternatively, the packing layers can be selectively removed or supplemented with other known bit packing techniques.

Figure 32:
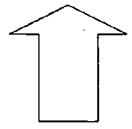
FIG. 32 is a non-limiting block diagram illustrating the concept of run length encoding applied in another aspect of a hybrid compression technique.

FIG. 32 is a block diagram illustrative of a non-limiting example of run length encoding, as employed by embodiments described herein. As illustrated, a column such as column 3200 representing order types can be encoded effectively with run length encoding due to the repetition of values. A column value runs table 3210 maps order type to a run length for the order type. While slight variations on the representation of the metadata of table 3210 are permitted, the basic idea is that run length encoding can give compression of x50 for a run length of 100, which is superior to the gains bit packing can generally provide for the same data set.

Figure 33:
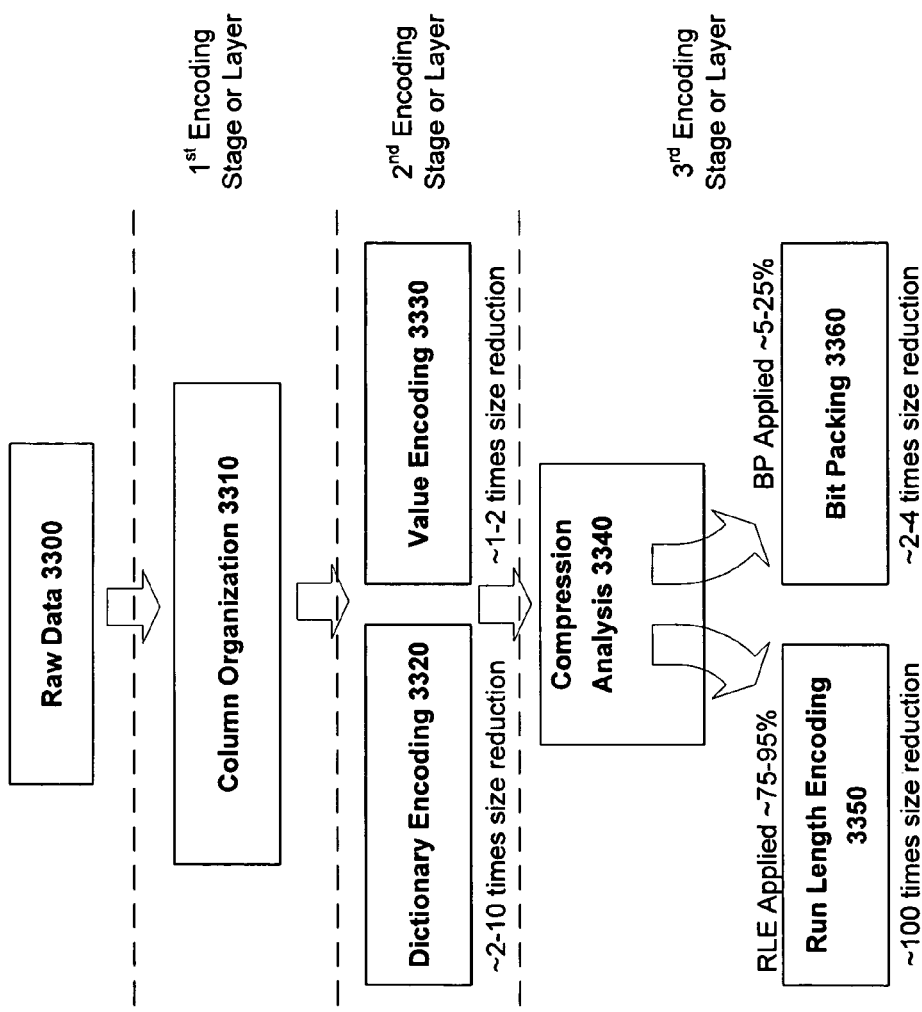
FIG. 33 is a block diagram illustrating an exemplary non-limiting implementation of encoding apparatus employing column based encoding techniques.

FIG. 33 is a general block diagram of an embodiment provided herein in which the techniques are synthesized into various embodiments of a unified encoding and compression scheme. Raw data 3300 is organized as column streams according to column organization 3310. Dictionary encoding 3320 and/or value encoding 3330 provide respective size reductions as described above. Then, in a hybrid RLE and bit packing stage, a compression analysis 3340 examines potential bit savings across the columns when determining whether to apply run length encoding 3350 or bit packing 3360.

Figure 34:
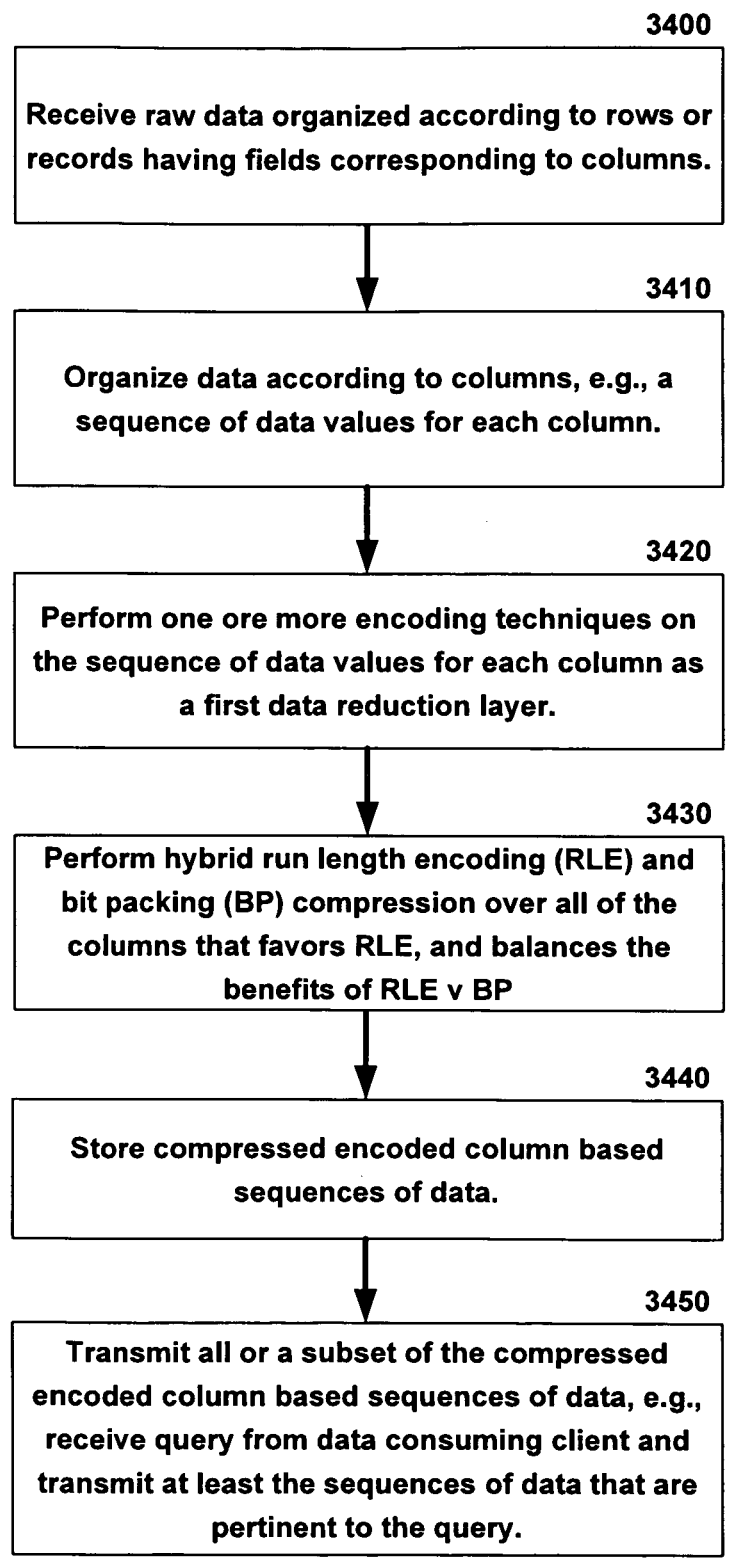
FIG. 34 is a flow diagram illustrating an exemplary non-limiting process for applying column based encoding to large scale data in accordance with an implementation.

FIG. 33 is expanded upon in the flow diagram of FIG. 34. At 3400, raw data is received according to an inherent row representation. At 3410, the data is re-organized as columns. At 3420, dictionary and/or value encoding are applied to reduce the data a first time. At 3430, a hybrid RLE and bit packing technique, as described above, can be applied. At 3440, the compressed and encoded column based sequence of data are stored. Then, when a client queries for all or a subset of the compressed encoded column based sequences of data, the affected columns are transmitted to the requesting client at 3450.

Figure 35:
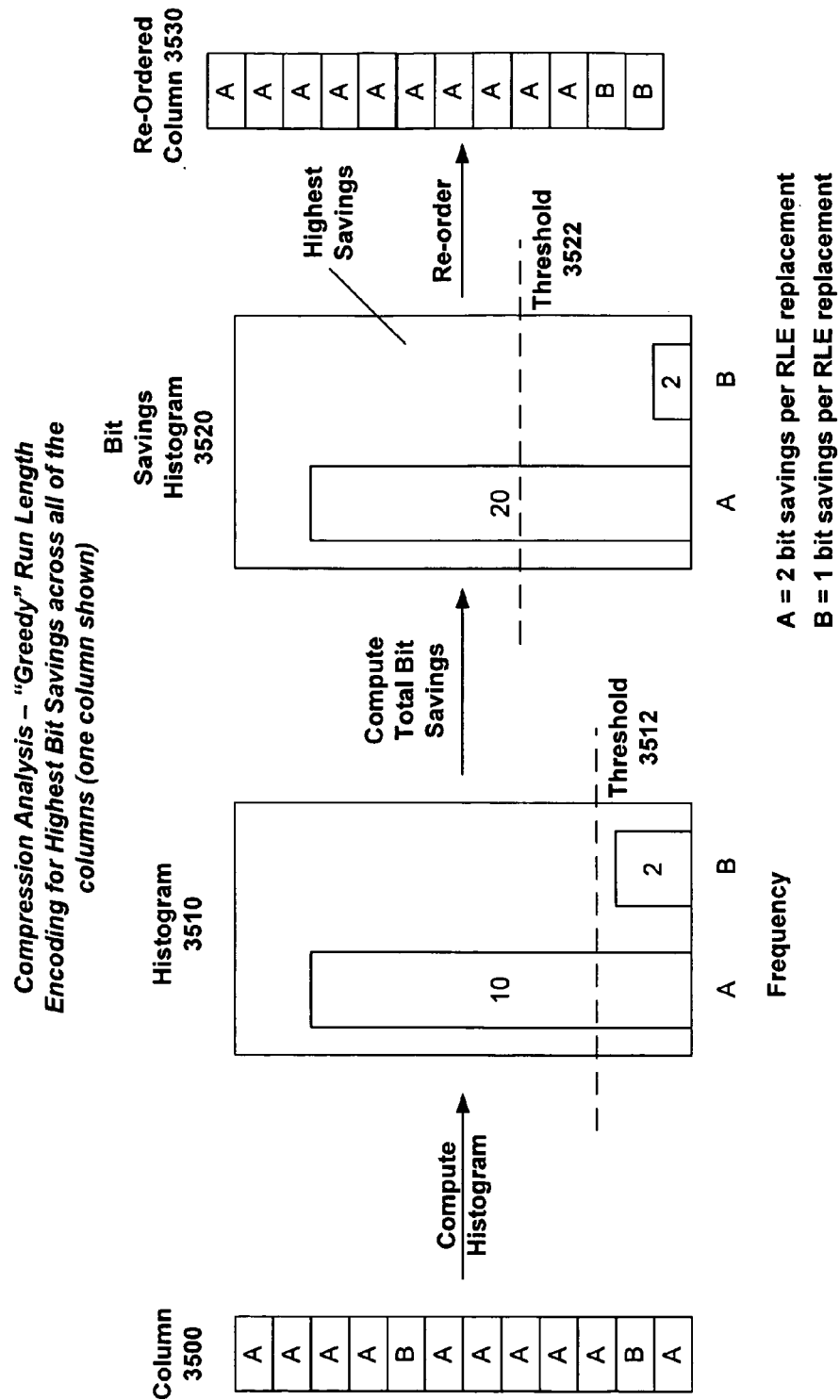
FIGS. 35-36 are exemplary illustrations of ways to perform a greedy run length encoding compression algorithm, including the optional application of a threshold savings algorithm for applying an alternative compression technique.

FIG. 35 is a block diagram of an exemplary way to perform the compression analysis of the hybrid compression technique. For instance, a histogram 3510 is computed from column 3500, which represents the frequency of occurrences of values, or the frequency of occurrences of individual run lengths. Optionally, a threshold 3512 can be set so that run length encoding does not apply for reoccurrences of a value that are small in number where run length gains may be minimal. Alternatively, or in addition, a bit savings histogram 3520 represents not only frequency of occurrences of values, but also the total bit savings that would be achieved by applying one or the other of the compression techniques of the hybrid compression model. In addition, a threshold 3522 can again be optionally applied to draw the line where run length encoding benefits are not significant enough to apply the technique. Instead, bit packing can be applied for those values of the column.

In addition, optionally, prior to applying run length encoding of the column 3500, the column 3500 can be re-ordered to group all of the most similar values as re-ordered column 3530. In this example, this means grouping the As together for a run length encoding and leaving the Bs for bit packing since neither the frequency nor the total bit savings justify run length encoding for the 2 B values. In this regard, the re-ordering can be applied to the other columns to keep the record data in lock step, or it can be remembered via column specific metadata how to undo the re-ordering of the run length encoding.

Figure 36:
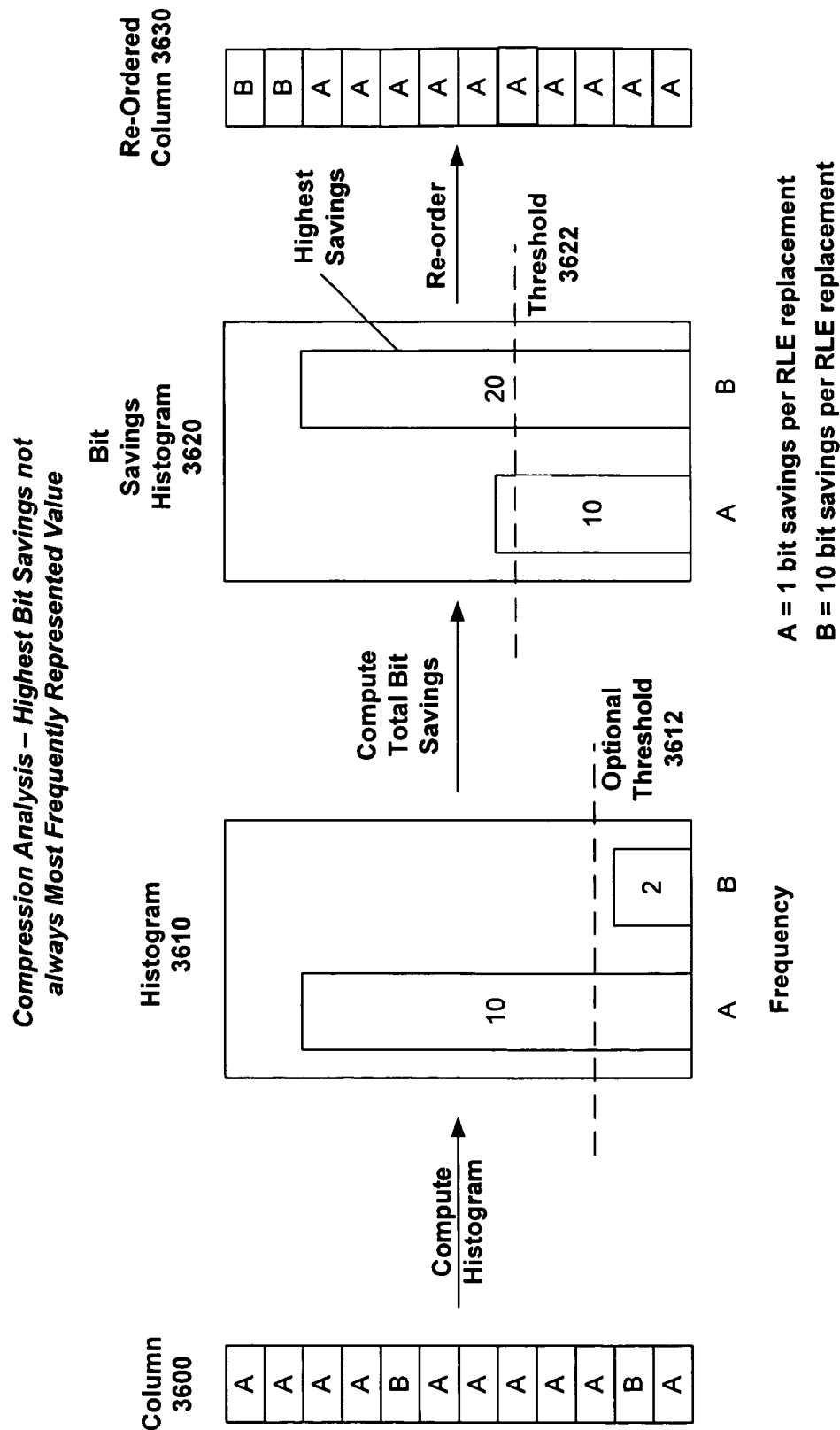

FIG. 36 illustrates a similar example where the compression analysis is applied to a similar column 3600, but where the bit savings per replacement of a run length have been altered so that now, it is justified according to the hybrid compression analysis to perform the run length encoding for the 2 B values, even before the 10 A values, since the 2 B values result in higher net bit savings. In this respect, much like a glutton choosing among 10 different plates with varying foods on them, application of run length encoding is "greedy" in that it iteratively seeks the highest gains in size reduction across all of the columns at each step. Similar to FIG. 13, a histogram of frequencies 3610 and/or a bit savings histogram 3620 data structure can be built to make determinations about whether to apply run length encoding, as described, or bit packing. Also, optional thresholds 3612 and 3622 can be used when deciding whether to pursue RLE or bit packing. Re-ordered column 3630 can help the run length encoding to define longer run lengths and thus achieve greater run length savings.

Figure 37:
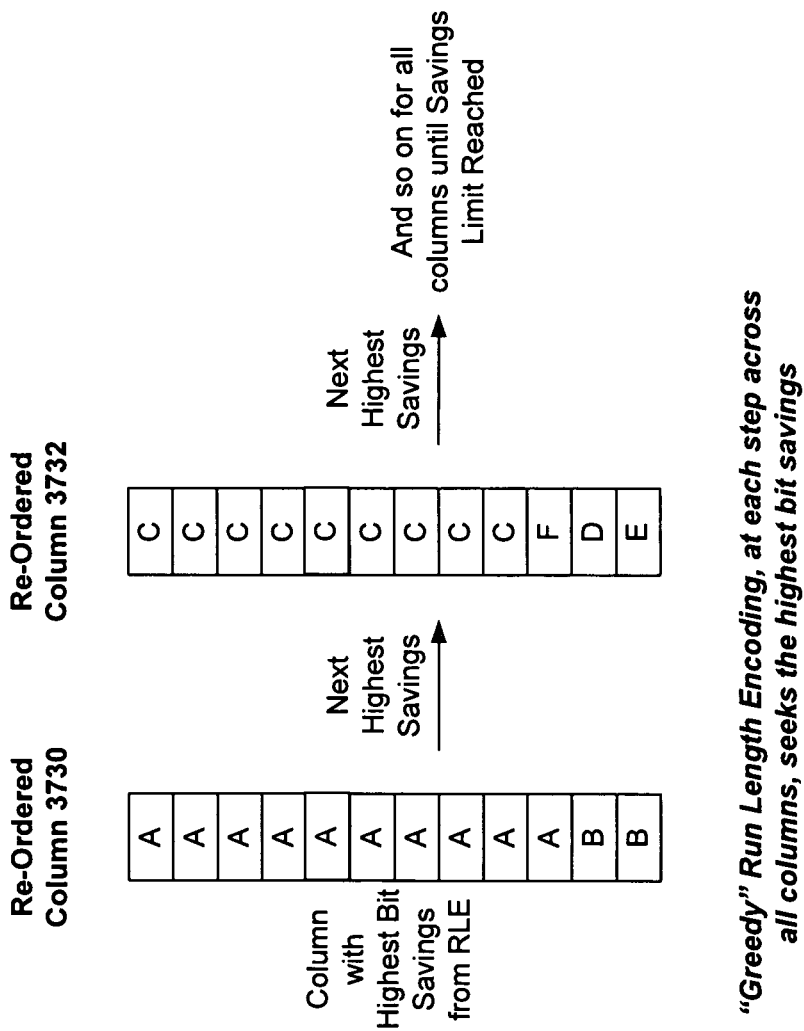
FIG. 37 is a block diagram further illustrating a greedy run length encoding compression algorithm.

FIG. 37 illustrates the "greedy" aspect of the run length encoding that examines, across all of the columns, where the highest bit savings are achieved at each step, and can optionally include re-ordering the columns as columns 3730, 3732, etc. to maximize run length savings. At a certain point, it may be that run length savings are relatively insignificant because the values are relatively unique at which point run length encoding is stopped.

Figure 38:
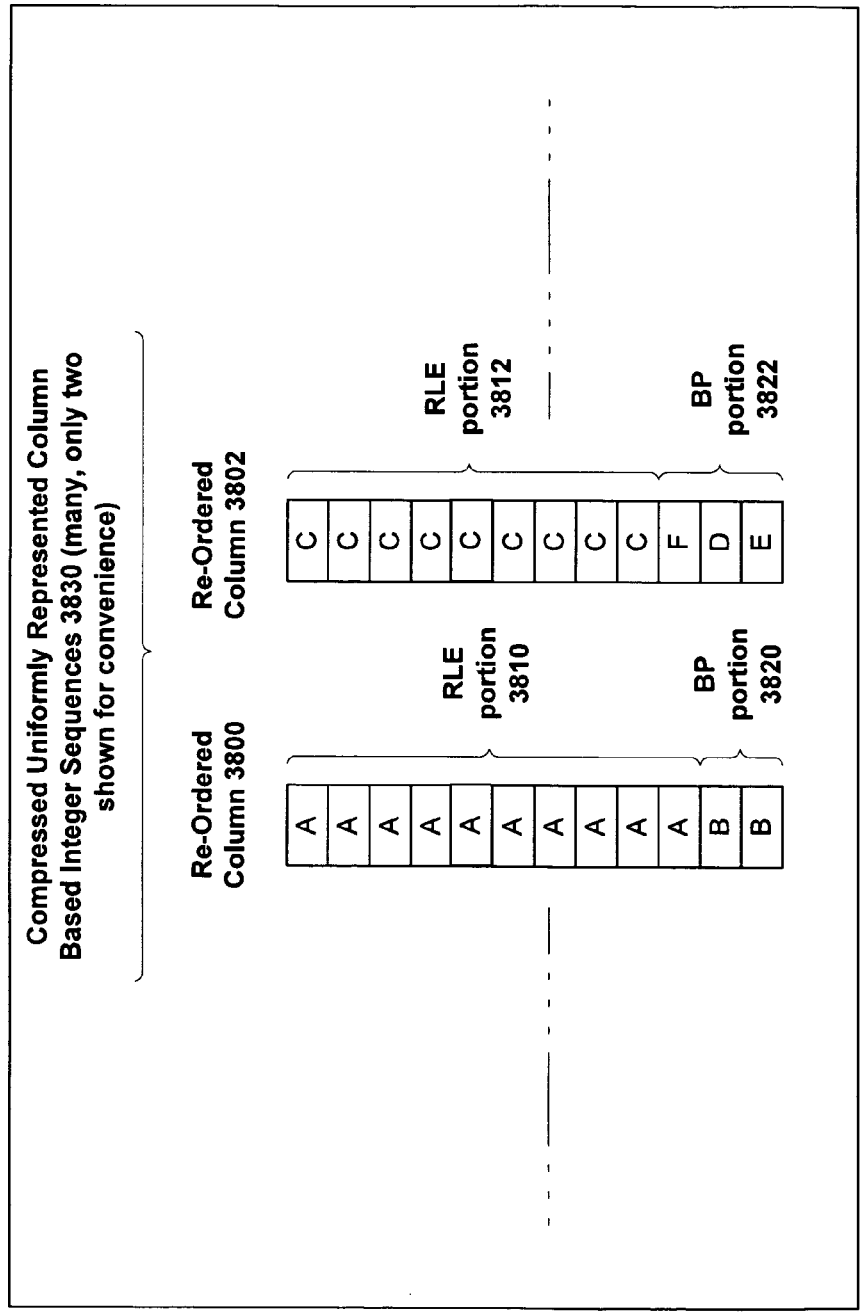
FIG. 38 is a block diagram illustrating a hybrid run length encoding and bit packing compression algorithm.

In the hybrid embodiment (as shown in Compressed Uniformly Represented Column Based Integer Sequences 3830), bit packing is applied to the range of remaining values, which is illustrated in FIG. 38. In this regard, applying the hybrid compression technique, re-ordered column 3800 includes an RLE portion 3810 and a bit packing portion 3820 generally corresponding to recurring values and relatively unique values, respectively. Similarly, re-ordered column 3802 includes RLE portion 3812 and BP portion 3822.

Figure 39:
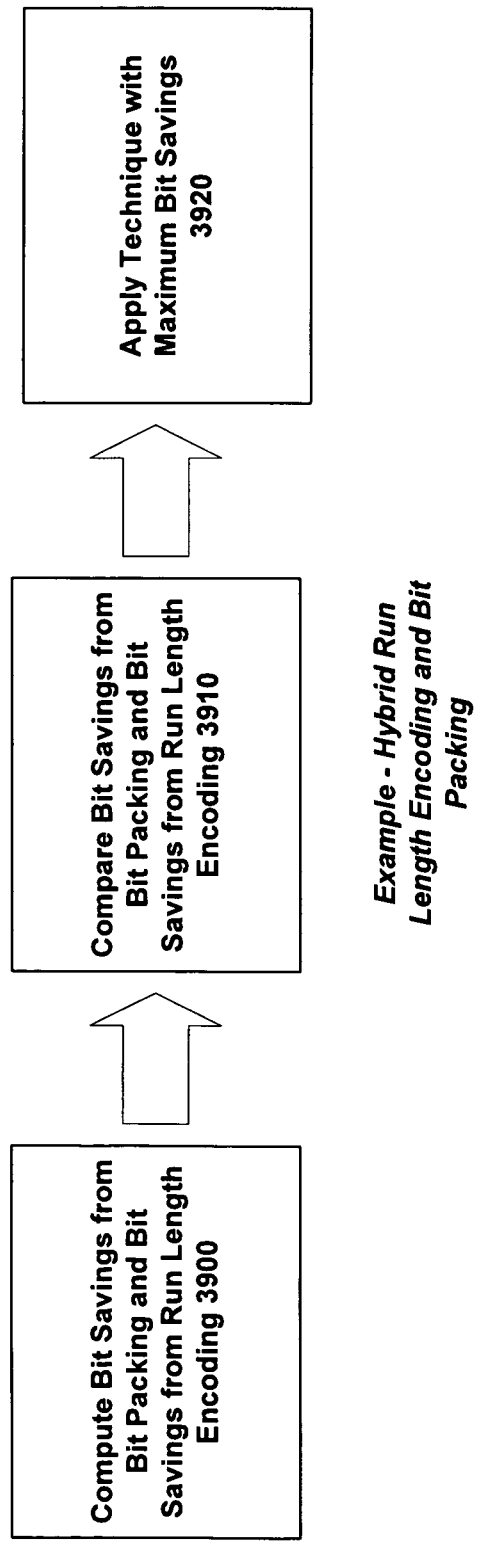
FIG. 39 is a flow diagram illustrating the application of a hybrid compression technique that adaptively provides different types of compression based on a total bit savings analysis.

In one embodiment shown in FIG. 39, the hybrid algorithm computes the bit savings from bit packing and bit savings from run length encoding 3900, and then the bit savings from bit packing and bit savings from run length are compared at 3910 or examined to determine which compression technique maximizes bit savings at 3920.

Figure 40:
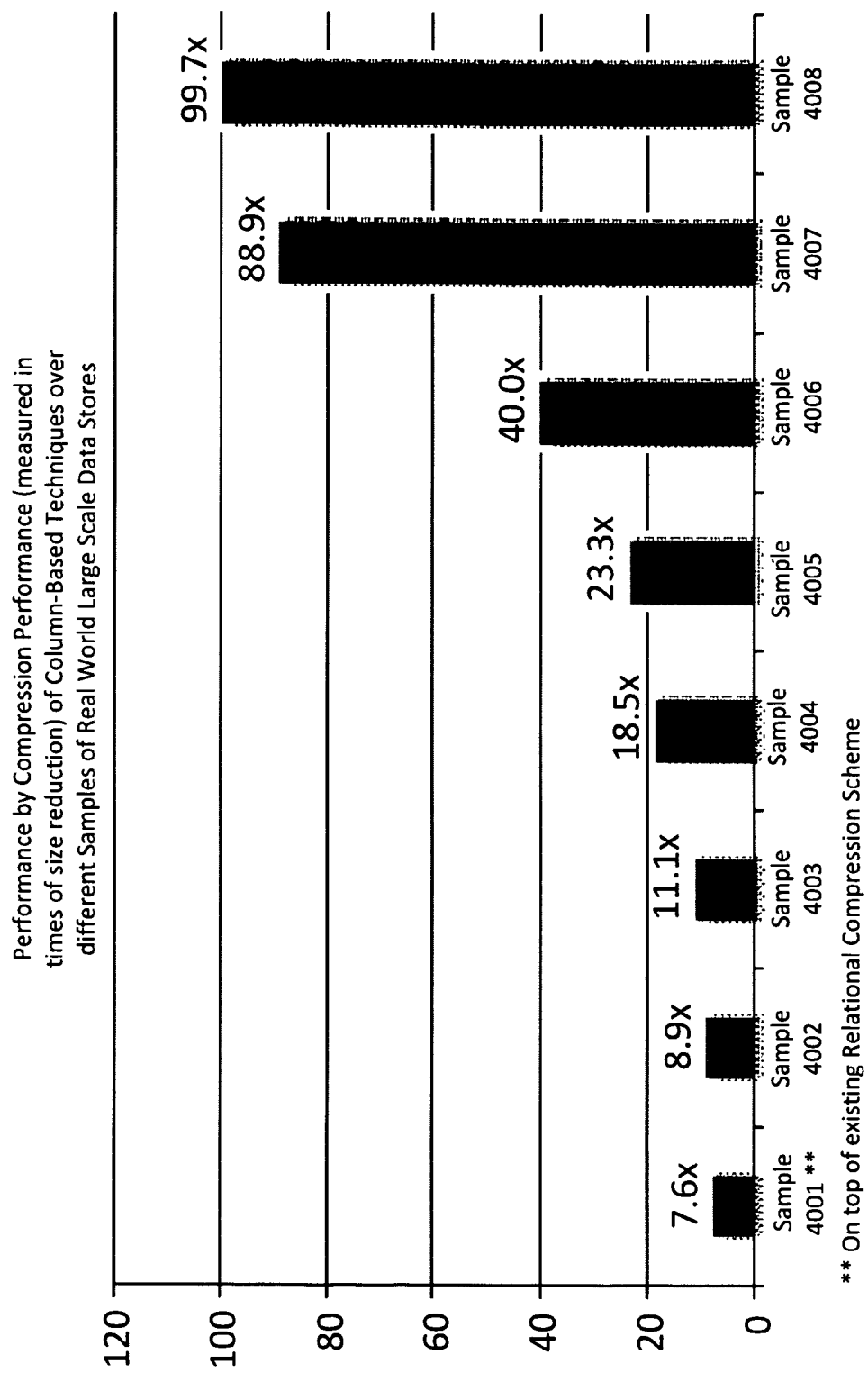
FIG. 40 block diagram illustrating the sample performance of the column based encoding to reduce an overall size of data in accordance with various embodiments of the subject disclosure.

Exemplary performance of the above-described encoding and compression techniques illustrates the significant gains that can be achieved on real world data samples 4001, 4002, 4003, 4004, 4005, 4006, 4006, 4007 and 4008, ranging in performance improvement from about 9x to 99.7x, which depends on, among other things, the relative amounts of repetition of values in the particular large scale data sample (as shown in FIG. 40).

Figure 41:
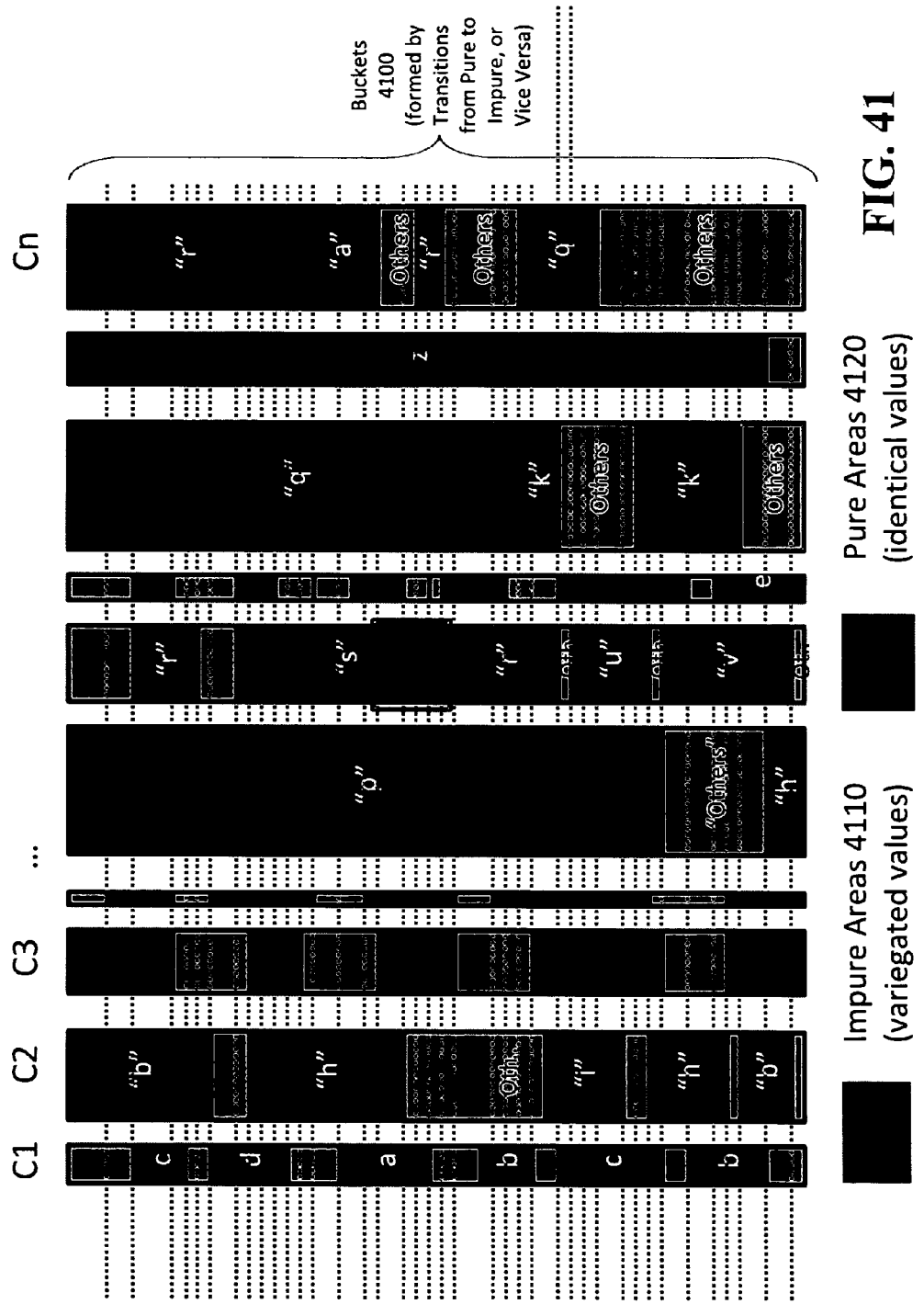
FIG. 41 illustrates a bucketization process that can be applied to column based encoded data with respect to transitions between pure and impure areas, and vice versa.

FIG. 41 is a block diagram showing the final result of the columnization, encoding and compression processes described herein in various embodiments. In this regard, each column C1, C2, C3, . . . , CN includes areas having homogeneous repeated values to which run length encoding has been applied, and other areas labeled "Others" or "Oth" in the diagram, which represent groups of heterogeneous values in the column. The areas with identical repeated values defined by run length are the pure areas 4120 and the areas having the variegated values are the impure areas 4110, as indicated in the legend. In this respect, as one's eye "walks down" the columns, a new view over the data emerges as an inherent benefit of the compression techniques discussed herein.

Across all of the columns, at the first transition point between an impure area 4110 and a pure area 4120, or the other way around, a bucket is defined as the rows from the first row to the row at the transition point. In this regard, buckets 4100 are defined down the columns at every transition point as shown by the dotted lines. Buckets 4100 are defined by the rows between the transitions.

Figure 42:
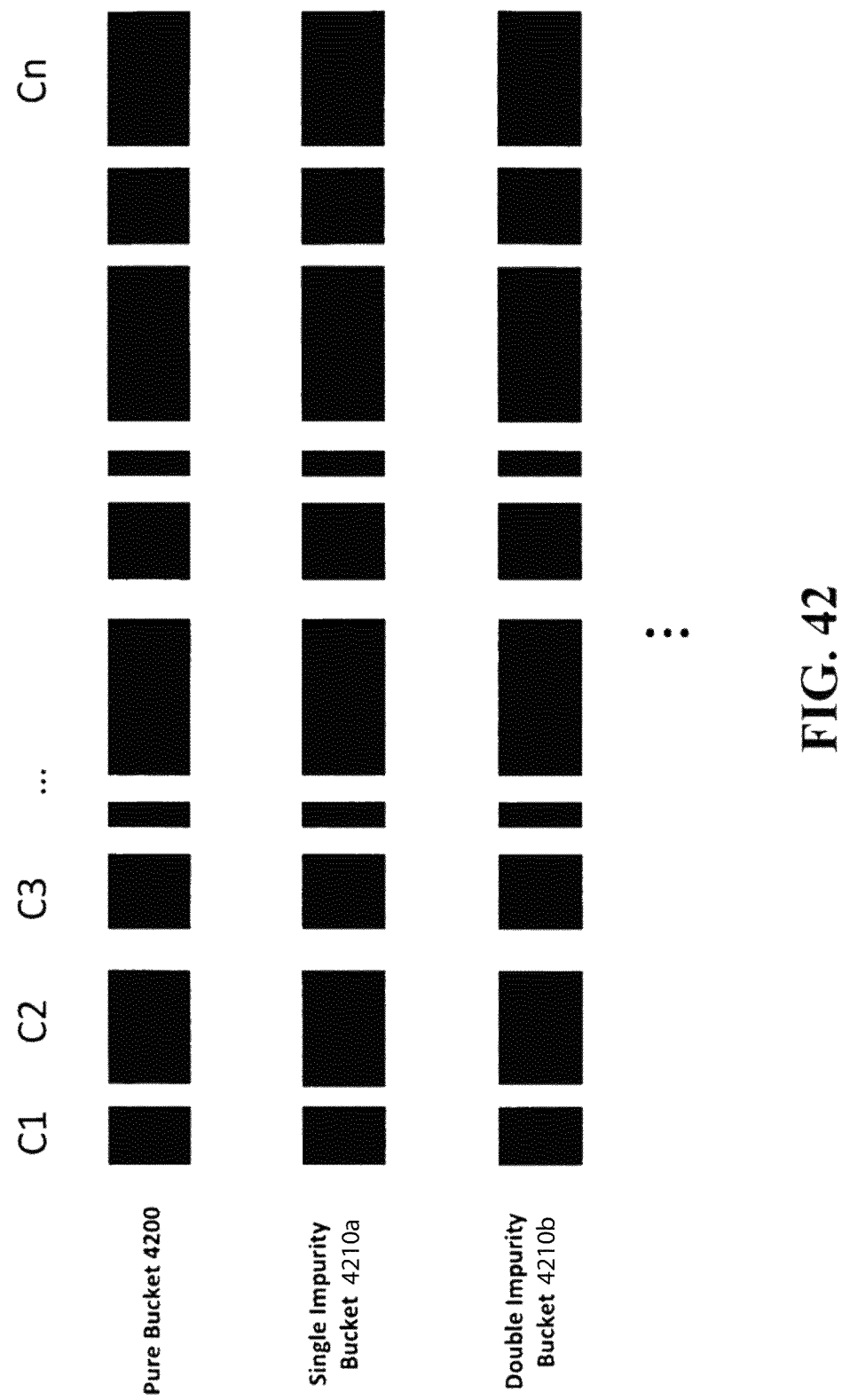
FIG. 42 illustrates impurity levels with respect to bucketization of the columns in accordance with an embodiment.

FIG. 42 shows a nomenclature that is defined for the buckets based on the number of pure and impure areas across a particular row. A pure bucket 4200 is one with no impure areas. A single impurity bucket 4210a is one with 1 impure area across the rows of the bucket. A double impurity bucket 4210b is one with 2 impure area across the rows of the bucket. A triple impurity bucket has 3, and so on.

Thus, during an exemplary data load process, data is encoded, compressed and stored in a representation suitable for efficient querying later and a compression technique can be that used that looks for data distribution within a segment, and attempts to use RLE compression more often than bit packing. In this regard, RLE provides the following advantages for both compression and querying: (A) RLE typically requires significantly less storage than bit packing and (B) RLE includes the ability to effectively "fast forward" through ranges of data while performing such query building block operations as Group By, Filtering and/or Aggregations; such operations can be mathematically reduced to efficient operations over the data organized as columns.

In various non-limiting embodiments, instead of sorting one column segment at a time before sorting another column in the same segment, the compression algorithm clusters rows of data based on their distribution, and as such increases the use of RLE within a segment. Where used herein, the term "bucket" is used to describe clusters of rows, which, for the avoidance of doubt, should be considered distinct from the term "partition," a well defined online analytical processing (OLAP) and RDBMS concept.

The above discussed techniques are effective due to the recognition that data distribution is skewed, and that in large amounts of data, uniform distributions rarely exist. In compression parlance, Arithmetic Coding leverages this: by representing frequently used characters using fewer bits and infrequently used characters using more bits, with the goal of using fewer bits in total.

With bit packing, a fixed-sized data representation is utilized for faster random access. However, the compression techniques described herein also have the ability to use RLE, which provides a way to use fewer bits for more frequent values. For example, if an original table (including one column Col1 for simplicity of illustration) appeared as follows:

| Col1 |
| --- |
| 100 |
| 100 |
| 100 |
| 100 |
| 200 |
| 300 |
| 400 |

Then, after compression, Col1 appears as follows, divided into a first portion to which run length encoding is applied and a second portion to which bit packing applies:

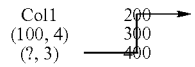

```
Col1        200
(100, 4)    300
(?, 3)      400
```

As can be seen above, occurrences of the most common value, 100, is collapsed into RLE, while the infrequently appearing values are still stored in a fixed-width, bit packed storage.

In this regard, the above-described embodiments of data packing includes two distinct phases: (1) Data analysis to determine bucketization, and (2) Reorganization of segment data to conform to the bucketized layout. Each of these are described in exemplary further detail below.

With respect to data analysis to determine bucketization, a goal is to cover as much data within a segment with RLE as possible. As such, this process is skewed towards favoring "thicker" columns, i.e., columns that have large cardinality, rather than columns that will be used more frequently during querying. Usage based optimizations can also be applied.

For another simple example, for the sake of illustration, the following small table is used. In reality, such small tables are not generally included within the scope of the above described compression because the benefit of compression of such tables tends not to be worthwhile. Also, such small tables are not generally included since compression occurs after encoding is performed, and works with DataIDentifications (IDs) in one embodiment, not the values themselves. Thus, a Row # column is also added for illustration.

| Row # | Col1 (9 bits per value) | Col2 (11 bits per value) |
| --- | --- | --- |
| 1 | 100 | 1231 |
| 2 | 100 | 12 |
| 3 | 200 | 1231 |
| 4 | 100 | 32 |
| 5 | 400 | 1231 |
| 6 | 100 | 111 |
| 7 | 100 | 12 |

Across the columns, the bucketization process begins by finding the single value the takes the most space in the segment data. As mentioned above in connection with FIGS. 18 and 19, this can be done using simple histogram statistics for each column, e.g., as follows.

| Column | Most Common Value | # occurrences | Space Saved |
| --- | --- | --- | --- |
| Col1 | 100 | 5 | 45 bits |
| Col2 | 1231 | 3 | 33 bits |

Once this value is selected, rows in the segment are logically reordered such that all occurrences of this value occur in a sequence, to maximize the length of an RLE run:

| Original Row # | Col1 | Col2 |
| --- | --- | --- |
| 1 | 100 | 1231 |
| 2 |  | 12 |
| 4 |  | 32 |
| 6 |  | 111 |
| 7 |  | 12 |
| 3 | 200 | 1231 |
| 5 | 400 | 1231 |

In one embodiment, all values belonging to the same row exist at the same index in each of the column segment, e.g., col1[3] and col2[3] both belong to the third row. Ensuring this provides efficient random access to values in the same row, instead of incurring the cost of an indirection through a mapping table for each access. Therefore, in the presently described embodiment of the application of the greedy RLE algorithm, or the hybrid RLE and bit packing algorithm, when reordering a value in one column, this implies values in other column segments are reordered as well.

In the example above, two buckets now exist: {1,2,4,6,7} and {3,5}. As mentioned, the RLE applied herein is a greedy algorithm, which means that the algorithm follows the problem solving metaheuristic of making the locally optimum choice at each stage with the hope of finding the global optimum. After the first phase of finding the largest bucket, the next phase is to select the next largest bucket and repeat the process within that bucket.

| Original Row # | Col1 | Col2 |
| --- | --- | --- |
| 2 | 100 | 12 |
| 7 |  |  |
| 1 |  | 1231 |
| 4 |  | 32 |
| 6 |  | 111 |
| 3 | 200 | 1231 |
| 5 | 400 | 1231 |

Now, there are three buckets: {2,7}, {1,4,6}, {3,5}, when the rows are re-organized accordingly. The largest bucket is the second one, but there are no repeating values there. The first bucket has all columns with RLE runs, and the rest of the values are unique, so it is known that there are no further RLE gains to be had in Col1. Taking the {3,5} bucket into account, there is another value, 1231, that can be converted to RLE. Interestingly, 1231 also appears on the previous bucket, and that bucket can be reordered such that 1231 is at the bottom, ready to be merged with the top of the next bucket. The next step results in the following:

| Original Row # | Col1 | Col2 |
|---|---|---|
| 2 | 100 | 12 |
| 7 | | |
| 6 | | 111 |
| 4 | | 32 |
| 1 | | 1231 |
| 3 | 200 | |
| 5 | 400 | |

In the example above, four buckets now exist: {2,7}, {6,4}, {1}, {3,5}. Unable to reduce further the data further, the process moves to the next phase of reorganization of segment data.

While the illustration at the top reordered the rows as well, for performance reasons, the determination of the buckets can be based purely on statistics, from the act of reordering data within each column segment. The act of reordering data within each column segment can be parallelized based on available cores using a job scheduler.

As mentioned, the use of the above-described techniques is not practical for small datasets. For customer datasets, the above-described techniques frequently undergoes tens of thousands of steps, which can take time. Due to the greedy nature of the algorithm, the majority of space savings occur in the first few steps. In the first couple of thousand steps, most of the space that will be saved has already been saved. However, as will be observed on the scanning side of the compressed data, the existence of RLE in the packed columns gives significant performance boosts during querying, since even tiny compression gains reap rewards during querying.

Since one segment is processed at a time, multiple cores can be used, overlapping the time taken to read data from the data source into a segment with the time taken to compress the previous segment. With conventional technologies, at the rate of ~100K rows/sec reading from a relational database, a segment of 8M rows will take ~80 seconds, which is a significant amount of time available for such work. Optionally, in one embodiment, packing of the previous segment may also be stopped once data for the next segment is available.

Processing of the Column Based Data Encodings

As mentioned, the way that the data is organized according to the various embodiments for column based encoding lends itself to an efficient scan at the consuming side of the data, where the processing can be performed very fast on a select number of the columns in memory. The above-described data packing and compression techniques update the compression phase during row encoding, while scanning includes a query optimizer and processor to leverage the intelligent encoding.

The scan or query mechanism can be used to efficiently return results to business intelligence (BI) queries and is designed for the clustered layout produced by the above-described data packing and compression techniques, and optimizes for increased RLE usage, e.g., it is expected that during query processing, a significant number of columns used for querying would have been compressed using RLE. In addition, the fast scanning process introduces a column-oriented query engine, instead of a row-wise query processor over column stores. As such, even in buckets that contain bit pack data (as opposed to RLE data), the performance gains due to data locality can be significant.

In addition to introducing the above-described data packing and compression techniques and the efficient scanning, the following can be supported in a highly efficient manner: "OR" slices in queries and "Joins" between multiple tables where relationships have been specified.

As alluded to above, the scanning mechanism assumes segments contain buckets that span across a segment, and contains columns values in "pure" RLE runs or "impure" others bit pack storage.

In one embodiment, the scanning is invoked on a segment, the key being to work one bucket at a time. Within a bucket, the scanning process performs column-oriented processing in phases, depending on the query specification. The first phase is to gather statistics about what column areas are Pure, and what areas are Impure. Next, filters can be processed followed by processing of Group By operations, followed by processing of proxy columns. Next, aggregations can be processed as another phase.

As mentioned earlier, it is noted that the embodiments presented herein for the scanning implement column-oriented query processing, instead of row-oriented like conventional systems. Thus, for each of these phases, the actual code executed can be specific to: (1) whether the column being operated on is run length encoded or not, (2) the compression type used for bit packing, (3) whether results will be sparse or dense, etc. For Aggregations, additional considerations are taken into account: (1) encoding type (hash or value), (2) aggregation function (sum/min/max/count), etc.

Figure 43:
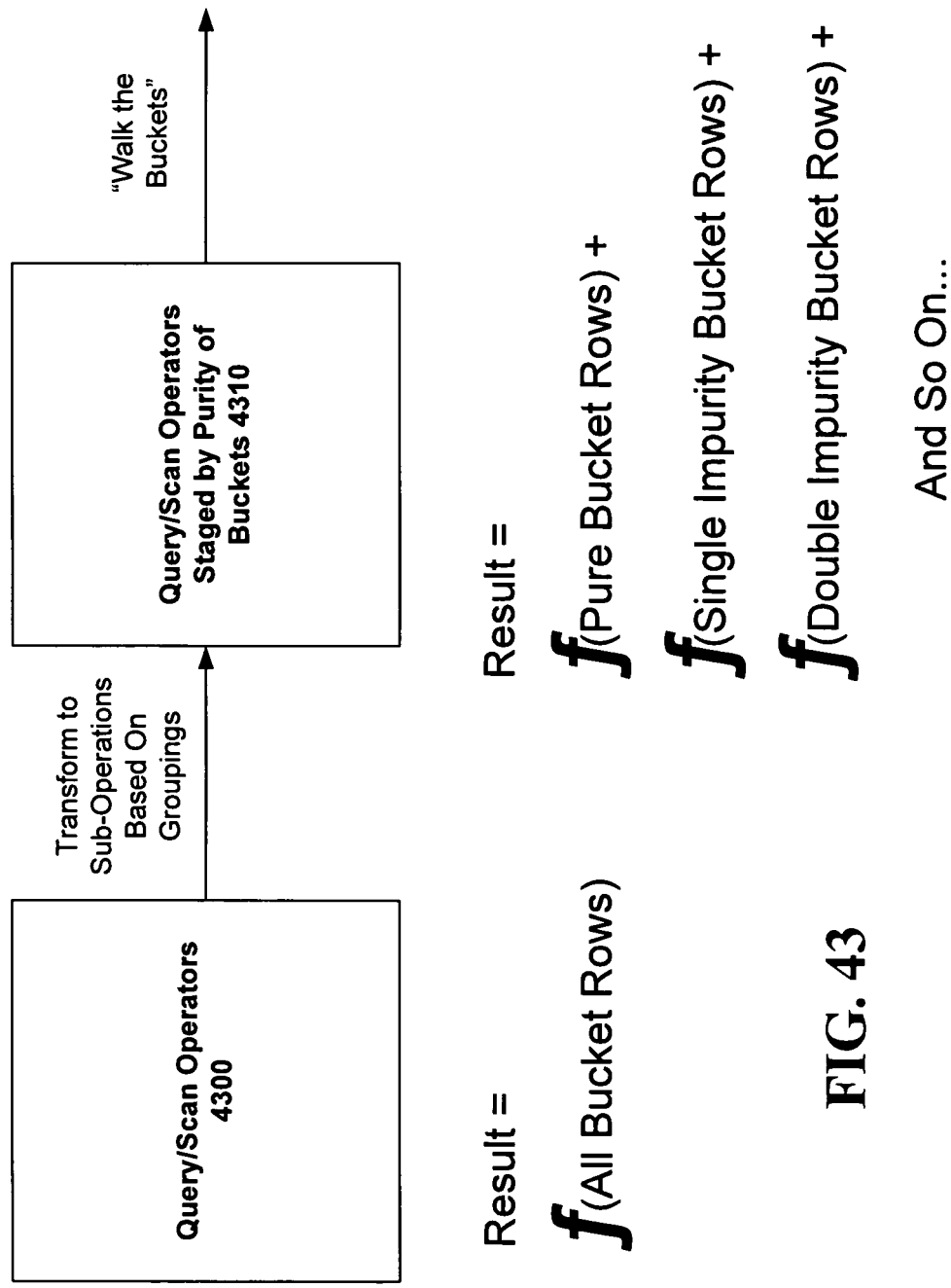
FIG. 43 illustrates the efficient division of query/scan operators into sub-operators corresponding to the different types of buckets present in the columns relevant to the current query/scan.

In general, the scanning process thus follows the form of FIG. 43 in which a query result from various standard query/scan operators 4300 is a function of all of the bucket rows. The query/scan operators 4300 can be broken up mathematically in effect such that the filters, Group Bys, proxy columns, and aggregations are processed separate from one another in phases.

In this regard, for each of the processing steps, the operators are processed according to different purities of the buckets at 4310 according to a bucket walking process. Consequently, instead of a generalized and expensive scan of all the bucket rows, with the specialization of different buckets introduced by the work of the encoding and compression algorithms described herein, the result is thus an aggregated result of the processing of pure buckets, single impurity buckets, double impurity buckets, etc.

Figure 46:
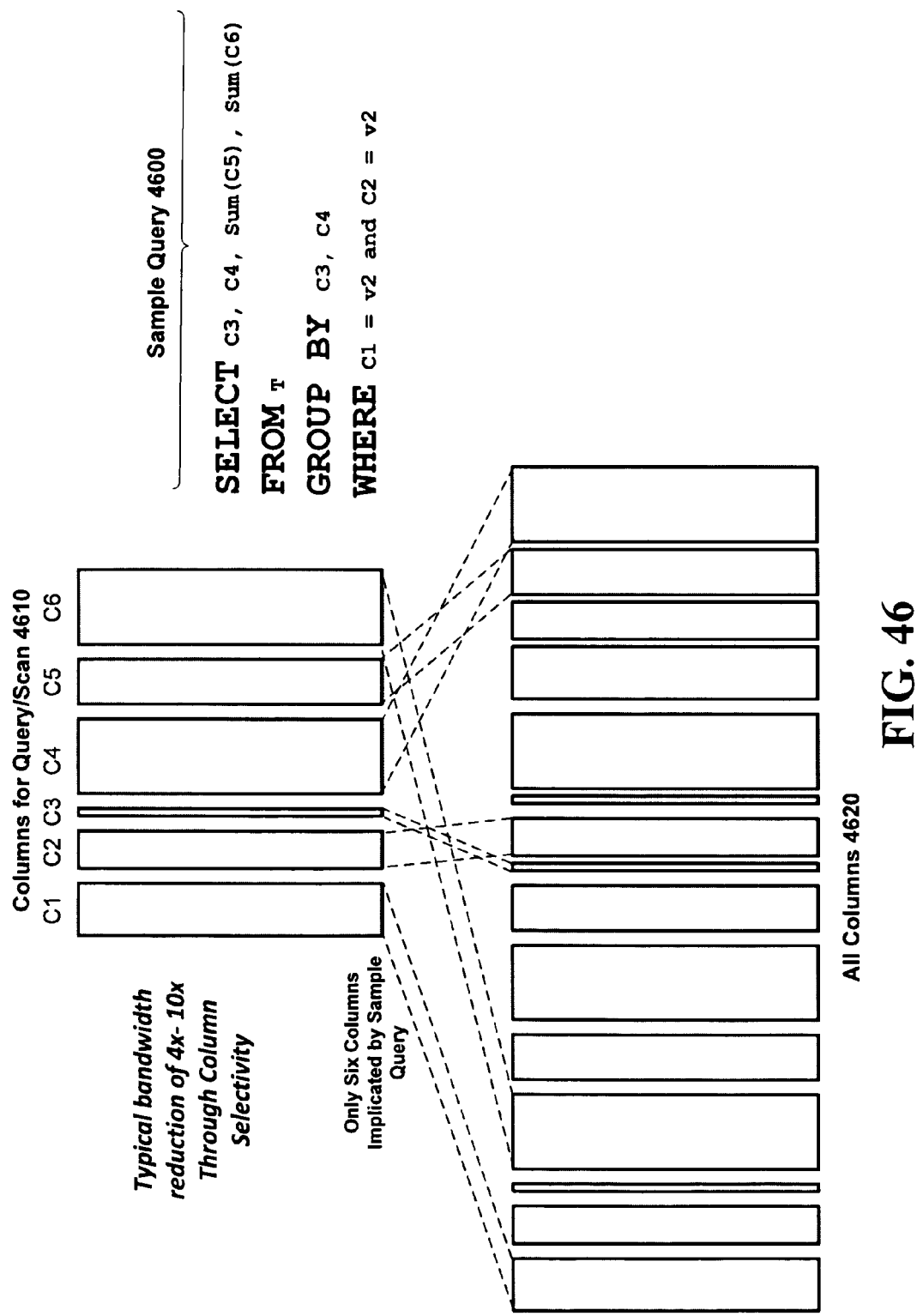
FIG. 46 illustrates representative processing of a sample query requested by a consuming client device over large scale data available via a network.

Chart 4400 of FIG. 44 shows a sample distribution of buckets and the power of the compression architecture, since processing performed over pure buckets is the fastest due to the reduction of processing mathematics to simple operations, followed by the second fastest being the single impurity buckets, and so on for additional impurity buckets. Moreover, it has been found that a surprisingly large number of buckets are pure. For instance, as shown in FIG. 46, for six columns implicated by a query, if each column has about 90% purity (meaning about 90% of the values are represented with run length encoding due to similar data), then about 60% of the buckets will be pure, about ⅓ will be single impurity, about 8% will be double purity, and the rest will be accounted for at a mere 1%. Since processing of pure buckets is the fastest, and processing of single impurity and double impurity buckets is still quite fast, the "more complex" processing of buckets with 3 or more impure areas is kept to a minimum.

FIG. 45 indicates a sample query 4500 with some sample standard query building blocks, such as sample "filter by column" query building block 4502, sample "Group by Column" query building block 4504 and sample "Aggregate by Column" query building block 4506.

FIG. 46 is a block diagram illustrating an additional aspect of bandwidth reduction through column selectivity. Reviewing sample query 4600, one can see that no more than 6 columns 4610 of all columns 4620 are implicated, and thus only six columns need be loaded into local RAM for a highly efficient query.

Figure 47:
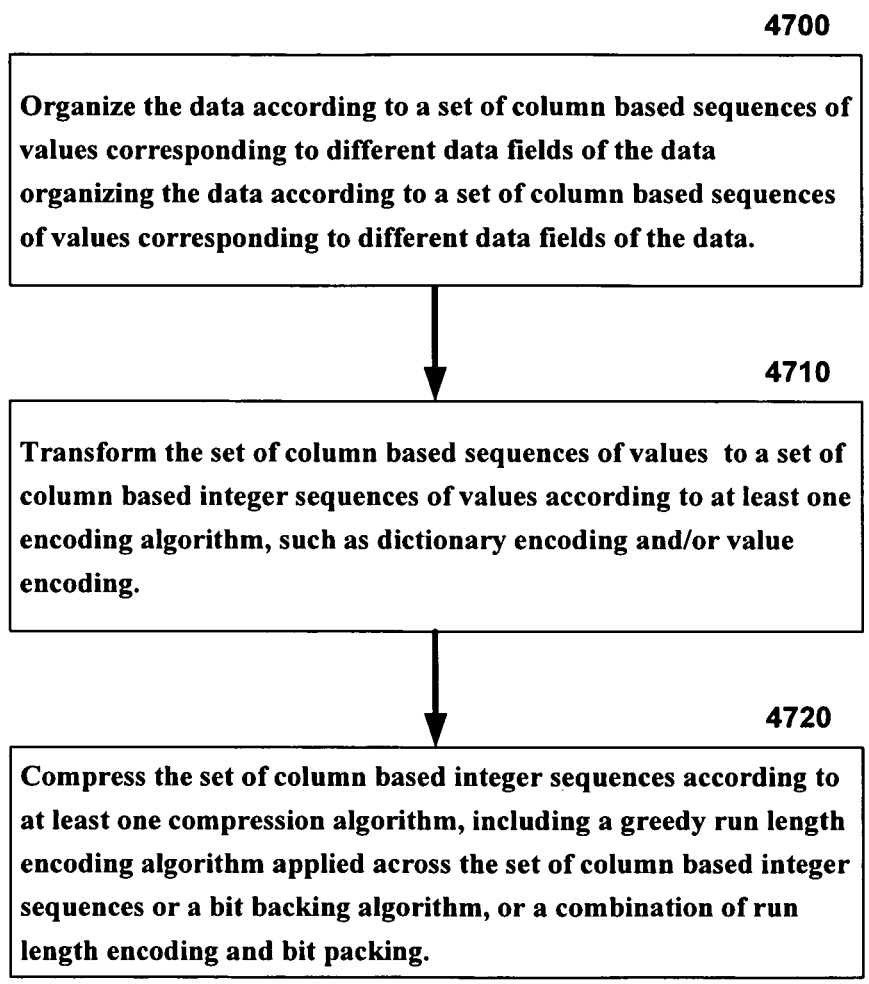
FIG. 47 is a flow diagram illustrating a process for encoding data according to columns according to a variety of embodiments.

Various embodiments have thus been described herein. FIG. 47 illustrates an embodiment for encoding data, including organizing the data according to a set of column based sequences of values corresponding to different data fields of the data at 4700. Then, at 4710, the set of column based sequences of values are transformed to a set of column based integer sequences of values according to at least one encoding algorithm, such as dictionary encoding and/or value encoding. Then, at 4720, the set of column based integer sequences are compressed according to at least one compression algorithm, including a greedy run length encoding algorithm applied across the set of column based integer sequences or a bit backing algorithm, or a combination of run length encoding and bit packing.

In one embodiment, the integer sequences are analyzed to determine whether to apply run length encoding (RLE) compression or bit packing compression including analyzing bit savings of RLE compression relative to bit packing compression to determine where the maximum bit savings is achieved. The process can include generating a histogram to assist in determining where the maximum bit savings are achieved.

Figure 48:
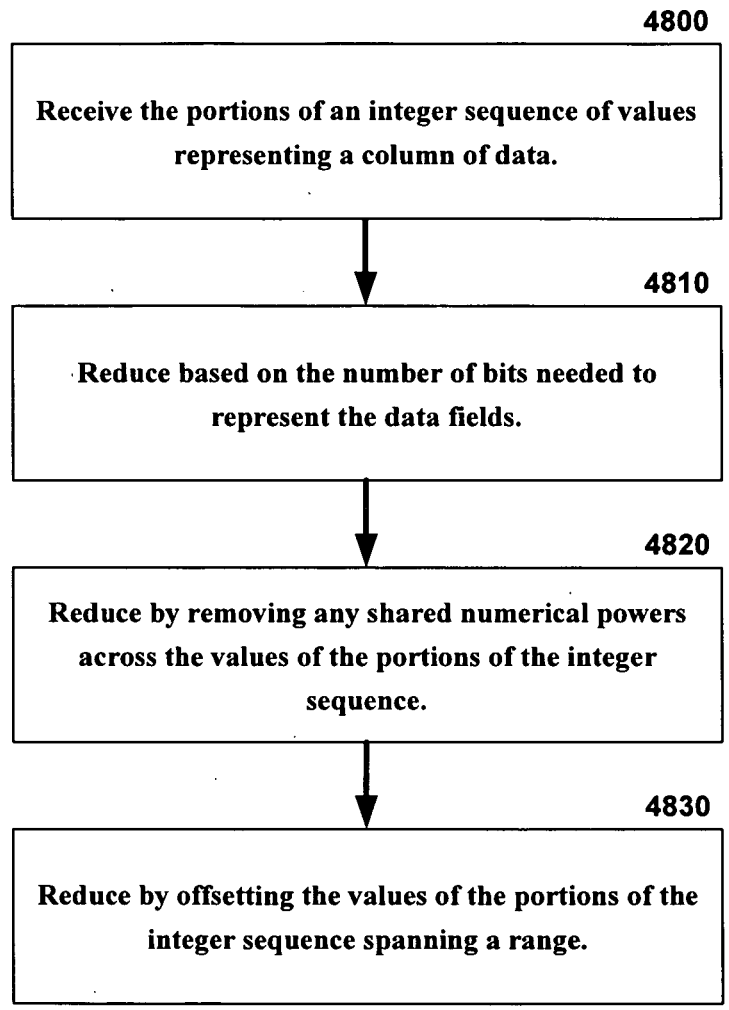
FIG. 48 is a flow diagram illustrating a process for bit packing integer sequences according to one or more embodiments.

In another embodiment, as shown in FIG. 48, a bit packing technique includes receiving, at 4800, the portions of an integer sequence of values representing a column of data, and three stages of potential reduction by bit packing. At 4810, the data can be reduced based on the number of bits needed to represent the data fields. At 4820, the data can be reduced by removing any shared numerical powers across the values of the portions of the integer sequence. At 4830, the data can also be reduced by offsetting the values of the portions of the integer sequence spanning a range.

Figure 49:
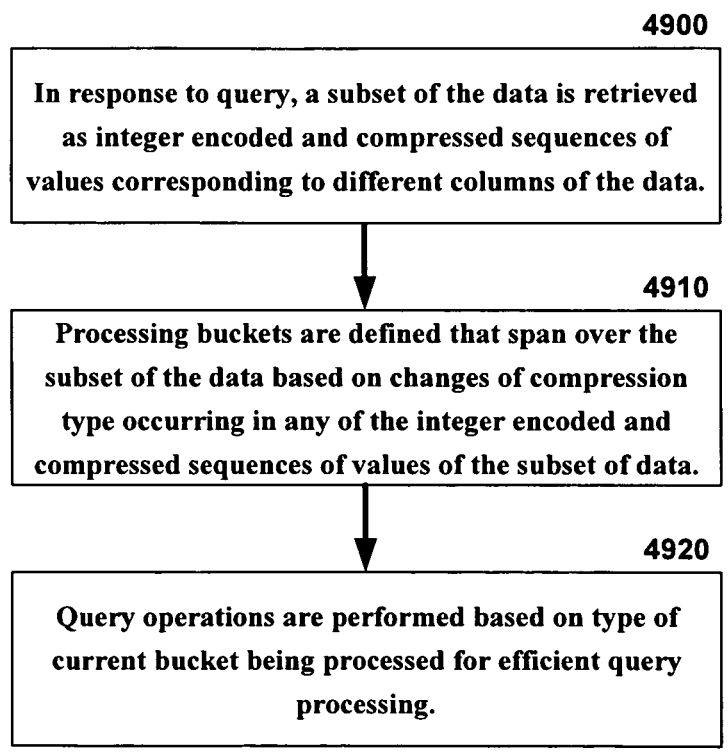
FIG. 49 is a flow diagram illustrating a process for querying over the column based representations of data.

In another embodiment, as shown in the flow diagram of FIG. 49, in response to a query, at 4900, a subset of the data is retrieved as integer encoded and compressed sequences of values corresponding to different columns of the data. Then, at 4910, processing buckets are defined that span over the subset of the data based on changes of compression type occurring in any of the integer encoded and compressed sequences of values of the subset of data. Next, at 4920, query operations are performed based on type of current bucket being processed for efficient query processing. The operations can be performed in memory, and parallelized in a multi-core architecture.

Different buckets include where (1) the different portions of values in the bucket across the sequences are all compressed according to run length encoding compression, defining a pure bucket, (2) all but one portion compressed according to run length encoding, defining a single impurity bucket, or (3) all but two portions compressed according to run length encoding, defining a double impurity bucket.

The improved scanning enables performing a variety of standard query and scan operators much more efficiently, particularly for the purest buckets. For instance, logical OR query slice operations, query join operations between multiple tables where relationships have been specified, filter operations, Group By operations, proxy column operations or aggregation operations can all be performed more efficiently when the bucket walking technique is applied and processing is performed based on bucket type.

Exemplary Networked and Distributed Environments

One of ordinary skill in the art can appreciate that the various embodiments of column based encoding and query processing described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may cooperate to perform one or more aspects of any of the various embodiments of the subject disclosure.

Figure 50:
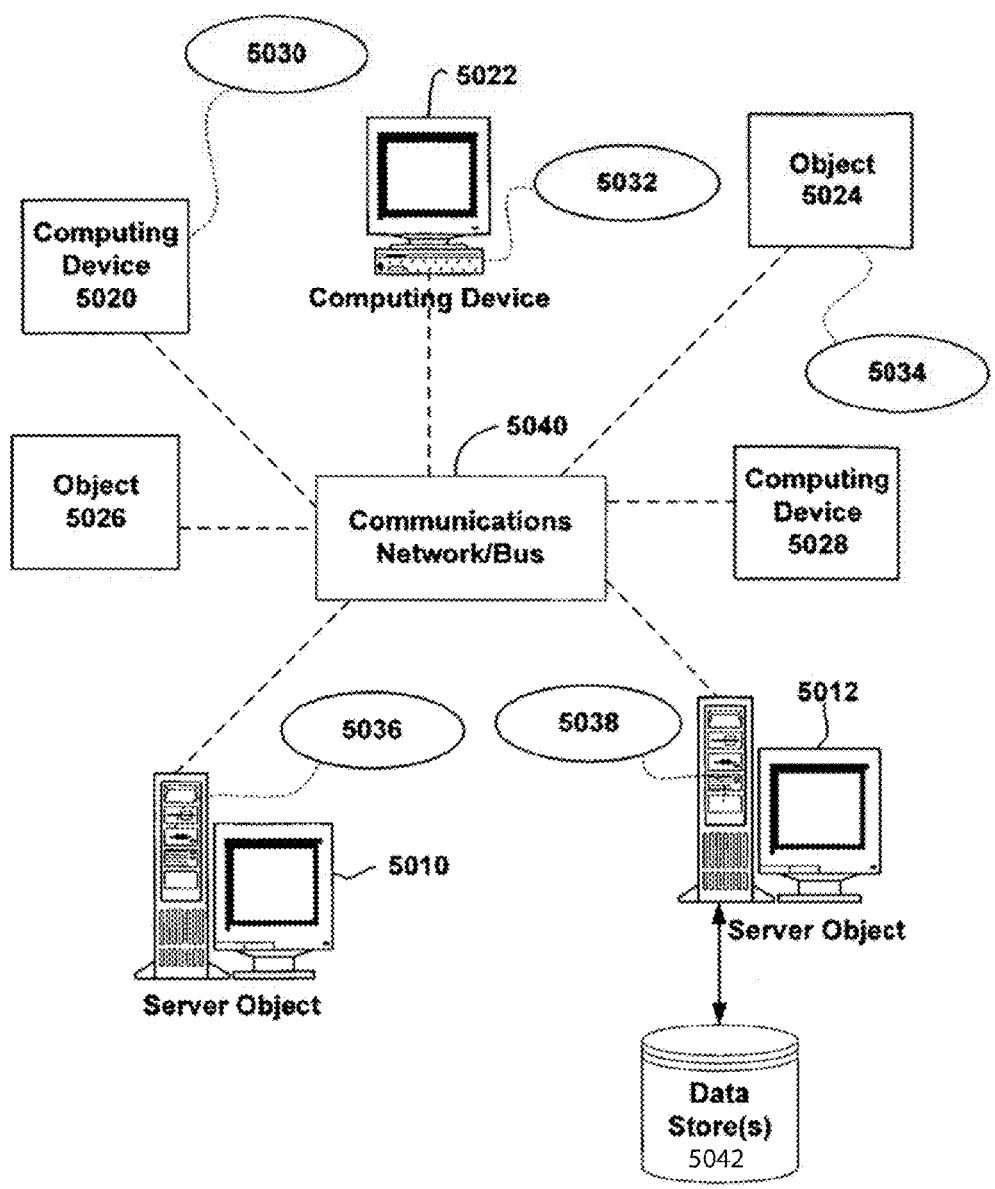
FIG. 50 is a block diagram representing exemplary non-limiting networked environments in which various embodiments described herein can be implemented.

FIG. 50 provides a schematic diagram of an exemplary networked or distributed computing environment. The distributed computing environment comprises computing objects 5010, 5012, etc. and computing objects or devices 5020, 5022, 5024, 5026, 5028, etc., which may include programs, methods, data stores 5042, programmable logic, etc., as represented by applications 5030, 5032, 5034, 5036, 5038. It can be appreciated that objects 5010, 5012, etc. and computing objects or devices 5020, 5022, 5024, 5026, 5028, etc. may comprise different devices, such as PDAs, audio/video devices, mobile phones, MP3 players, personal computers, laptops, etc.

Each object 5010, 5012, etc. and computing objects or devices 5020, 5022, 5024, 5026, 5028, etc. can communicate with one or more other objects 5010, 5012, etc. and computing objects or devices 5020, 5022, 5024, 5026, 5028, etc. by way of the communications network 5040, either directly or indirectly. Even though illustrated as a single element in FIG. 50, network 5040 may comprise other computing objects and computing devices that provide services to the system of FIG. 50, and/or may represent multiple interconnected networks, which are not shown. Each object 5010, 5012, etc. or 5020, 5022, 5024, 5026, 5028, etc. can also contain an application, such as applications 5030, 5032, 5034, 5036, 5038, that might make use of an API, or other object, software, firmware and/or hardware, suitable for communication with, processing for, or implementation of the column based encoding and query processing provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the column based encoding and query processing as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 50, as a non-limiting example, computers 5020, 5022, 5024, 5026, 5028, etc. can be thought of as clients and computers 5010, 5012, etc. can be thought of as servers where servers 5010, 5012, etc. provide data services, such as receiving data from client computers 5020, 5022, 5024, 5026, 5028, etc., storing of data, processing of data, transmitting data to client computers 5020, 5022, 5024, 5026, 5028, etc., although any computer can be considered a client, a server, or both, depending on the circumstances. Any of these computing devices may be processing data, encoding data, querying data or requesting services or tasks that may implicate the column based encoding and query processing as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the column based encoding and query processing can be provided standalone, or distributed across multiple computing devices or objects.

In a network environment in which the communications network/bus 5040 is the Internet, for example, the servers 5010, 5012, etc. can be Web servers with which the clients 5020, 5022, 5024, 5026, 5028, etc. communicate via any of a number of known protocols, such as the hypertext transfer protocol (HTTP). Servers 5010, 5012, etc. may also serve as clients 5020, 5022, 5024, 5026, 5028, etc., as may be characteristic of a distributed computing environment.

Exemplary Computing Device

As mentioned, advantageously, the techniques described herein can be applied to any device where it is desirable to query large amounts of data quickly. It should be understood, therefore, that handheld, portable and other computing devices and computing objects of all kinds are contemplated for use in connection with the various embodiments, i.e., anywhere that a device may wish to scan or process huge amounts of data for fast and efficient results. Accordingly, the below general purpose remote computer described below in FIG. 34 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 51:
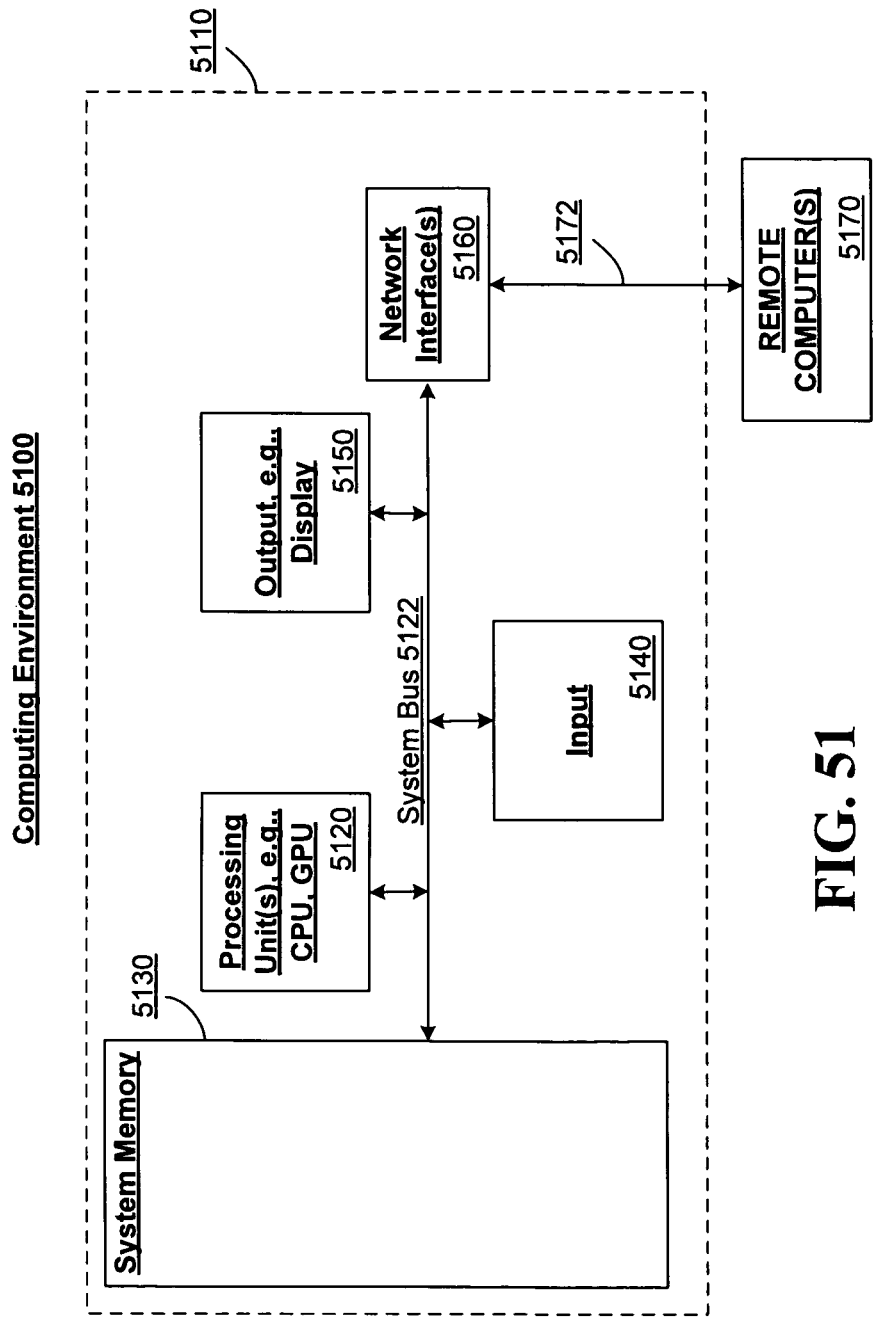
FIG. 51 is a block diagram representing an exemplary non-limiting computing system or operating environment in which one or more aspects of various embodiments described herein can be implemented.

FIG. 51 thus illustrates an example of a suitable computing system environment 5100 in which one or aspects of the embodiments described herein can be implemented, although as made clear above, the computing system environment 5100 is only one example of a suitable computing environment and is not intended to suggest any limitation as to scope of use or functionality. Neither should the computing environment 5100 be interpreted as having any dependency or requirement relating to any one or combination of components illustrated in the exemplary operating environment 5100.

With reference to FIG. 51, an exemplary remote device for implementing one or more embodiments includes a general purpose computing device in the form of a computer 5110. Components of computer 5110 may include, but are not limited to, a processing unit 5120, a system memory 5130, and a system bus 5122 that couples various system components including the system memory to the processing unit 5120.

Computer 5110 typically includes a variety of computer readable media and can be any available media that can be accessed by computer 5110. The system memory 5130 may include computer storage media in the form of volatile and/or nonvolatile memory such as read only memory (ROM) and/or random access memory (RAM). By way of example, and not limitation, memory 5130 may also include an operating system, application programs, other program modules, and program data.

A user can enter commands and information into the computer 5110 through input devices 5140. A monitor or other type of display device is also connected to the system bus 5122 via an interface, such as output interface 5150. In addition to a monitor, computers can also include other peripheral output devices such as speakers and a printer, which may be connected through output interface 5150.

The computer 5110 may operate in a networked or distributed environment using logical connections to one or more other remote computers, such as remote computer 5170. The remote computer 5170 may be a personal computer, a server, a router, a network PC, a peer device or other common network node, or any other remote media consumption or transmission device, and may include any or all of the elements described above relative to the computer 5110. The logical connections depicted in FIG. 51 include a network 5172 connected via network interface(s) 5160, such as local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to compress large scale data or process queries over large scale data.

Also, there are multiple ways to implement the same or similar functionality, e.g., an appropriate API, tool kit, driver code, operating system, control, standalone or downloadable software object, etc. which enables applications and services to use the efficient encoding and querying techniques. Thus, embodiments herein are contemplated from the standpoint of an API (or other software object), as well as from a software or hardware object that provides column based encoding and/or query processing. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A computer system having one or more processors for processing query requests in a manner that reduces computer resources used to process the requests, the computer system having one or more computer readable media storing computer-executable instructions that, when executed by the one or more processors, implement a method performed by the one or more processors, the method being comprised of:

obtaining an external query request from an application, the external query request requesting to apply operations over a data set in at least one data store, including a windowing operation that defines a window of a subset of sorted and filtered data that is to be returned after both a filter operation and a sort operation are applied to the data set;

splitting said external query request of the application into a first internal query request and a second internal query request, including:

generating the first internal query request, which is configured to generate distribution statistics that are specific to said external query request by computing distribution statistics that are usable in determining what sorted and filtered data would be returned by the windowing operation, the distribution statistics being based on a distribution of rows of the data set after applying the filter operation of said external query request and columns which match the sort operation of said query request to the data set; and then executing the first internal query request to generate the distribution statistics; and using said distribution statistics that were generated specifically for the external query request to generate the second internal query request, the second internal query request being configured to:

execute said filter and sort operations of the external query request while limiting the filter and sort operations to the subset of data defined by the windowing operation of the external query request such that sorting comprises sorting only the number of rows associated with the size of the requested window over the data set, and such that the second internal sub-request selects only the rows that match the window based on the distribution statistics; and return at least one result set for the external query request;

executing the second internal query request to generate the at least one result set; and transmitting said at least one result set to the application.

2. The computer system of claim 1, wherein the distribution statistics are dynamically computed based on any WHERE clauses corresponding to the filter operation or any ORDER BY columns corresponding to the sort operation.

3. The computer system of claim 1, wherein the distribution statistics are built for real data, and for synthetic data values, and wherein the real and the synthetic data is first discretized according to a discretization process.

4. The computer system of claim 1, wherein precomputed hierarchy data is used as part of computing the distribution statistics for simulating at least some synthetic, discretized, columns.

5. The computer system of claim 1, wherein a selection algorithm is employed to choose a discretization method for discretizing data and buffering strategy for the external query request based on at least one of a query definition of the external query request, content of the local data window, as determined from the distribution statistics, or a degree of parallelization.

6. The computer system of claim 1, wherein a projection method is chosen based the content of WHERE or ORDER BY buckets of data and content of the local data window, as determined from the distribution statistics.

7. The computer system of claim 1, wherein the at least one result set is built in parallel using only insertions into one of up to N preconfigured buffers, with N corresponding to a number of processors of the computer system.

8. The computer system of claim 1, wherein internal buffers for buffering data are configured according to buffer sizes and their policy based on at least one of a query specification, a selected discretization method, a distribution of data in the local data window, as determined by the distribution statistics, or a degree of parallelization applied to data processing.

9. The computer system of claim 1, further comprising: encoding the at least one result set as integer encoded and compressed sequences of values corresponding to different columns of the data.

10. The computer system of claim 9, wherein encoding the at least one result set comprises integer encoding using one or more of dictionary encoding or value encoding.

11. The computer system of claim 9, wherein encoding the at least one result set comprises compressing using an iterative run-length encoding algorithm.

12. A computer-implemented method for processing an external query request received from an application, the processing of the external query request being carried out in a manner that reduces the amount of data that must be processed, thereby more efficiently returning results for the external query request, the computer-implemented method comprising:
at one or more processors of a computing system, receiving an external query request from an application, wherein the external query request requests to apply operations over a data set in a data store, including a windowing operation that defines a window of a subset of sorted and filtered data that is to be returned after both a filter operation and a sort operation are applied to the data set;
at one or more processors of the computing system, splitting the external query request into a first internal query request and a second internal query request, including performing the following:
generating the first internal query request, which is configured to generate query-specific distribution statistics that are usable in determining what sorted and filtered data would be returned by the windowing operation, the distribution statistics including statistics that are specific to said external query request, the distribution statistics containing information about a distribution of rows within the data store that match the one or more operations;
executing the first internal query request to generate the distribution statistics; and
using the distribution statistics to generate the second internal query request, the second internal query request being configured to:
execute said filter and sort operations of the external query request while limiting the filter and sort operations to the subset of data defined by the windowing operation of the external query request, such that sorting comprises sorting only the number of rows associated with a size of the requested window over the data set, and such that the second internal sub-request selects only the rows that match the window based on the distribution statistics; and
return at least one result set for the external query request;
the computing system executing the second internal query request to generate the at least one result set; and
the computing system transmitting the at least one result set to the application.

13. The method of claim 12, further comprising:
caching the distribution statistics for at least partial re-use.

14. The method of claim 12, wherein the second internal query request comprises a plurality of sub-requests that are parallelized with multiple processors and a corresponding number of segments of data, each segment being handled by at least one different processor.

15. The method of claim 12, further comprising:
caching the at least one result set based on policies regarding costs and potential for re-use of data.

16. The method of claim 12, further comprising, prior to computing the distribution statistics, discretizing synthetic data values to form synthetic, discretized data.

17. The method of claim 16, further comprising using the synthetic, discretized data during column joins to participate in ORDER BY operations.

18. The method of claim 12, wherein the first internal query request computes statistics that are specific to said external query request by describing a number of occurrences of each value of a sorted column and computing the query-specific distribution statistics based, at least in part, on the described number of occurrences.

19. One or more computer storage media having stored thereon computer executable instructions that, when executed by one or more processing units of a computer system, implement a method for more efficiently processing a query request, the method comprising:
receiving an external query request from an application, the external query request requesting to apply operations over a data set, including both a filter operation and a sort operation, and to retrieve a subset of data matching the operations, as defined by a windowing operation;
generating at least one first internal query request and at least one second internal query request from the external query request, including:
generating the first internal query request, which is configured to compute query-specific distribution statistics, specific to the external query request, about a distribution of rows and columns within the data set that are implicated by the operations, including rows matching the filter operation and columns matching the sort operation;
executing the first internal query request to generate the query-specific distribution statistics; and
generating the second internal query request based on the previously computed query-specific distribution statistics, the second internal query request being configured to:

execute said filter and sort operations of the external query request while limiting the filter and sort operations to the subset of data defined by the windowing operation of the external query request, such that sorting comprises sorting only the number of rows associated with a size of a requested window over the data set, and such that the second internal sub-request selects only the rows that match the window based on the distribution statistics; and return at least one result set for the external query request;

executing the second internal query request to generate the at least one result set;

transmitting the at least one result set to the application.

* * * * *